United States Patent [19]
Beaumont et al.

[11] Patent Number: 5,873,068
[45] Date of Patent: Feb. 16, 1999

[54] DISPLAY BASED MARKETING MESSAGE CONTROL SYSTEM AND METHOD

[75] Inventors: Robert M. Beaumont, Saint John; Danny J. Doiron, Westfield; Christopher G. Keevill; Trenton A. Pomeroy, both of Quispamsis; Gerald L. Pond, East Riverside; Mark L. Thorburn; Douglas B. Drummond, both of Quispamsis; J. Marc Bouchard, Saint John, all of Canada

[73] Assignee: New North Media Inc., Canada

[21] Appl. No.: 556,981

[22] PCT Filed: Jun. 14, 1994

[86] PCT No.: PCT/CA94/00332

§ 371 Date: Dec. 13, 1995

§ 102(e) Date: Dec. 13, 1995

[87] PCT Pub. No.: WO94/30000

PCT Pub. Date: Dec. 22, 1994

[51] Int. Cl.[6] ............................ G06F 17/60; H04M 11/08
[52] U.S. Cl. .................... 705/14; 340/825.3; 379/93.12; 705/26; 705/27
[58] Field of Search ........................ 235/375; 340/825.3, 340/825.35; 379/90.01, 93.12; 705/1, 14, 26, 27; 707/104

[56] References Cited

U.S. PATENT DOCUMENTS

| 4,860,123 | 8/1989 | McCalley et al. | 358/342 |
|---|---|---|---|
| 5,047,614 | 9/1991 | Bianco | 235/385 |
| 5,195,129 | 3/1993 | Yazawa et al. | 379/96 |
| 5,195,130 | 3/1993 | Weiss et al. | 379/98 |
| 5,231,566 | 7/1993 | Blutinger et al. | 364/401 |
| 5,249,044 | 9/1993 | Von Kohorn | 348/12 |
| 5,258,751 | 11/1993 | DeLuca et al. | 340/825.44 |
| 5,502,636 | 3/1996 | Clarke | 364/401 |
| 5,515,424 | 5/1996 | Kenney | 379/96 |

Primary Examiner—Edward R. Cosimano
Attorney, Agent, or Firm—Hayes, Soloway, Hennessey, Grossman & Hage, PC

[57] ABSTRACT

A marketing system for use in a public switched telephone system having stored program controlled switches connected to customer premise equipment having an Analog Display Service Interface, comprises a storage device for storing predetermined information respecting each of customer premise equipment, a device for assembling and managing messages including creating a message to be delivered to one or more of the customer premise equipment, linking each message with one or more of the customer premise equipment, scheduling the delivery of the messages at a predetermined time, and measuring the response of each customer premise equipment to messages delivered thereto.

37 Claims, 100 Drawing Sheets

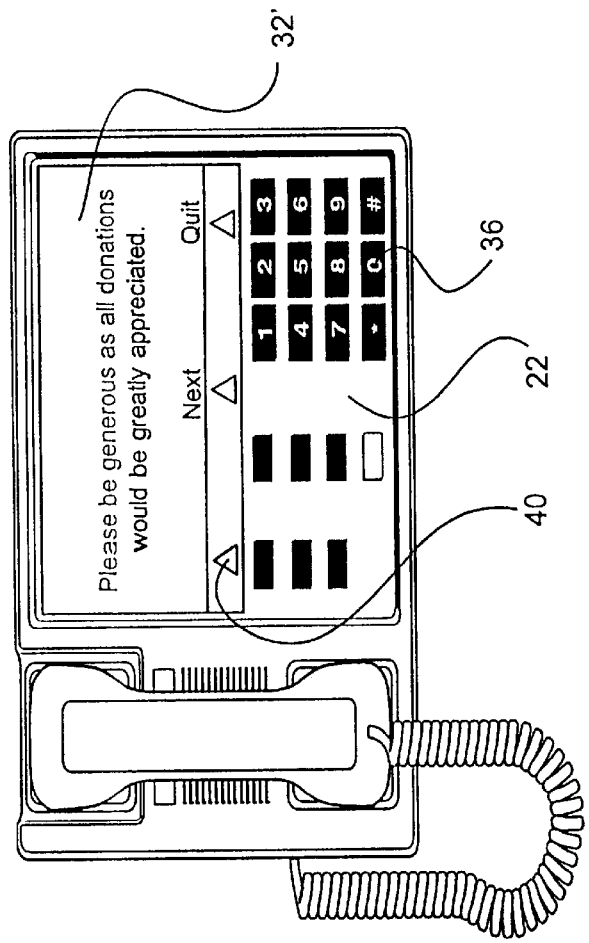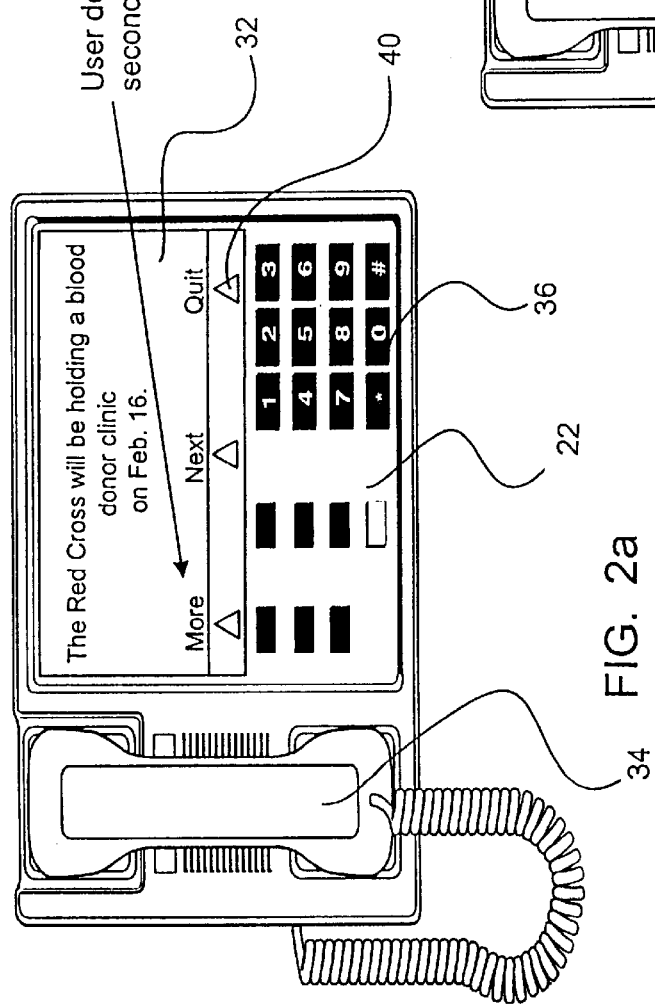
FIG. 2b
FIG. 2a

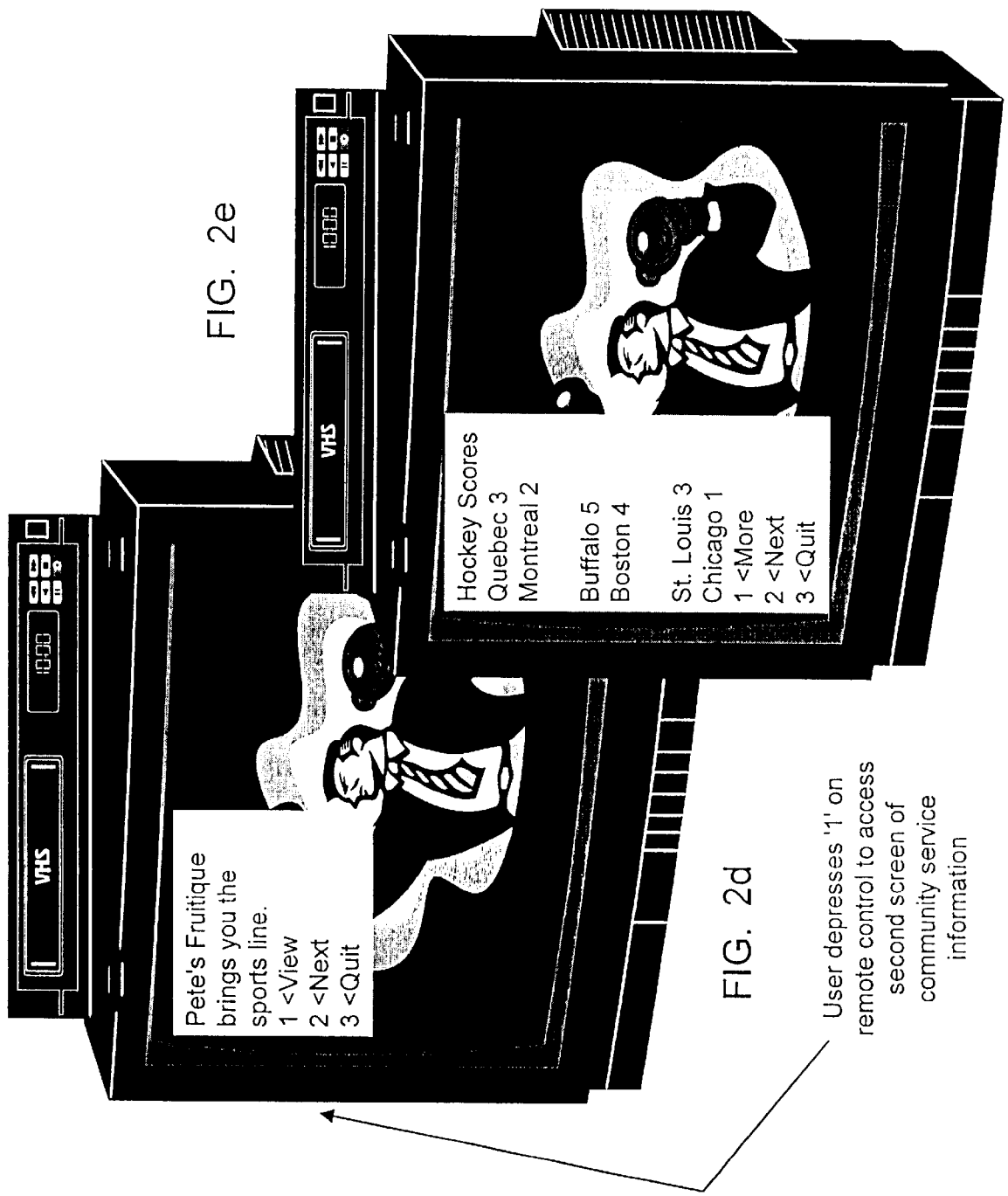

THE USER PRESSES THIS SOFT KEY TO ACCESS DBM MESSAGES

THE USER PRESS THIS SOFT KEY TO ACCESS MORE OF THE MESSAGES

This menu item steps the user through D.B.M. message creation, in a (hopefully) logical sequece. The first table requiring entry is the message head table.
Do you wish to continue?(y/n): Y Query Add Del Update Next Back Jump Screen Table Parent Child More
Query the database using this form D.B.M. Message Creation Form
--------------------------------------------------------------

Retailer: [    ]  Ad Number: [    ]  Ad Type: [    ]
Target:   [    ]  Verified? []

Next, the text for the ad should be set up.
Do you wish to continue? Y

Query Add Del Update Next Back Jump Screen Table Parent Child More
Query the database using this form D.B.M. Message -- Text Entry Form
--------------------------------------------------------------

AD_NUMBER: [    ] RETAILER:
Line Number: [    ]
                    ADSI Phone Display
--------------------------------------------------------------

Upper: I [        ]  I
Lower: I [        ]  I
Labels: I [    ] [    ] [    ] [    ] [    ]
-----------------------
Action: I [    ] [    ] [    ] [    ] [    ]

Last, the ad should be scheduled for download
and prioritized using the prioritized Priority table.
Do you wish to continue? Y

FIG. 6B

Query Add Del Update Next Back Jump Screen Table Parent Child More
Query the database using this form
                    priority
                D.B.M. Priority Form
--------------------------------------------------------------

AD NUMBER: [    ] RETAILER:    HITRATE: [    ]%
Download Hour: [    ]
Priority: [    ]

Process completed. To update the download schedule use menu item 5.
Hit <CR> to continue...

FIG. 6C

```
Query Add Del Update  Next Back Jump Screen Table Parent Child More
Query the database using this form D.B.M. Message Creation Form
          ---------------------------------------------------------------

Retailer: [    ] Ad Number: [    ] Ad Type: [    ]
Target:   [    ] Verified? []
```

FIG. 6D

```
Query Add Del Update Next Back Jump Screen Table Parent Child More
Query the database using this form D.B.M. Message -- Text Entry Form
          ---------------------------------------------------------------
AD_NUMBER:  [    ] RETAILER:
Line Number: [   ]

ADSI Phone Display
          ---------------------------------------------------------------
Upper:I [        ]   |
Lower:I [        ]   |
Lables:I [    ] [    ] [    ] [    ] [    ]
         ---------------------------
Action:I [      ][      ][      ][      ][      ]
```

6E continued

```
Scheduling and Priority Menu
------------------------------------
1) Add, query or modify the priority and scheduling table.
2) Schedule a list of ads in multiple hours.
3) Examine the download schedule.
q) Exit from Scheduling menu.
```

What hours do you wish this list to apply to?
Enter a list of hours, (using 24 hour clock),
separated by spaces: 15 16 17 18

| hour | precedence | ad_num | target |
|------|------------|--------|--------|
| 15 | 19 | 732 | magic3 |
| 15 | 40 | 655 | vcr |
| 15 | 58 | 110 | ownhome |
| 15 | 98 | 998 | res |
| 16 | 11 | 670 | fastfood |
| 16 | 28 | 751 | movies |
| 16 | 30 | 265 | sports |
| 16 | 31 | 835 | dinein |
| 16 | 35 | 345 | res |
| 16 | 76 | 876 | res |
| 16 | 84 | 152 | res |
| 16 | 98 | 998 | res |
| 17 | 12 | 126 | female |
| 17 | 15 | 695 | ski2 |
| 17 | 24 | 201 | res |
| 17 | 29 | 425 | res |
| 17 | 32 | 740 | family |
| 17 | 40 | 655 | vcr |
| 17 | 61 | 770 | res |
| 17 | 98 | 998 | res |
| 18 | 9 | 976 | loto |
| 18 | 31 | 835 | dinein |
| 18 | 36 | 355 | res |
| 18 | 41 | 315 | female |
| 18 | 63 | 651 | res |
| 18 | 65 | 115 | res |
| 18 | 75 | 156 | res |
| 18 | 76 | 876 | res |
| 18 | 94 | 1008 | res |
| 18 | 98 | 998 | res |

(EOF):

FIG. 6F

Prior to execution of the refresh, the messages for this hour should have been created and verified. Has this been done? (y/n): Y Please enter the hour you wish to refresh: 15

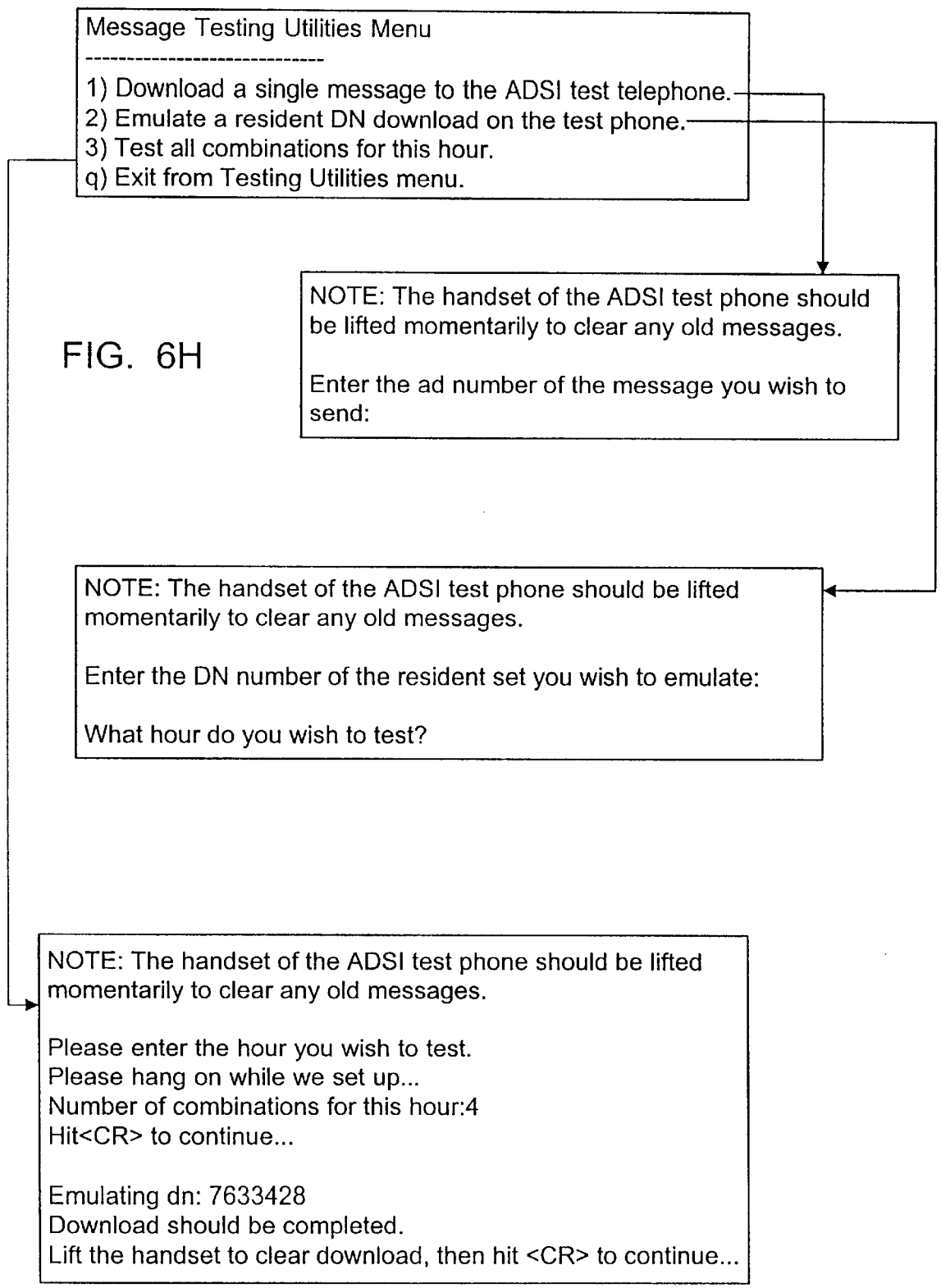

FIG. 6I

```
Query Add Del Update Next Back Jump Screen Table Parent Child More
Query the database using this form D.B.M. Generic Screen Presentation Form
               ----------------------------------------------------------
Banner Message:   [ Hi! Welcome to ]
                  [ screen talk   ]
Interim Message: [ Please wait - I'm ]
                  [ collecting messages ]
"Next" Softkey
Label for last Ad: [   ]
Do you wish to register your changes ? Warning....
This impacts screens for all residents.
Enter (y/n):
```

FIG. 6K

```
    User Initiated Refresh Utilities
    ------------------------------
1) Refresh Message Head Table Creation Form.
2) Refresh Message Text Form.
3) Enable Refresh Messages for Download.
4) Examine the Refresh Log.
q) Exit this Menu.
```

FIG. 6L

```
DBM Reports Menu
---------------
1) Display the Refresh log.
2) Display the Response log.
3) Clear the Refresh log.
4) Clear the Response log.
5) Display the Refresh log (Page mode).
6) Display the Response log (Page mode).
q) Exit this menu.
```

```
Tue 93/03/16 10:21:25 Calling DN 8471751 Called DN 6529490
Tue 93/03/16 11:05:59 Calling DN 6320921 Called DN 6529490
Tue 93/03/16 11:13:25 Calling DN 6320921 Called DN 6529490
Tue 93/03/16 11:18:47 Calling DN 6320921 Called DN 6367702
Tue 93/03/16 11:22:09 Calling DN 6580292 Called DN 6529490
Tue 93/03/16 11:24:12 Calling DN 8470393 Called DN 6529490
Tue 93/03/16 11:25:47 Calling DN 8470393 Called DN 6529490
Tue 93/03/16 12:34:07 Calling DN 6320921 Called DN 6529490
Tue 93/03/16 12:34:42 Calling DN 6320921 Called DN 6367702
Tue 93/03/16 13:32:26 Calling DN 8470705 Called DN 6529490
Tue 93/03/16 13:33:22 Calling DN 8470705 Called DN 6367707
Tue 93/03/16 13:34:07 Calling DN 8470705 Called DN 6529490
Tue 93/03/16 13:34:53 Calling DN 8470705 Called DN 6367702
Tue 93/03/16 13:35:35 Calling DN 8470705 Called DN 6367702
Tue 93/03/16 14:16:45 Calling DN 8474136 Called DN 6367707
Tue 93/03/16 14:17:51 Calling DN 8474136 Called DN 6367702
Tue 93/03/16 14:56:19 Calling DN 8470596 Called DN 6529490
Tue 93/03/16 14:56:41 Calling DN 8470596 Called DN 6529490
Tue 93/03/16 14:57:34 Calling DN 8470596 Called DN 6529490
Tue 93/03/16 14:58:45 Calling DN 8470596 Called DN 6367707
Tue 93/03/16 15:04:38 Calling DN 8470596 Called DN 6529490
Tue 93/03/16 15:05:19 Calling DN 8470596 Called DN 6529490
Tue 93/03/16 15:06:21 Calling DN 8470596 Called DN 6529490
```

6-L
continued

```
Scheduling and Priority Menu
-----------------------------------
1) Add, query or modify the priority and scheduling table.
2) Schedule a list of ads in multiple hours.
3) Examine the download schedule.
q) Exit from Scheduling menu.
```

```
Wed 93/03/17 22:12:26 Calling DN 8470518 Called DN 6367716
Thu 93/03/18 00:55:03 Calling DN 8471017 Called DN 6367006
Thu 93/03/18 00:57:35 Calling DN 8471017 Called DN 6367006
Thu 93/03/18 07:57:47 Calling DN 8473807 Called DN 6367799
Thu 93/03/18 07:59:08 Calling DN 8473807 Called DN 6367799
Thu 93/03/18 08:07:37 Calling DN 8470393 Called DN 6367706
Thu 93/03/18 08:11:47 Calling DN 6320921 Called DN 6367706
Thu 93/03/18 08:36:56 Calling DN 8474196 Called DN 6367799
Thu 93/03/18 09:05:19 Calling DN 8472111 Called DN 6367019
Thu 93/03/18 09:16:25 Calling DN 8473165 Called DN 6367706
Thu 93/03/18 09:23:43 Calling DN 8472183 Called DN 6367027
Thu 93/03/18 09:24:43 Calling DN 8470239 Called DN 6367706
Thu 93/03/18 09:30:47 Calling DN 8477303 Called DN 6367706
Thu 93/03/18 09:33:32 Calling DN 8477303 Called DN 6367006
Thu 93/03/18 10:00:04 Calling DN 8474275 Called DN 6367716
Thu 93/03/18 10:21:57 Calling DN 8473441 Called DN 6367042
Thu 93/03/18 10:35:40 Calling DN Called DN 6331145
Thu 93/03/18 10:35:49 Calling DN Called DN 6331145
Thu 93/03/18 10:36:09 Calling DN Called DN 6331145
Thu 93/03/18 10:36:33 Calling DN Called DN 6331145
Thu 93/03/18 10:37:45 Calling DN Called DN 6331145
Thu 93/03/18 10:43:17 Calling DN Called DN 6331145
Thu 93/03/18 10:43:47 Calling DN Called DN 6331145
Thu 93/03/18 10:45:09 Calling DN Called DN 6331145
Thu 93/03/18 10:48:21 Calling DN Called DN 6331145
Hit CR to continue:
```

FIG. 6M

Please enter the ad number you want to copy:

Please enter the new ad number:

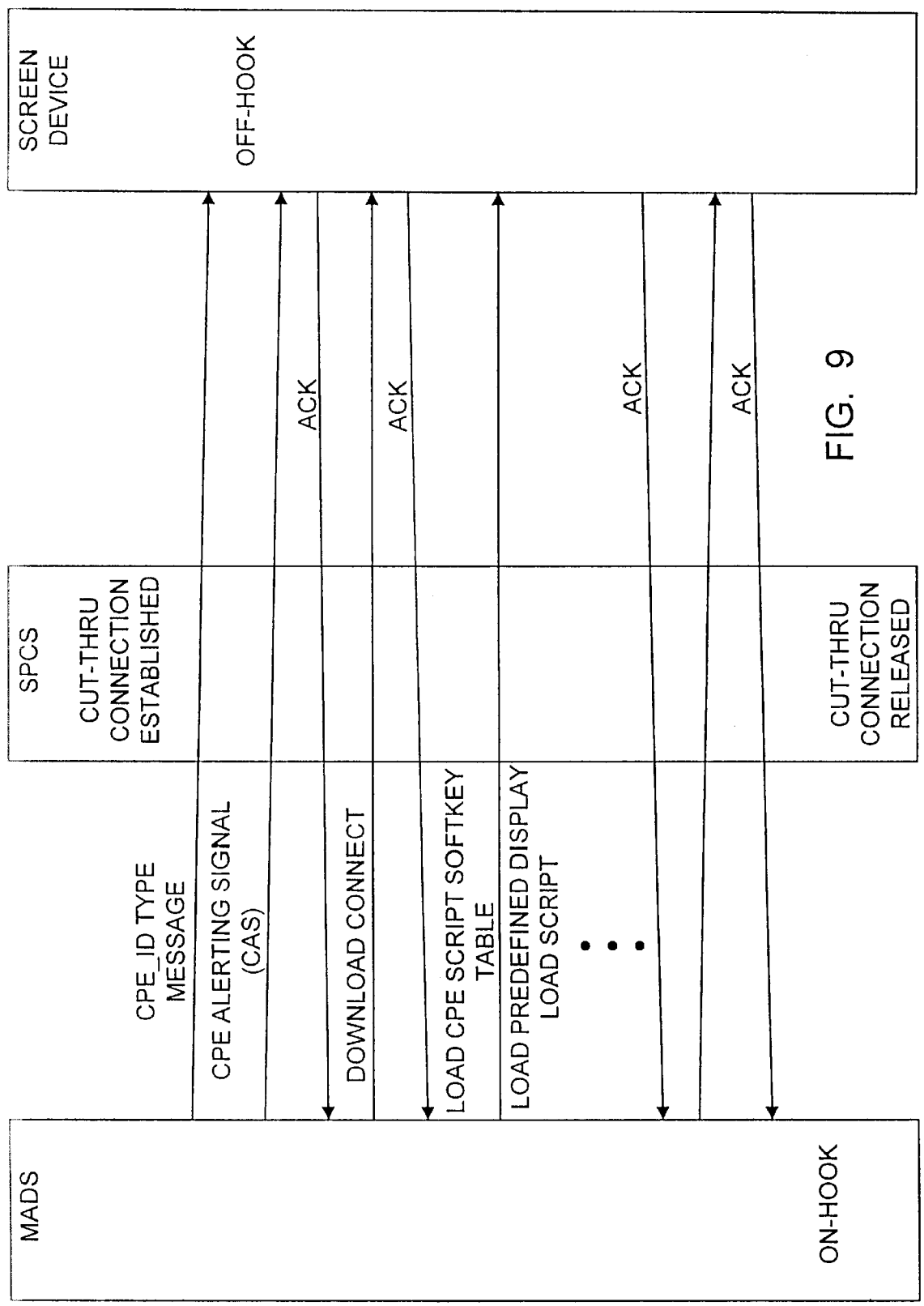

* Each Single/Multiple Data Message adheres to the framing requirements for on-hook data transmission as described in NT-NWT-000030⁵ section 2.5.1

SURVEY00

SCREEN TALK SURVEY DATA
- MAIN MENU -

1. LOAD SURVEY DATA
2. SELECT SURVEY DATA
3. DELETE SURVEY DATA
4. PRINT SURVEY DATA
5. LOAD UNIX DATA
6. SELECT UNIX DATA
7. PRINT UNIX DATA
8. BACK UP DATA
9. EXIT

SELECT NUMBER:

SCREEN TALK SURVEY DATA
- INPUT DATA FOR PARTICIPANT DATA BASE -
GENERAL PARTICIPANT CATEGORIES

SURVEY10

TELEPHONE:
CARD NO: 0

PARTICIPANT NAME:
GENDER (M/F):            PARTICIPANT AGE: 0            FAMILY SIZE: 0
              HOUSEHOLD AGE CATEGORIES

| | | | |
|---|---|---|---|
| UNDER 6 MALE: 0 | UNDER 6 FEMALE: 0 | 0 6 TO 12 MALE: | 6 TO 12 FEMALE: 0 |
| 13 TO 19 MALE: 0 | 13 TO 19 FEMALE: 0 | 0 20 TO 29 MALE: | 20 TO 29 FEMALE: 0 |
| 30 TO 39 MALE: 0 | 30 TO 39 FEMALE: 0 | 0 40 TO 49 MALE: | 40 TO 49 FEMALE: 0 |
| 50 TO 59 MALE: 0 | 50 TO 59 FEMALE: 0 | 0 60TO69 MALE: | 60 TO 69 FEMALE: 0 |
| | OVER 70 MALE: 0 | OVER 70 FEMALE: 0 | |

MARITAL STATUS CATEGORIES

MARRIED:        SINGLE:        SEPARAT/DIVORC:        WIDOWED:
              EMPLOYMENT STATUS CATEGORIES
FULLTIME:    PARTTIME:    LOOKING:    NOT/LOOKING:        RETIRED:
              LEVEL OF EDUCATION CATEGORIES
ELEMENT:  SOME HIGH:  HIGH SCHL:  COMM.COLG:  SOME UNIV:  UNIVRSTY:
              HOUSEHOLD INCOME CATEGORIES
< THAN 15K:    15K-34,999:    35K-49,999:        OVER 50K:    REFUSED:
       MULTIPLE WAGE EARNER:            T-D BANKER:

SELECT CRITERIA:            | ENTER       | F2
                            | NEXT MENU   | ABORT

FIG. 11B

93/03/20  SCREEN TALK SURVEY DATA  SURVEY11
16:00  - INPUT DATA FOR HOUSEHOLD DATA BASE -

HOUSEHOLD MAKE-UP CATEGORIES

OWN DWELLING:        RENT DWELLING:
          TYPE OF DWELLING
SINGLE DETACH:   SINGLE ATTACHED:   APARTMENT:   MOBILE HOME:
          TYPE OF HEATING
ELEC HEAT:   OIL HEAT:   WOOD HEAT:   OTHER HEAT:
          HOUSEHOLD PET CATEGORIES
DOGS:   CATS:   BIRDS:   OTHER PET:   NO PETS:
          AUTOMOBILE CATEGORIES
OF AUTOS: 0   AUTO YEAR: 0   AUTO MAKE:   AUTO MODEL:
          AUTO YEAR: 0   AUTO MAKE:   AUTO MODEL:
          AUTO YEAR: 0   AUTO MAKE:   AUTO MODEL:
          DEALER SERVICE:   HOME EMPLOYMENT:
          HOME/OFFICE EQUIPMENT CATEGORIES
FAX MACH:   ANSW. MACH:   VOICE MES:   PHOTO COP:   COMPUTER:   TYPWRITER:

SELECT CRITERIA:        ENTER        F2
                NEXT MENU    ABORT

SCREEN TALK SURVEY DATA
- INPUT DATA FOR LEISURE DATA BASE -

SURVEY12

SPORT PARTICIPANT CATEGORIES
ACTIVE IN SPORTS :

| | | | |
|---|---|---|---|
| BICYCLING: | BOATING: | HIKE: | BOWL: |
| GOLF: | TENNIS: | SOCCER: | HOCKEY: |
| DOWN HILL: | CROSS CTRY: | FISHING: | AEROBICS: |
| CAMPING: | AQUATIC ACT: | OTH ACTVTY: | |

LEISURE ACTIVITY CATEGORIES

CRAFTS:   READING:   MUSIC:   PHOTO:   OTHER LEIS:

WEEKLY SPENDING CATEGORIES

MOVIES: 0.00    FAST FOOD: 0.00   DINE-IN: 0.00    BINGO: 0.00
HORSES: 0.00    THEATER:   0.00   SPEC SPORT: 0.00    OTHER SPEND: 0.00

CLUB OR ASSOCIATION CATEGORIES
CLUB OR ASSOC:

TRAVEL OUTSIDE N.B. CATEGORIES

ONCE/WEEK:    ONCE/MONTH:    ONCE/YEAR:    OTHER TRAVEL:

SPECIAL INTERESTS CATEGORIES

TV HOURS/DAY: 0    RADIO STATION:    RADIO INFO:

SELECT CRITERIA:    ENTER         F2
                    NEXT MENU     ABORT

SCREEN TALK SURVEY DATA
- INPUT DATA FOR TECHNOLOGY DATA BASE -

SURVEY13

HOME TECHNOLOGY CATEGORIES

VCR: MICROWAVE:     CD PLAYER:    VIDEO CAMER:    NINT/COMP:

NEW SERVICES CATEGORIES

USE A PAGER:     CELLULAR PHONE:     BANKING MACHINE: 0
COMFTBLE ANSW:     FOLLOW PROMPTS:     CALL AGAIN:

SELECT CRITERIA:    |  ENTER    |  F2
                      |  NEXT MENU |  ABORT |

FIG. 11 E

```
93/03/20                SCREEN TALK SURVEY DATA                          SURVEY14
  16:00        - INPUT DATA FOR PATTERN DATA BASE -
                     LOTTERIES CATEGORIES
                          PLAY LOTTERY:
ONCE/DAY:  ONCE/WEEK:  ONCE/MONTH:   ONCE/YEAR:         OTHER LOTTERY:
                  SHOP FOR GROCERIES CATEGORIES
VILLAGE:   SOBEYS:    IGA:   SUPERSTORE:   SAVE EASY:
CO-OP OTHER GROCERY:        EXCLUSIVE:       SPECIALS:

BANKING PATTERN CATEGORIES
# OF BANKS: 0    VISA:      MASTER CD:     AMER EX:    SEARS:         CAN.TIRE:
GAS CARD:         OTHER CARDS:
                    PROMOTIONS CATEGORIES
COUPONS: 0    CONTESTS: 0    CLUB CARD: 0    BILLBOARDS: 0         1-800: 0
DIRECT MAIL: 0    NO PAYMNT: 0    T.V. ADS: 0    RADIO ADS: 0     NEWSPAPER: 0
                    SCREENTALK CATEGORIES
MORNING:   AFTERNOON:    EVENING:    ALL DAY:
MR.:       MRS.:     DAUGHTER:   SON:       OTHER MEM:
              PRODUCTS AND SERVICES CATEGORIES
% GROCERIES:0    % CLOTHING: 0     % MED/DENT: 0    %APPLNCE: 0       % AUTOMOTIVE:0
% ENTERTAIN: 0   % HARDWARE: 0    % OTHER:0           % OTHER PRODUCTS:

SELECT CRITERIA:          |  ENTER        |   F2
                                   |  NEXT MENU    |   ABORT

FIG. 11 F
```

93/03/20
16:02
SCREEN TALK SURVEY DATA                              SURVEY20
- SELECTION CRITERIA FOR PARTICIPANT DATA BASE -
- YOU CAN MAKE FROM ONE TO NINE SELECTIONS -
GENERAL PARTICIPANT CATEGORIES

CARD #: 0            GENDER (M/F):          AGE: 0         FAMILY SIZE: 0
                     *HOUSEHOLD AGE CATEGORIES*

UNDER 6 MALE:0   UNDER 6 FEMALE:0    6 TO 12 MALE:0    6 TO 12 FEMALE:0
13 TO 19 MALE:0  13 TO 19 FEMALE:0   20 TO 29 MALE:0   20 TO 29 FEMALE:0
30 TO 39 MALE:0  30 TO 39 FEMALE:0   40 TO 49 MALE:0   40 TO 49 FEMALE:0
50 TO 59 MALE:0  50 TO 59 FEMALE:0   60 TO 69 MALE:0   60TO69 FEMALE:0
                 OVER 70 MALE:0      OVER 70 FEMALE:0
                 *MARITAL STATUS CATEGORIES*
MARRIED:    SINGLE:      SEPARAT/DIVORC:      WIDOWED:
            *EMPLOYMENT STATUS CATEGORIES*
FULLTIME:  PARTTIME:  LOOKING:  NOT/LOOKING:   RETIRED:
           *LEVEL OF EDUCATION CATEGORIES*
ELEMENT:  SOME HIGH:    HIGH SCHL:    COMM.COLG:    SOME UNIV:    UNIVRSTY:
          *HOUSEHOLD INCOME CATEGORIES*
< THAN 15K:     15K-34,999:    35K49,999:        OVER 50K:       REFUSED:
                MULTIPLE WAGE EARNER:    T-D BANKER:

SELECT CRITERIA:        | ENTER       | F2        | F4
                        | NEXT MENU   | ABORT     | COMPLT

FIG. 11 G

```
93/03/20              SCREEN TALK SURVEY DATA           SURVEY21
16:02       - SELECTION CRITERIA FOR HOUSEHOLD DATA BASE -
            - YOU CAN MAKE FROM ONE TO NINE SELECTIONS -
                  HOUSEHOLD MAKE-UP CATEGORIES
         OWN DWELLING:              RENT DWELLING:
                  TYPE OF DWELLING
SINGLE DETACH:  SINGLE ATTACHED:   APARTMENT:    MOBILE HOME:
                  TYPE OF HEATING
ELEC HEAT:      OIL HEAT:      WOOD HEAT:           OTHER HEAT:
                  HOUSEHOLD PET CATEGORIES
DOGS:      CATS:      BIRDS:     OTHER PET:          NO PETS:
                  AUTOMOBILE CATEGORIES
    SELECTIONS: YEAR/MAKE/MODEL COUNT AS 3 SELECTIONS EACH
#OF AUTOS:0   AUTO YEAR:0    AUTO MAKE:   AUTO MODEL:    DEALER SERVICE:
HOME EMPLOYMENT:
              HOME/OFFICE EQUIPMENT CATEGORIES
FAX MACH:    ANSW.MACH:         VOICE MES:         PHOTO COP:     COMPUTER:
    TYPWRITER:

SELECT CRITERIA:    |   ENTER       |   F2       |   F4
                        |   NEXT MENU   |   ABORT    |   COMPLT
```

SCREEN TALK SURVEY DATA
- SELECTION CRITERIA FOR LEISURE DATA BASE -
- YOU CAN MAKE FROM ONE TO NINE SELECTIONS -
SPORT PARTICIPANT CATEGORIES
ACTIVE IN SPORTS:

SURVEY22

| BICYCLING: | BOATING: | HIKE: | BOWL: |
| GOLF: | TENNIS: | SOCCER: | HOCKEY: |
| DOWN HILL: | CROSS CTRY: | FISHING: | AEROBICS: |
| CAMPING: | AQUATIC ACT: | OTHER ACT: | |

LEISURE ACTIVITY CATEGORIES

CRAFTS:   READING:   MUSIC:   PHOTO:   OTHER LEIS:

WEEKLY SPENDING CATEGORIES

MOVIES:0.00   FAST FOOD:0.00   DINE-IN:0.00   BINGO:0.00
HORSES:0.00   THEATER:0.00   SPEC SPORT:0.00   OTHER SPEND:0.00

CLUB OR ASSOCIATION CATEGORIES
CLUB OR ASSOC:
TRAVEL OUTSIDE N. B. CATEGORIES
ONCE/WEEK:   ONCE/MONTH:   ONCE/YEAR:   OTHER TRAVEL:
SPECIAL INTERESTS CATEGORIES
TV HOURS/DAY:0  RADIO STATION:  RADIO INFO:

SELECT CRITERIA:    | ENTER    | F2    | F4
                    | NEXT MENU| ABORT | COMPLT

FIG. 11 I

```
93/03/20              SCREEN TALK SURVEY DATA              SURVEY23
     16:02    - SELECTION CRITERIA FOR TECHNOLOGY DATA BASE -
          - YOU CAN MAKE FROM ONE TO NINE SELECTIONS -
                  HOME TECHNOLOGY CATEGORIES
VCR:     MICROWAVE:    CD PLAYER:    VIDEO CAMER:    NINT/COMP:
                  NEW SERVICES CATEGORIES
USE A PAGER:       CELLUAR PHONE:           BANKING MACHINE:0
COMFTBLE ANSW:     FOLLOW PROMPTS:    CALL AGAIN:

SELECT CRITERIA:         |  ENTER       |   F2      |  F4
                         |  NEXT MENU   |   ABORT   |  COMPLT
```

FIG. 11 J

```
93/03/20                    SCREEN TALK SURVEY DATA                      SURVEY24
15:53       - SELECTION CRITERIA FOR PATTERN DATA BASE -
            - YOU CAN MAKE FROM ONE TO NINE SELECTIONS -
                            PLAY LOTTERY:
ONCE/DAY:         ONCE/WEEK:       ONCE/MONTH:     ONCE/YEAR:         OTHER LOTTERY:
                SHOP FOR GROCERIES CATEGORIES
VILLAGE:          SOBEYS:          IGA:            SUPERSTORE:        SAVE EASY:
CO-OP:            OTHER GROCERY:   EXCLUSIVE:      SPECIALS:
                BANKING PATTERN CATEGORIES
#OF BANKS: 0      VISA:            MASTER CD:      AMER EX:    SEARS:    CAN.TIRE:
GAS CARD:         OTHER CARDS:
                PROMOTIONS CATEGORIES
COUPONS: 0        CONTESTS: 0      CLUB CARD: 0    BILLBOARDS: 0        1-800:   0
DIRECT MAIL: 0    NO PAYMNT: 0     T.V. ADS: 0     RADIO ADS: 0         NEWSPAPER: 0
                SCREENTALK CATEGORIES
MORNING:          AFTERNOON:       EVENING:        ALL DAY:
MR.:              MRS.:            DAUGHTER:       SON:                 OTHER MEM:
                PRODUCTS AND SERVICES CATEGORIES
% GROCERIES: 0    % CLOTHING: 0    % MED/DENT: 0                        %APPLNCE:0
%AUTOMOTIVE: 0    % ENTERTAIN:0    % HARDWARE:0                         %OTHER:0
OTHER PRODUCTS:

SELECT CRITERIA:      |  ENTER       |  F2      |  F4
                              |  NEXT MENU   |  ABORT   |  COMPLT
```

SCREEN TALK SURVEY DATA
- TELEPHONE NUMBERS SELECTED -
TELEPHONECARD NO

SURVEY25

| TELEPHONE | CARD NO |
|---|---|
| 0 | 0 |
| 8470003 | 33 |
| 8470004 | 151 |
| 8470014 | 26 |
| 8470016 | 173 |
| 8470056 | 191 |
| 8470068 | 167 |
| 8470099 | 28 |
| 8470137 | 82 |
| 8470140 | 29 |
| 8470199 | 76 |
| 8470239 | 7 |
| 8470306 | 118 |
| 8470425 | 54 |
| 8470561 | 43 |

MORE

SELECT CRITERIA: | F2 RETRYW | F3 RITE | F4 PRINT | F7 BACK | F8 FORWARD | F9 MENU |

FIG. 11 L

93/03/23 SCREEN TALK SURVEY DATA SURVEY25
09:07 - TELEPHONE NUMBERS SELECTED -

=====================================================================

TELEPHONE CARD NO
=====================================================================

8470004151
847013782
8470384171
8470386925
8472072379
8472756152
8473210120
8473807113
8490683143
84926685

PRINT HAS REACHED THE END OF THE DATA BASE ..

OF TELEPHONE NUMBERS PRINTED =    10

PAGE NO: 1

FIG. 11 M

SCREEN TALK SURVEY DATA                SURVEY27
- WRITE SEARCH FILE TO DISK -

INSERT A FORMATTED DISKETTE IN DRIVE A

ENTER YOUR FILE NAME BELOW: XXXXXXXX.YYY

PRESS ENTER TO WRITE FILE, F2 TO ABORT

SCREEN TALK SURVEY DATA
- DELETE RECORD FROM BASES -

SURVEY30

ENTER PHONE NUMBER YOU WISH TO DELETE

0

PRESS ENTER TO DELETE, F2 TO ABORT

FIG. 11 O

SCREEN TALK SURVEY DATA
- PRINT RECORDS FROM BASES-

SURVEY40

ENTER PHONE NUMBER YOU WISH TO PRINT

0

PRESS ENTER TO PRINT, F2 TO ABORT

SCREEN TALK SURVEY DATA
- WRITE UNIX DATA TO BASES -   SURVEY50

INSERT UNIX DISKETTE IN DRIVE A

ENTER INPUT FILE NAME BELOW: XXXXXX.YYY

PRESS ENTER TO ADD DATE, F2 TO ABORT

DAY OF
WEEK

SCREEN TALK UNIX DATA
- SELECT UNIX DATA FROM BASES -
START    END      START    END
WMMDD    WMMDD    HOUR     HOUR
  O        O        O        O

SURVEY60

CALLED      CALLING
NUMBER      NUMBER
   O           O

PRESS ENTER TO SEARCH, F2 TO ABORT

FIG. 11 R

SURVEY61

SCREEN TALK UNIX DATA
- SELECT SORT OPTIONS FOR BASES -

FOR CALLED NUMBER SORT PRESS D

FOR CALLING NUMBER SORT PRESS G

ENTER PREFERRED SORT TYPE:

```
93/03/23                  SCREEN TALK UNIX DATA                    SURVEY62
 09:51          - UNIX DATA SORTED BY CALLED NUMBER -

CALLED #   CALLING #

4546767    6367777                      TOTAL NUMBER RECORDED = 1

6330415    6367792                      TOTAL NUMBER RECORDED = 1

6364765    6367795                      TOTAL NUMBER RECORDED = 1

6580292    6529490
6580292    6367019
6580292    6529490
6580292    6367026
6580292    6367029
6580292    6367004
6580292    6367029
6580292    6367027
6580292    6529490
                                                                    MORE
                  |  F2    |  F3    |  F4    |  F7    |  F8       | F9
SELECT CRITERIA:  |  RETRY |  WRITE |  PRINT |  BACK  |  FORWARD  | MENU
```

FIG. 11 T

SCREEN TALK UNIX DATA
-WRITE UNIX FILE TO DISK-

SURVEY64

INSERT A FORMATTED DISKETTE IN DRIVE A

ENTER YOUR FILE NAME BELOW: XXXXXXXX.YYY

PRESS ENTER TO WRITE FILE, F2 TO ABORT

SCREEN TALK SURVEY DATA
- TELEPHONE NUMBERS SELECTED -
===============================================================

| TELEPHONE | CARD NO |
|---|---|
| 8496906 | 6367020 |
| 8496906 | 6529490 |
| 8496906 | 6367706 |
| 8496906 | 6529490 |
| 8496906 | 6367749 |
| 8496906 | 6529490 |
| 8496906 | 6529490 |
| 6496906 | 6529490 |
| 8496906 | 6367019 |
| 8496906 | 6367784 |
| 8496906 | 6529490 |
| 8496906 | 6529490 |
| 8496906 | 6529490 |
| 8496906 | 6529490 |
| 8496906 | 6529490 |
| 8496906 | 6529490 |
| | TOTAL NUMBER RECORDED = 26 |
| 8497122 | 6367716 |
| 8997122 | 6367799 |
| 8497122 | 6529490 |
| | TOTAL NUMBER RECORDED = 3 |
| 8498177 | 6367749 |
| 8498177 | 6529490 |
| | TOTAL NUMBER RECORDED = 2 |
| 8498393 | 6367014 |
| | TOTAL NUMBER RECORDED = 1 |
| 8498682 | 6367706 |
| 8498682 | 6529490 |
| | TOTAL NUMBER RECORDED = 2 |
| 8499312 | 6367022 |
| 8499312 | 6367023 |
| 8499312 | 6367023 |
| 8499312 | 6367020 |
| 8499312 | 6367021 |
| 8499312 | 6367019 |
| 8499312 | 6367716 |

FIG. 11V

PRINT HAS REACHED THE END OF THE DATA BASE...

OF TELEPHONE NUMBERS PRINTED =    406

PAGE NO:   12

SURVEY80

SCREEN TALK SURVEY DATA
- DATA BASE MAINTENANCE -

1. BACKUP DATA BASE
2. RESTORE DATA BASE

9. RETURN TO PREVIOUS MENU

SELECT NUMBER:

SURVEY81

SCREEN TALK SURVEY DATA
- BACKUP DATA BASE -

1. PARTICIPANT
2. HOUSE HOLD
3. TECHNOLOGY
4. LEISURE
5. UNIX N

9. RETURN TO PREVIOUS MENU

SELECT NUMBER:

SCREEN TALK SURVEY DATA SURVEY83
- TECHNOLOGY BASE RESTORE -

INSERT BACKUP DISKETTE IN DRIVE A

PRESS ENTER TO RESTORE BASE, F2 TO ABORT

"call" as Defined in Second Embodiment

"little" Messages on Nothern Telecom Vista 350 as Defined in Second Embodiment 5,873,068

DISPLAY BASED MARKETING MESSAGE CONTROL SYSTEM AND METHOD

This application is based on an International Application Ser. No. PCT/CA94/00332, filed Jun. 14, 1994, which designated the U.S. as a continuation in part application, which is based on U.S. patent application Ser. No. 08/076, 648, filed Jun. 14, 1993, still pending.

FIELD OF THE INVENTION

The present invention relates to a method and an apparatus for creating a marketing communications channel whereby display based informational, promotional and advertisement messages are delivered through a public telephone network to unattended screen based devices in a non-intrusive manner.

BACKGROUND OF THE INVENTION

As screen based telephony becomes more prevalent, there is a need to employ these screens to provide a marketing communications channel that has attributes that exceed those of traditional mass marketing communications channels—television, radio, direct mail and telephone soliciting. Existing channels are not intrinsically targetable and measurable, i.e. they do not intrinsically have the ability to target a single screen based device or any group of screen based devices with messages that are based on consumer demographics or buying behaviour.

SUMMARY OF THE INVENTION

The present invention provides a marketing communications channel that is intrinsically targetable and measurable. The ability to target a single screen based device or any group of screen based devices with messages that are based on consumer demographics or buying behaviour means that messages have more relevance to consumers and advertisers. Targeting can be controlled by: direct marketers—thereby increasing the effectiveness of the message; and by the consumer—thereby increasing the acceptance of the message. Since this medium is connected to the public telephone network, it provides for a high degree of measurability. Messages prompt users to generate calls directly to the marketer or to interactive information systems. These calls can be counted by traditional telephony means providing response measurement statistics for the direct marketer.

One aspect of the present invention is defined as a marketing system for use in a public switched telephone system having stored program controlled switches connected to customer premise equipment having an Analog Display Service Interface, the system comprising a storage device for storing predetermined information respecting each of customer premise equipment, a device for assembling and managing messages including creating a message to be delivered to one or more of the customer premise equipment, linking each message with one or more of the customer premise equipment, scheduling the delivery of the messages at a predetermined time, and measuring the response of each customer premise equipment to messages delivered thereto.

Another aspect of the present invention is defined as a process for non-intrusively delivering informational, promotional and advertisement messages over a public telephone network to unattended screen based devices, comprising the steps of creating a message to be delivered, storing said message, selecting one or more of said screen based devices to which said message is to be delivered, scheduling said message for delivery at a predetermined time, delivering said message at said predetermined time, detecting a response to said message; and storing said response.

The preferred embodiment introduces DBM messages as targeted display based informational, promotional and advertising messages delivered through the public switched telephone network to consumer's unattended screen based devices in a non-intrusive manner. A second embodiment expands this fundamental concept and calls this component of DBM messages the "little". After viewing the "little" message, the consumer may call up a detailed message known as the "lot" and then, if desired, place a call to a retailer in the "call" step.

BRIEF DESCRIPTION OF THE DRAWINGS

These and other features of the invention will become more apparent from the following description in which reference is made to the appended drawings wherein:

FIGS. 2a–2c are diagrammatic representations of display based telephone units and FIGS. 2d–2e are diagrammatic representations of television units serving as screen based devices contemplated by the present invention;

FIG. 6A through 6m illustrate various computer screens of the preferred embodiment of the control system of the present invention;

FIG. 9 is a block diagrammatic view illustrating delivery of the messages in accordance with Feature Download Management as specified for Server-initiated service script updates after stored program controlled switch cut through connections have been established;

FIGS. 11A through 11y illustrate various computer screens showing the results of a variety of control system processes;

FIGS. 29-01 through 29-33 illustrate the various screens viewed by the consumer on their screen based device while interacting with the CallMall.

DESCRIPTION OF PREFERRED EMBODIMENT

General Description

Figure 1:
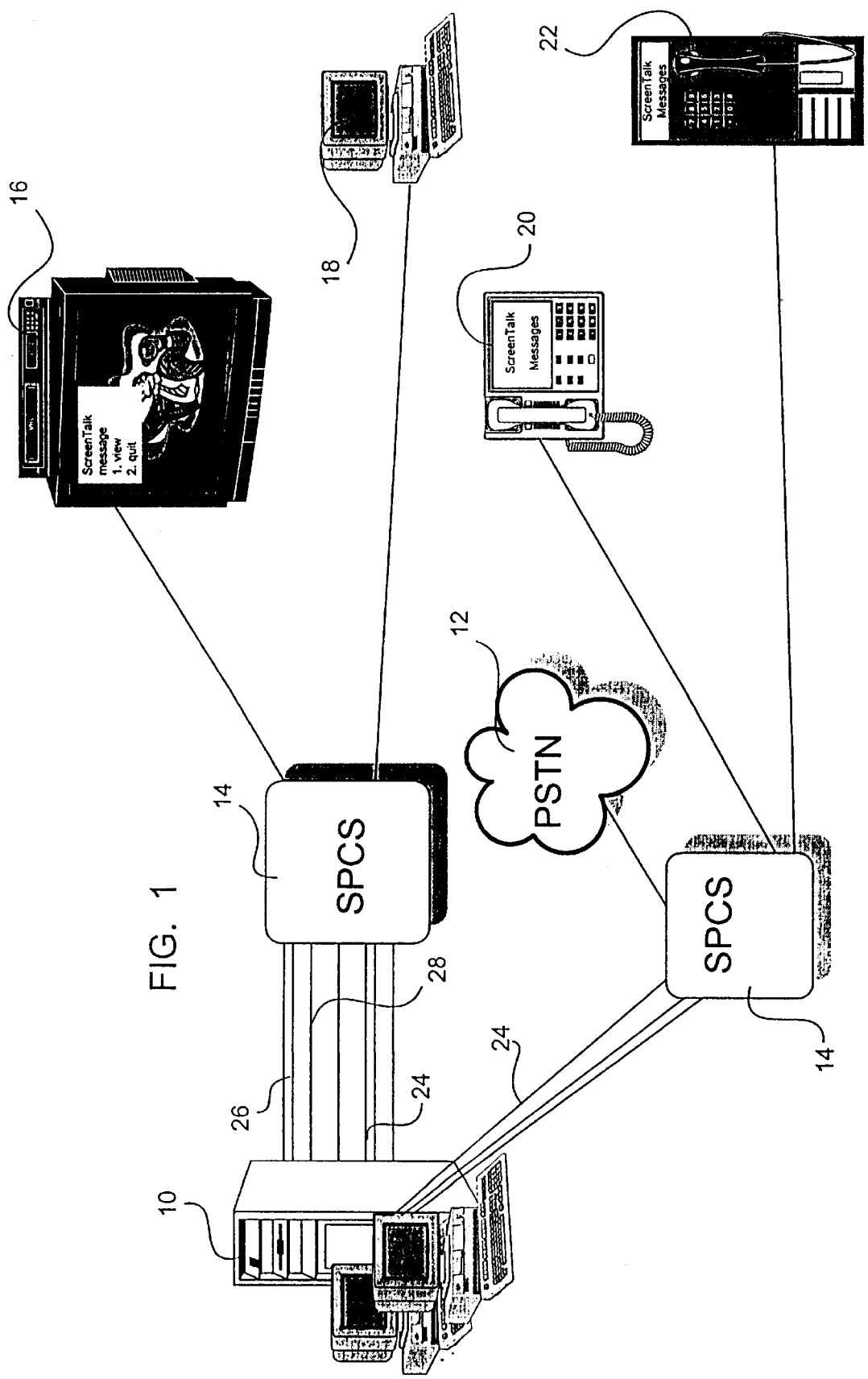
FIG. 1 is a diagrammatic view illustrating the preferred embodiment of the message control system of the present invention connected to display based devices via stored program controlled switches of a digital Public Switched Telephone Network.

Three fundamental components are required to establish the new marketing communications channel according to the present invention. As shown in FIG. 1, these include a Display Based Marketing (DBM) control system 10, a digital Public Switched Telephone Network (PSTN) 12 having Stored Program Controlled Switches (SPCS) 14, and screen based devices 16, 18, 20 and 22 connected to the public telephone network and which have the ability to receive and store display based messages when unattended. The control system provides the ability to create messages, target messages to individual screen based devices, deliver messages to those devices, offer additional information on messages, and gather response rates to messages by those devices. Message delivery is non-intrusive, that is message delivery is initiated by the system through the SPCS to unattended screen based devices without ringing the screen based device. To perform this, message delivery circuits 24 must be provided by the SPCS that provide the means to make a connection through the SPCS to the screen based device without ringing the screen based device. The type of message delivery circuits required for each SPCS depends upon the functionality of the SPCS. The marketing communications channel achieved by the present invention provides targetability to the resolution of a single screen based device. Thus, a unique connection must be established, through the SPCS, between the control system and each screen based device targeted for delivery of messages according to the present invention. The number of message delivery circuits required for each SPCS can be determined by simple traffic engineering.

Screen based devices 16–22 initially manifest as devices compliant with SR-INS-002461[1], devices with adjuncts that are compliant with SR-INS-002461[1], and devices that are prototypes of SR-INS-002461[1] like the Northern Telecom SESAME® telephone. The control system initiates non-intrusive delivery of messages to unattended screen based devices to be viewed at the leisure of the device user. The screen based device must, therefore, in the unattended state, accept control system initiated message delivery and allow the storage of messages until the control system overwrites the messages with new messages or the user of the device erases the messages. Devices compliant with SR-INS-002461[1], have the ability to permanently store messages. Devices that are prototypes of SR-INS-002461[1] can only temporarily store messages and can be erased before the user has viewed them. To overcome this problem, the control system provides a refresh facility so that users of prototype devices like the Northern Telecom SESAME® telephone may request another delivery of lost messages.

Individual message content may include, but is not limited to, community service information, straight advertising, electronic coupons redeemable for discounts, and sponsored information. Message delivery to screen based devices is scheduled-hourly, daily, weekly, etc. During a scheduled delivery, numerous individual messages from numerous message sponsors are grouped together and delivered by the control system to screen based devices. The number of individual messages included in the delivery is a function of the storage capability of the targeted screen based device and, thus, as initially defined by SR-INS-002461[1]. The manner in which messages appear on the screen of a screen based device is a function of the screen size of the device.

The messages delivered to the screen based devices program soft-keys on the screen based device as defined by SR-INS-002461[1]. Messages will typically program soft-keys as:

More—when pressed causes the screen based device display more of an individual message.

Next—when pressed causes the screen based device to skip to the next message of a multi-message delivery.

Call—when pressed causes the screen based device to auto dial the telephone number programmed by the display based message. The destination of the call is the retailer/direct marketer.

Listen—when pressed causes the screen based device to auto dial the telephone number programmed by the display based message. The destination of call is an interactive information system.

Start—appears with the last message and when pressed causes the screen based device to display the first message.

Quit—when pressed returns the display of the screen based device to its default state.

Individual messages will prompt users to depress a soft key programmed with Call or Listen to allow the user to obtain additional information about a particular message, a product or a service. The Call soft key causes the screen based device to generate a call to a retailer or direct marketer. The Listen soft key causes the screen based device to generate a call to information sources such as a voice mail box, an interactive voice response (IVR) system, or an interactive system that follows SR-NWT-002495[2]. Regardless of the destination, these calls are crucial to the communications channel because they can be counted by traditional telephony means, providing response measurement statistics which are of great value to the direct marketer.

One component of the system provides the mechanism for providing additional information. These components are: voice mail system or interactive voice response system, an interactive system that follows the recommendations of SR-NWT-002495[2]. As these systems receive telephone calls, lines or trunks 26 are required from the SPCS serving the system.

The system collects the call count/response measurement information by employing an SPC'S feature and data link 28 compliant with TR-TSY-000032[3]. This SPCS feature is assigned to all telephone lines and numbers that receive calls generated by depressing a soft key on a screen based device in response to a message. This feature and the required data link may be required from multiple SPCS.

Detailed Description

In the current form, the marketing communications channel includes screen based devices compliant, and screen based devices with adjuncts that are compliant, with SR-INS-002461[1]. It will also include the Northern Telecom SESAME® telephone that is a near compliant prototype of SR-INS-002461[1]. In the near term, screen based devices will proliferate the public telephone network with numerous competing standards arising. The technology based components of the present invention will evolve to support these new standards, though the principles and fundamental concepts of the marketing communications channel will remain the same-a marketing communications channel whereby display based informational, promotional and advertisement messages are delivered through the public telephone network to unattended screen based devices in a non-intrusive manner.

The following detailed description describes specifically a method and an apparatus for the delivery of display based informational, promotional and advertisement messages through the public telephone network to unattended screen based devices compliant with SR-INS-002461[1], unattended screen based devices with adjuncts that are compliant with SR-INS-002461[1], and unattended Northern Telecom SESAME® telephones.

Screen Based Devices

Before describing the method and apparatus of the present invention, it would be useful to review screen based devices. Messages are stored in screen based devices compliant with SR-INS-002461[1] and adjuncts compliant with SR-INS-002461[1] as service scripts employing the Feature Download Management (FDM) facility of these devices. The actual commands (Feature Download Message Parameters) for downloading service scripts to the screen based device are described in TR-NWT-001273[4]. The messages are delivered to unattended screen based devices employing the Server-initiated service script update methodology defined in SR-INS-002461[1] section 3.1.3.1.2. DBM messages or SCREENTALK® messages or some other name that uniquely identifies these messages will appear on the FDM Page.

Figure 2C:
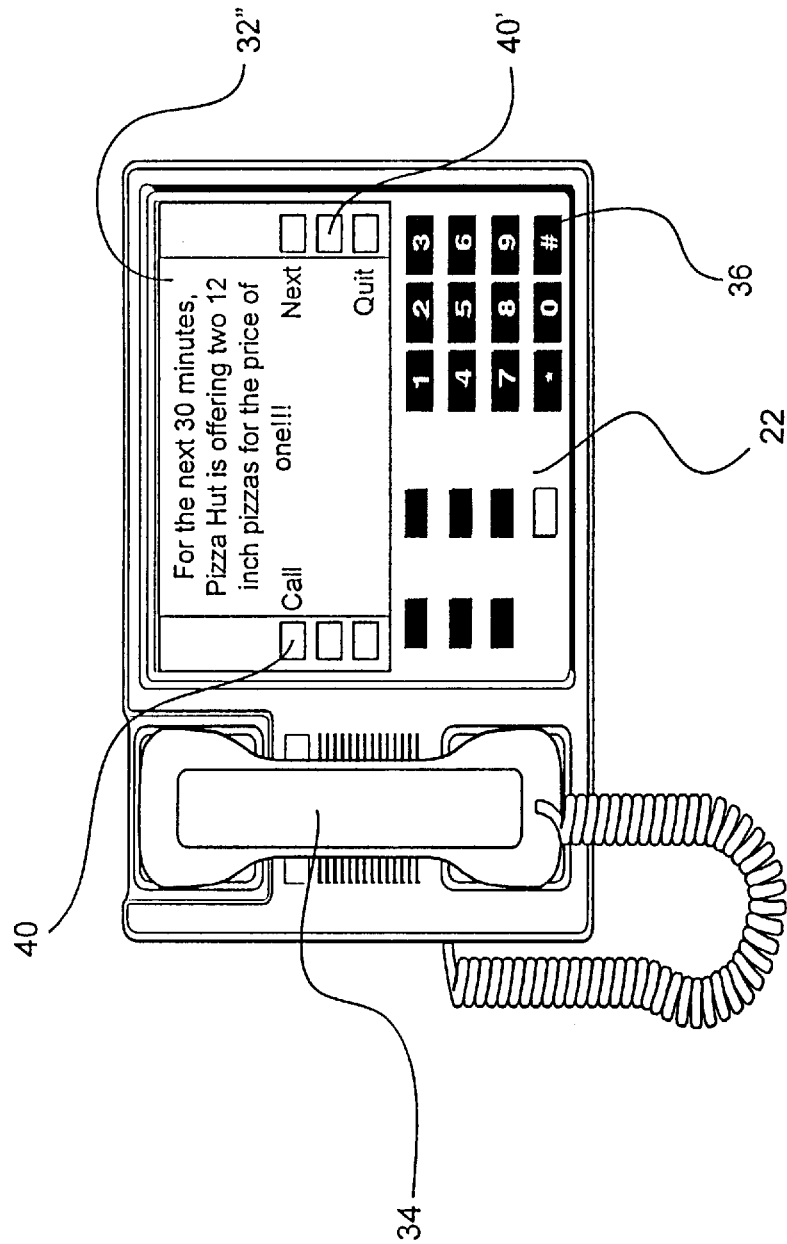
Figure 3A:
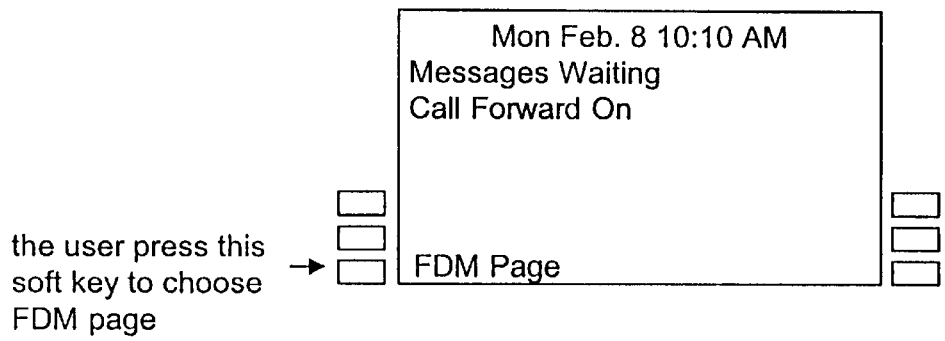
FIGS. 3a–3d are diagrammatic representations of how DBM messages are reviewed in the Feature Download Management Facility of a SR-INS-002461[1] compliant device.
Figure 3B:
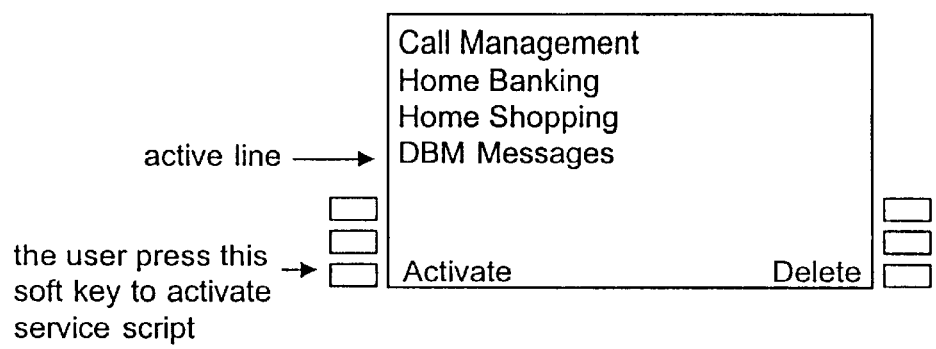
Figure 3C:
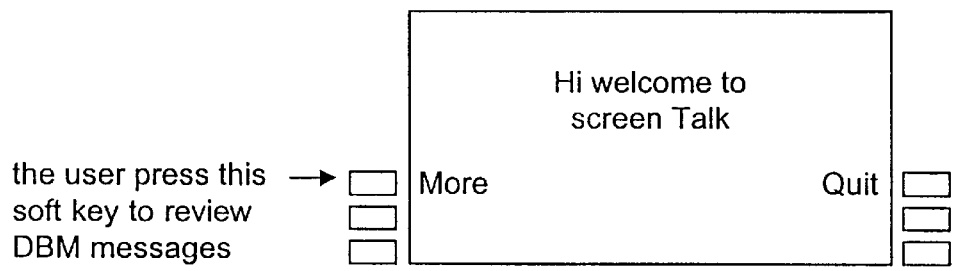
Figure 3D:
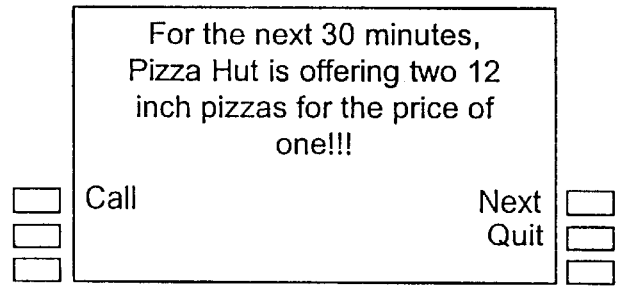

FIGS. 2a, 2b and 2c illustrate display based devices in the form of telephone units 22 having display screens 32, 32' and 3". The messages delivered to the units in FIGS. 2a and 2b are in the form of community service messages while that of FIG. 2c is a straight advertising message. Each of these units includes conventional handsets 34 and keypads 36. In addition, each includes a number (three in FIGS. 2a and 2b and six in FIG. 2c) of soft-keys 40 and ", and i.e. programmable keys, in the form of spring loaded depressible buttons. The appropriate label for each key is imbedded in the message delivered to the unit as explained more fully later. The display based devices illustrated in FIGS. 2d and 2e are in the form of television sets. The messages in these cases are sponsored messages. These units are not provided with physical buttons. Rather, selections are made by manipulating a remote screen control unit (not shown) which controls a cursor on the television screen. The manner in which selections are made does not form part of the present invention and, accordingly, are not described in detail. FIGS. 3a through 3d illustrate the procedure for reviewing DBM messages, where messages are stored in the FDM facility of a SR-INS-002461[1] compliant device.

Figure 4A:
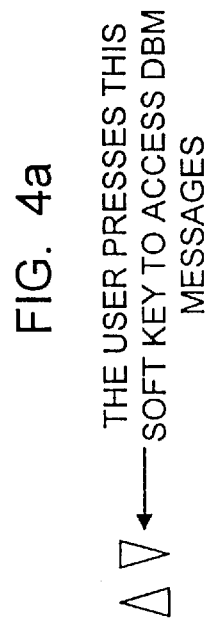
FIGS. 4a–4c are diagrammatic representations of how DBM messages are reviewed on the idle display of a telephone trademark under the name SESAME®.
Figure 4B:
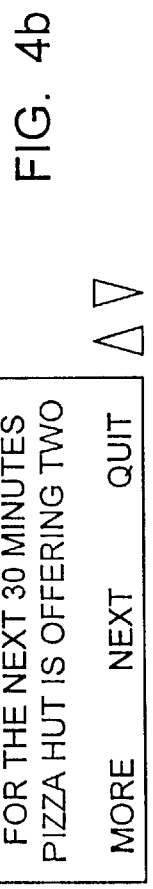
Figure 4C:
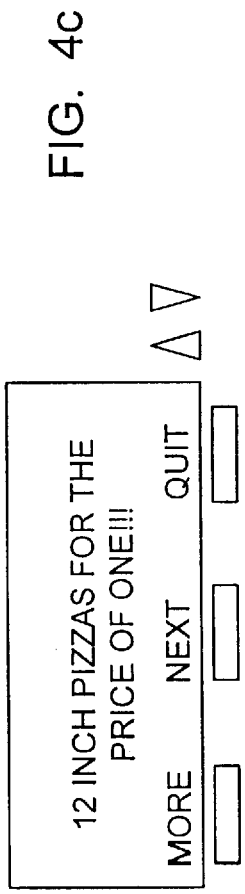

The Northern Telecom SESAME® telephone is a prototype of SR-INS-002461[1]. This screen based device does not support the FDM facility and thus cannot store messages as service scripts. Since these devices do not support the FDM facility, they cannot be forced off-hook as defined in SR-INS-002461[1] section 3.1.3.1.2. Because of this, the messages are delivered to on-hook SESAME® telephones. The SESAME® telephone closely follows the Data Transmission Protocol and Data Link Layer requirements for on-hook data transmission without power ringing as defined in TR-NWT-000030[5]. As such, the SESAME® does not provide Data Link Layer acknowledgments. However, the SESAME® telephone closely adheres to the Server Display Control facility of SR-INS-002461[1], and it is this facility that is employed by the present invention to store messages in these devices. The actual commands (Server Display Control Messages) closely follow those defined in TR-NWT-001273[4]. FIGS. 4a, 4b, and 4c illustrate the procedure for reviewing DBM messages, where messages are stored in a SESAME® telephone and available on the idle display. The SESAME® telephone erases the contents of the Server Display Control facility when the telephone is taken off-hook. As a result, messages are lost if the SESAME® telephone is taken off-hook, and it is possible that the user can erase the messages before they are viewed. To overcome this problem, the system provides a Refresh Mechanism, described later, through which users can request the immediate re-delivery of messages.

Message Control System

Figure 5:
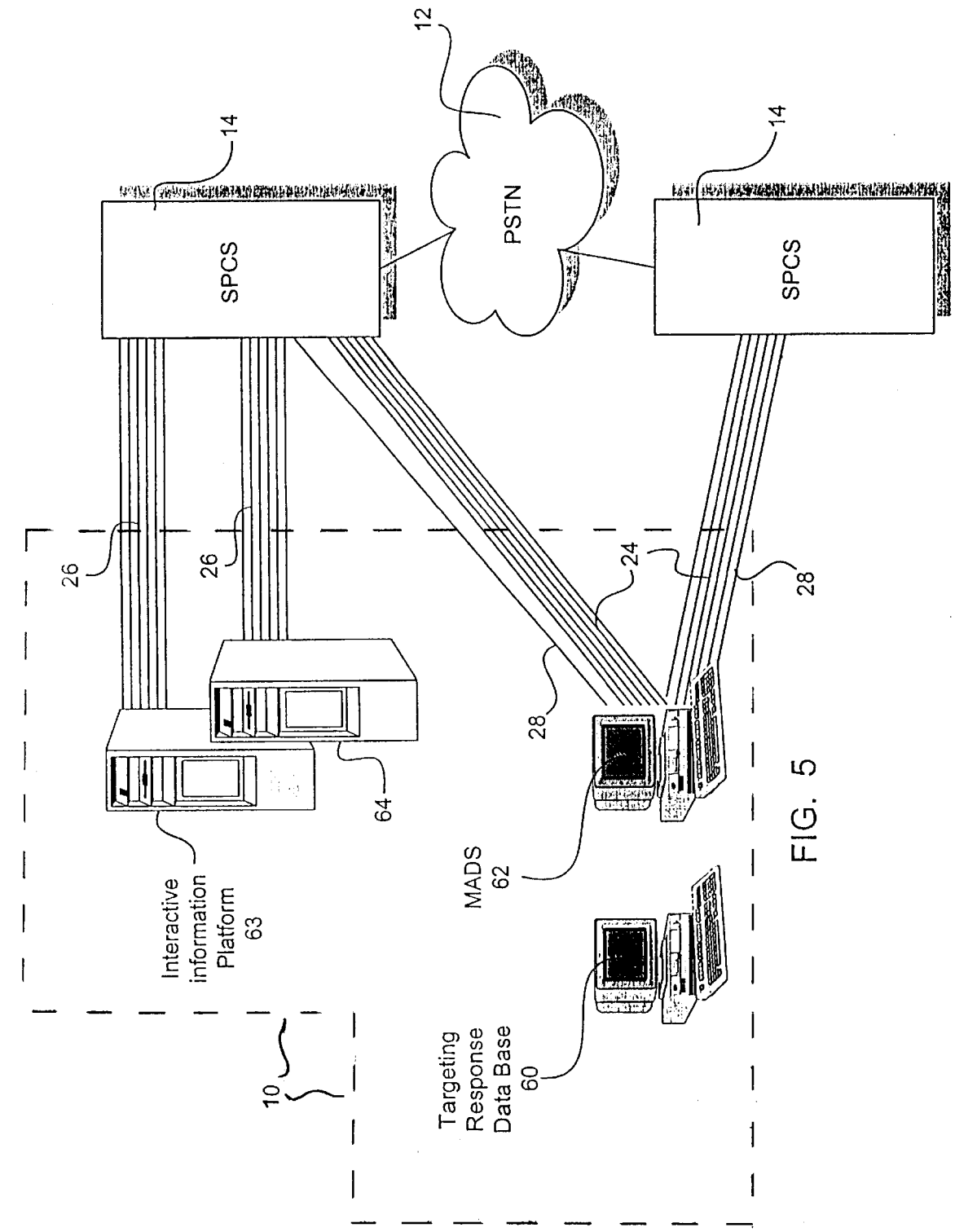
FIG. 5 is a view similar to FIG. 1 but illustrates other aspects of the preferred embodiment of the present invention.
Figure 6A:
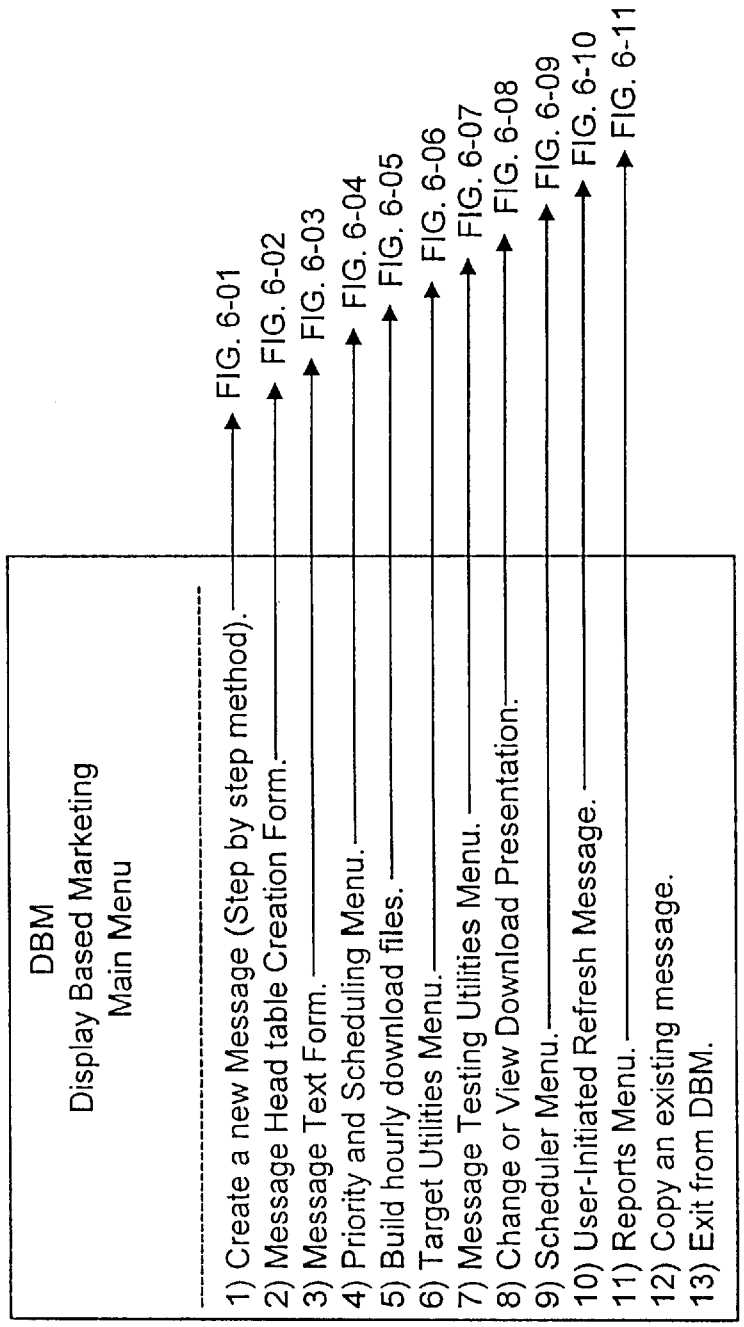
Figure 6E:
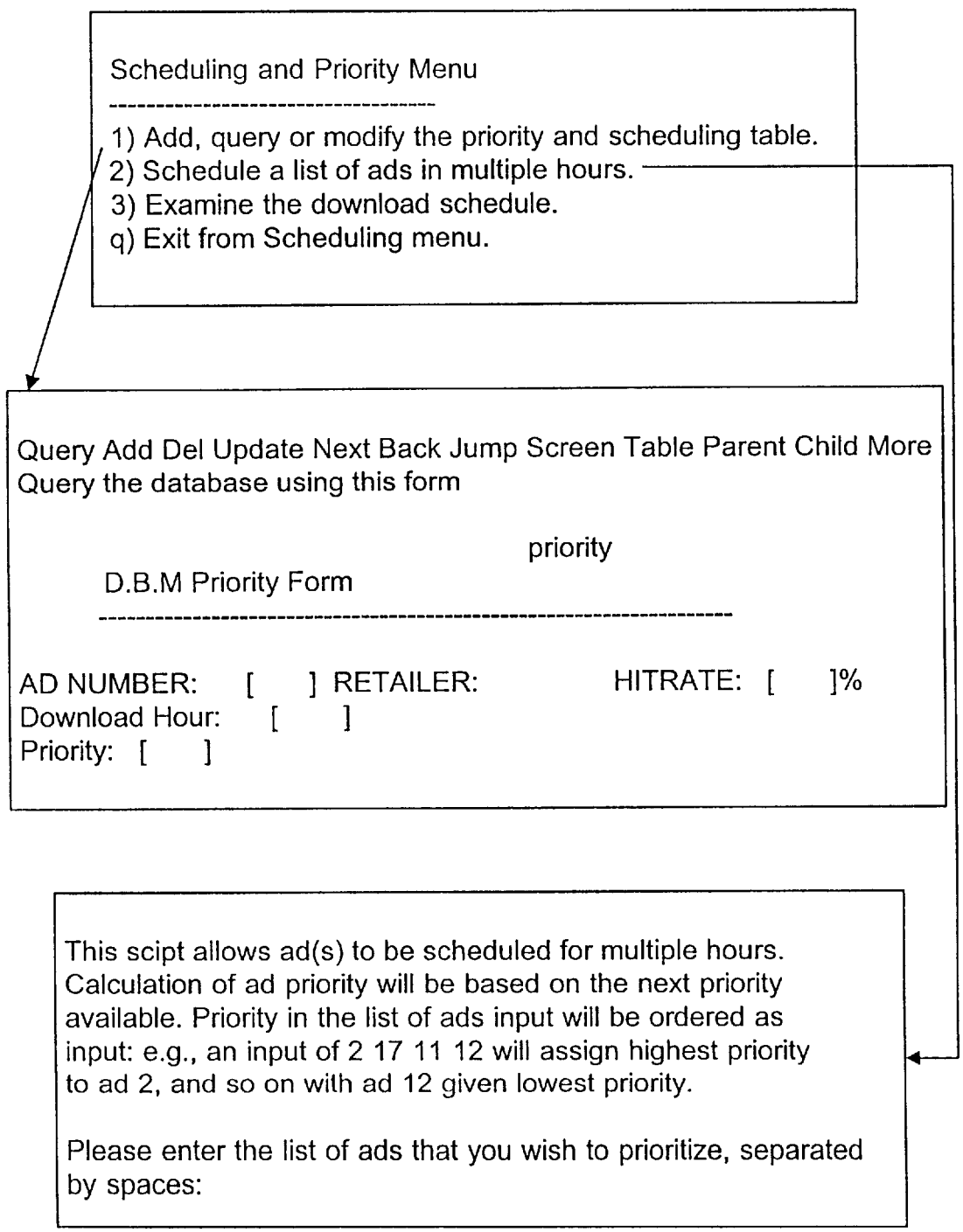
Figure 6G:
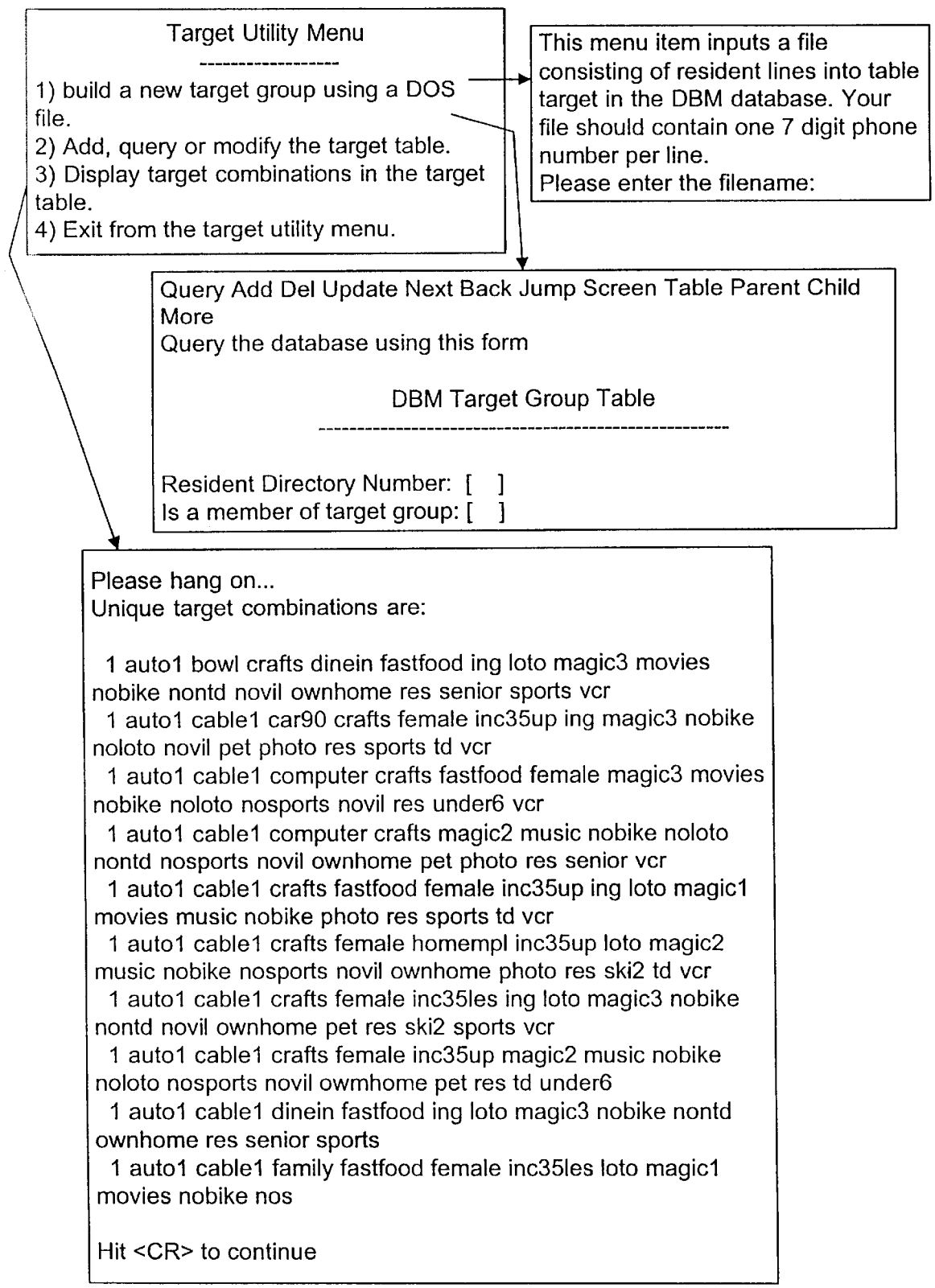
Figure 6J:
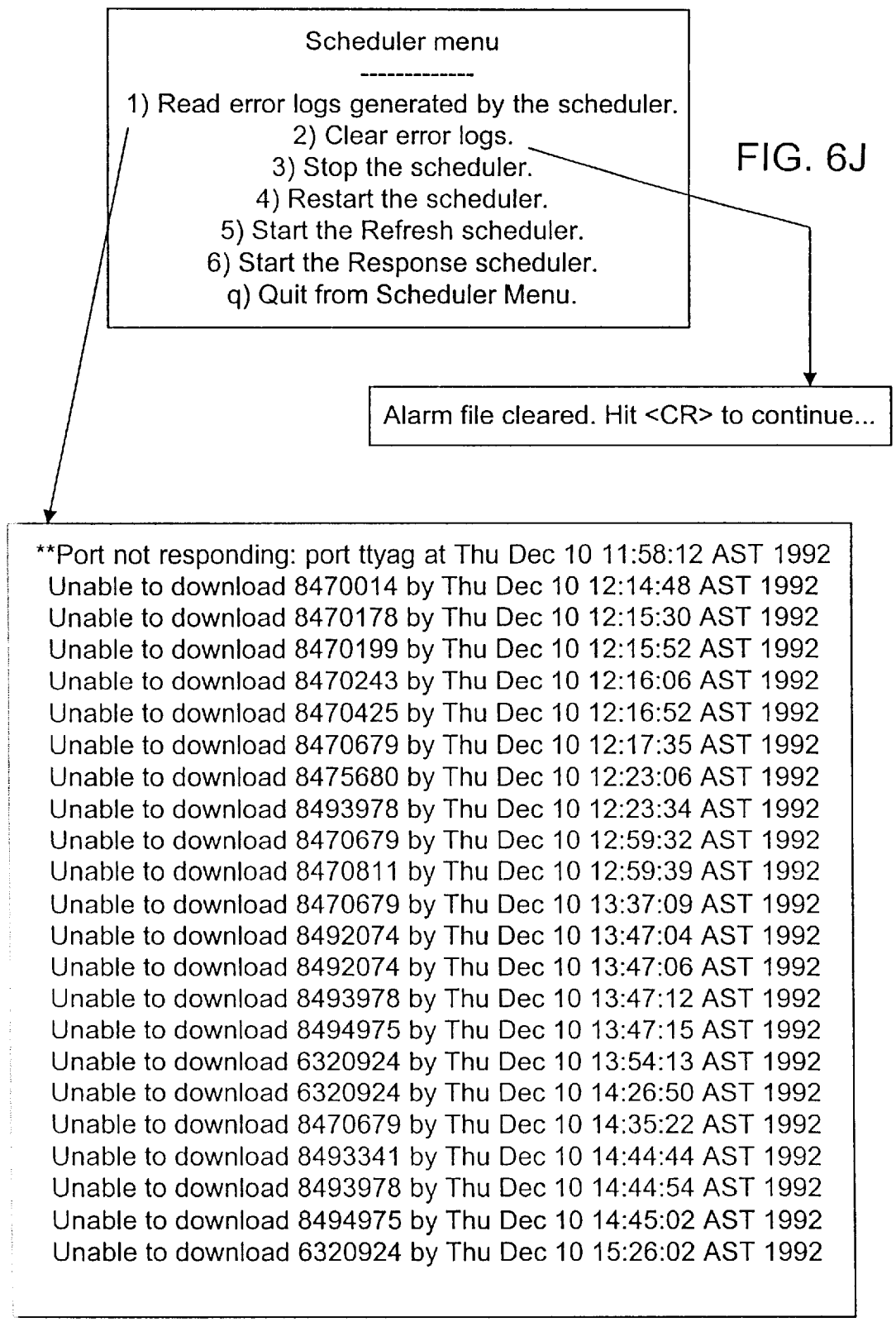

FIG. 5 illustrates the three elements which comprise the Display Based Marketing (DBM) System. These elements are the Targeting and Response Database (TRDB) 60, the Message Assembly and Delivery System (MADS) 62, and the Interactive Information Platforms (IIP) 63 and 64.

Targeting and Response Database

In the preferred embodiment of the present invention, the Targeting and Response Database (TRDB) 60 is an executable software program which may be created using any commercially available database management program, such as Aston Tate's DB3+ software package which operates in the DOS (Disk Operating System) environment on a personal computer. The TRDB allows the DBM operator to create target groups of screen based devices and compile reports from the response measurements collected. All screen based devices connected to the public telephone network are identified by the telephone number assigned to it by the serving telephone company. The Targeting and Response Database relates the screen based device, its telephone number and a profile of the person(s) or family using the screen based device. The database user profile consists of demographic and purchasing habit information that can be used to target DBM messages. The screen based device user receiving DBM messages may have access to the profile to allow control over the message types and message contents the user will accept. Users may change their profile by calling the DBM System operator or by accessing an interactive response system that updates the user profile in the TRDB.

When DBM messages require targeting to specific user profiles, the defining attributes are selected from the available attributes in the TRDB (for example, age, salary, number of children, grocery store of choice, etc.) by the DBM system operator. The TRDB returns, in the form of an ASCII file, the telephone numbers of the screen based devices that are targeted. This file is then transferred to the Message Assembly and Delivery System (MADS). Response measurement information in the form of an ASCII file is transferred from the MADS to the TRDB. The TRDB processes this information into report format to be provided to the retailer or direct marketer.

The TRDB menus, as viewed from the operator's console, are illustrated in FIGS. 11-01 to 11-25. FIG. 11-01 illustrates the main menu which appears when the TRDB is loaded. Option 1, "Load Survey Data", allows the DBM operator to input individual consumer information. Option 2, "Select Survey Data", allows the DBM operator to select a target consumer or a target group of consumers, based on specific consumer information found in the database. The request provides telephone number(s) and club card number(s). A club card is a means by which consumers who receive DBM messages may differentiate themselves, when interfacing with retailers, from consumers who do not receive DBM messages. Club cards may be used to claim electronic coupons from retailers as an example of the cards multiplicity of uses. Option 3, "Delete Survey Data", simply allows the DBM operator to remove all information on an individual consumer from the TRDB by telephone number. Option 4, "Print Survey Data", enables the DBM operator to print all survey data for an individual consumer in the database by telephone number. Option 5, "Load Unix Data", allows DBM operator to import response logs from the MADS into the TRDB. Option 6, "Select Unix Data", allows the DBM operator to view response activity on an individual or all consumers in the database. Option 7, "Print Unix Data", allows the DBM operator to print response activity on an individual or all consumers in database. Option 8, "Back Up Data", facilitates back up and restoration of TRDB.

Figure 12:
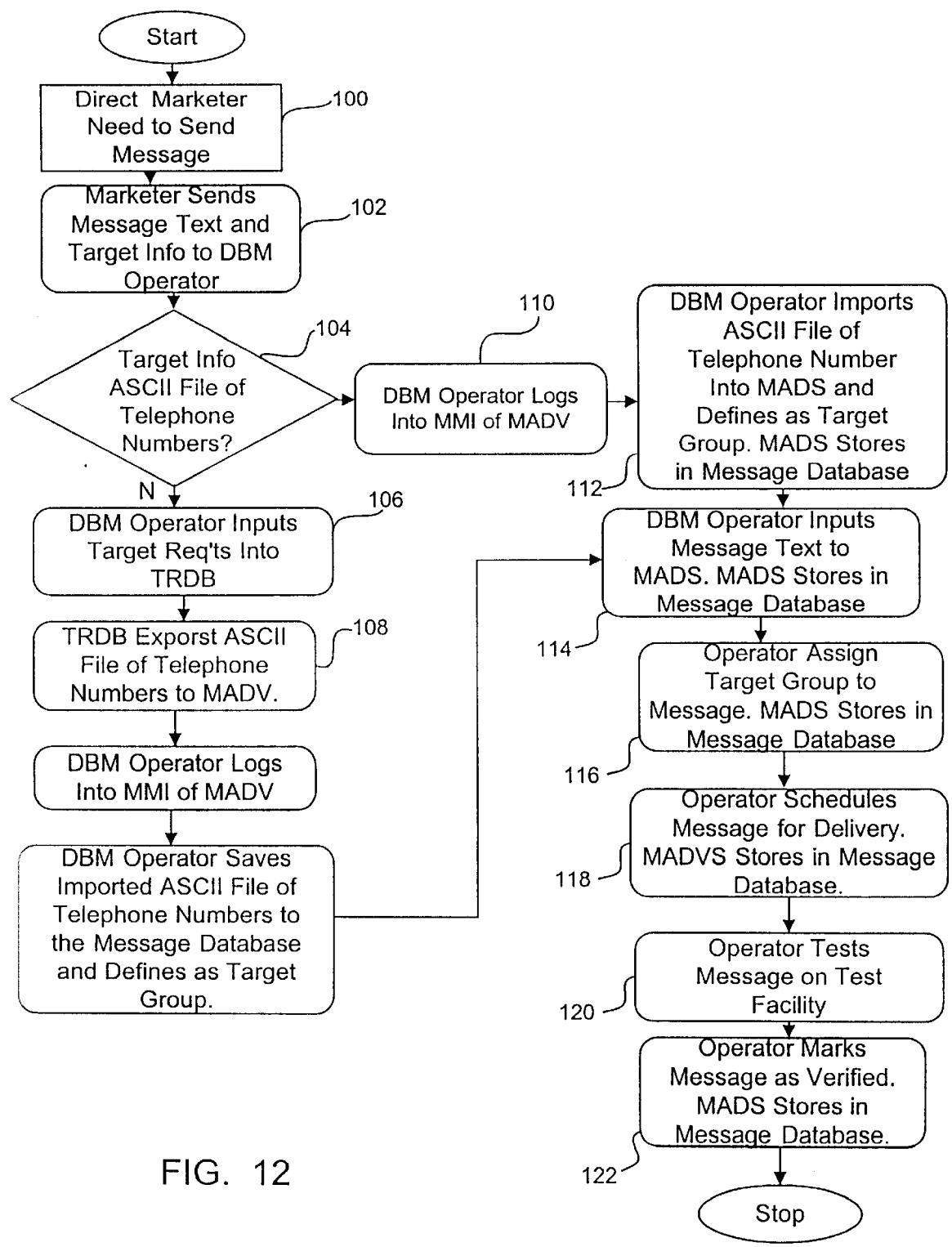
FIG. 12 is a flow chart illustrating the Message Input process according to a preferred embodiment of the present invention.
Figures 1, 29:
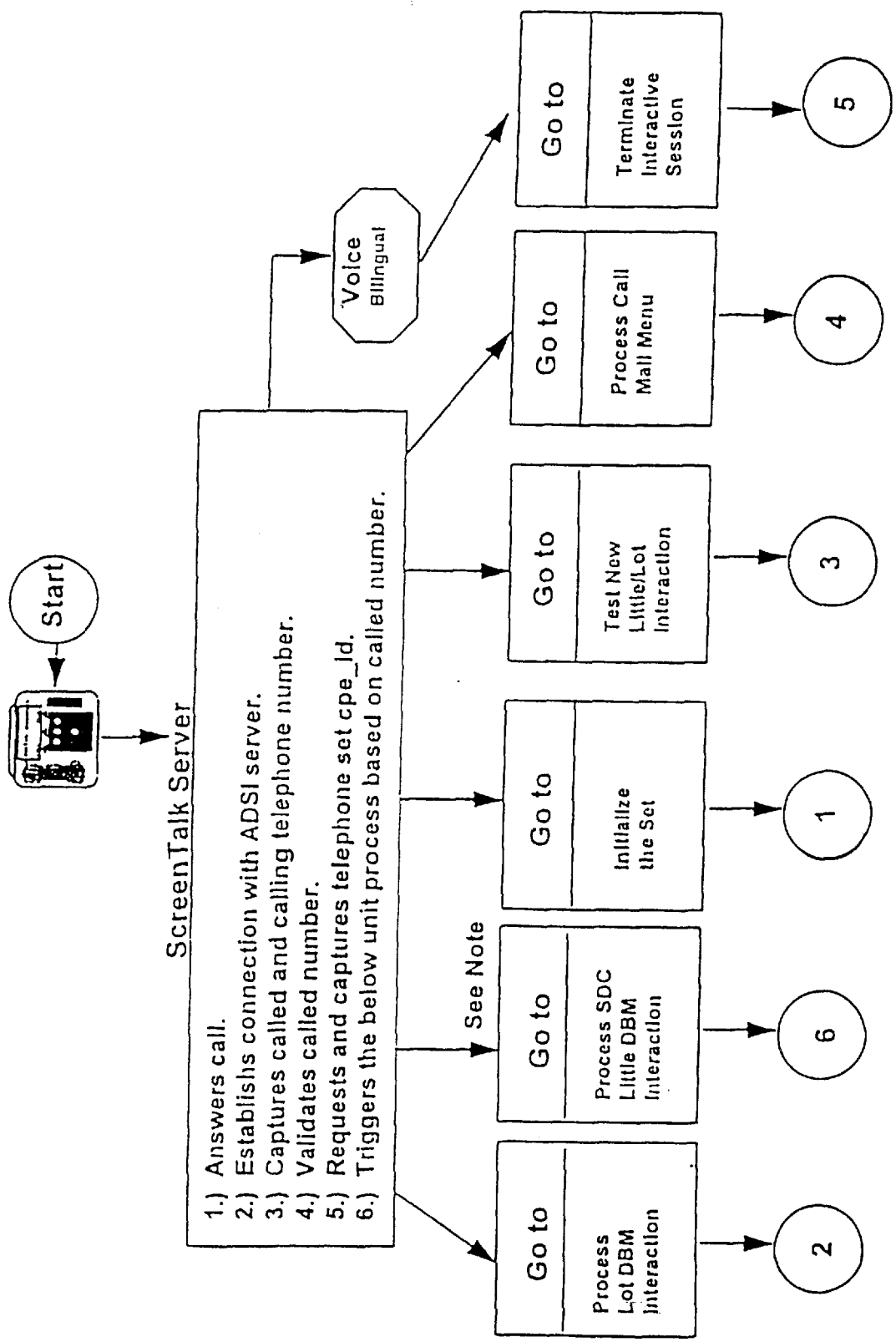
Figures 2, 29:
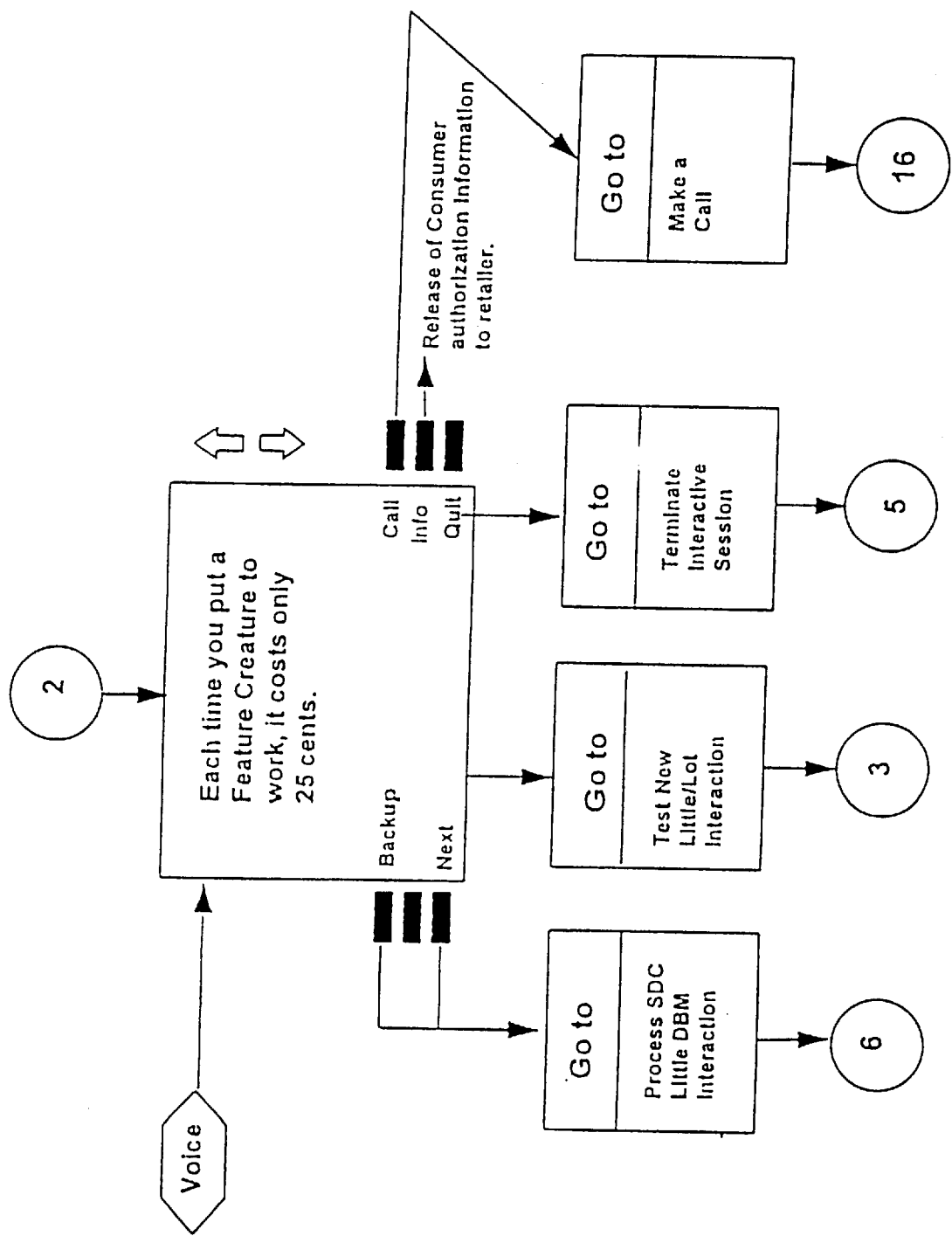
Figures 3, 29:
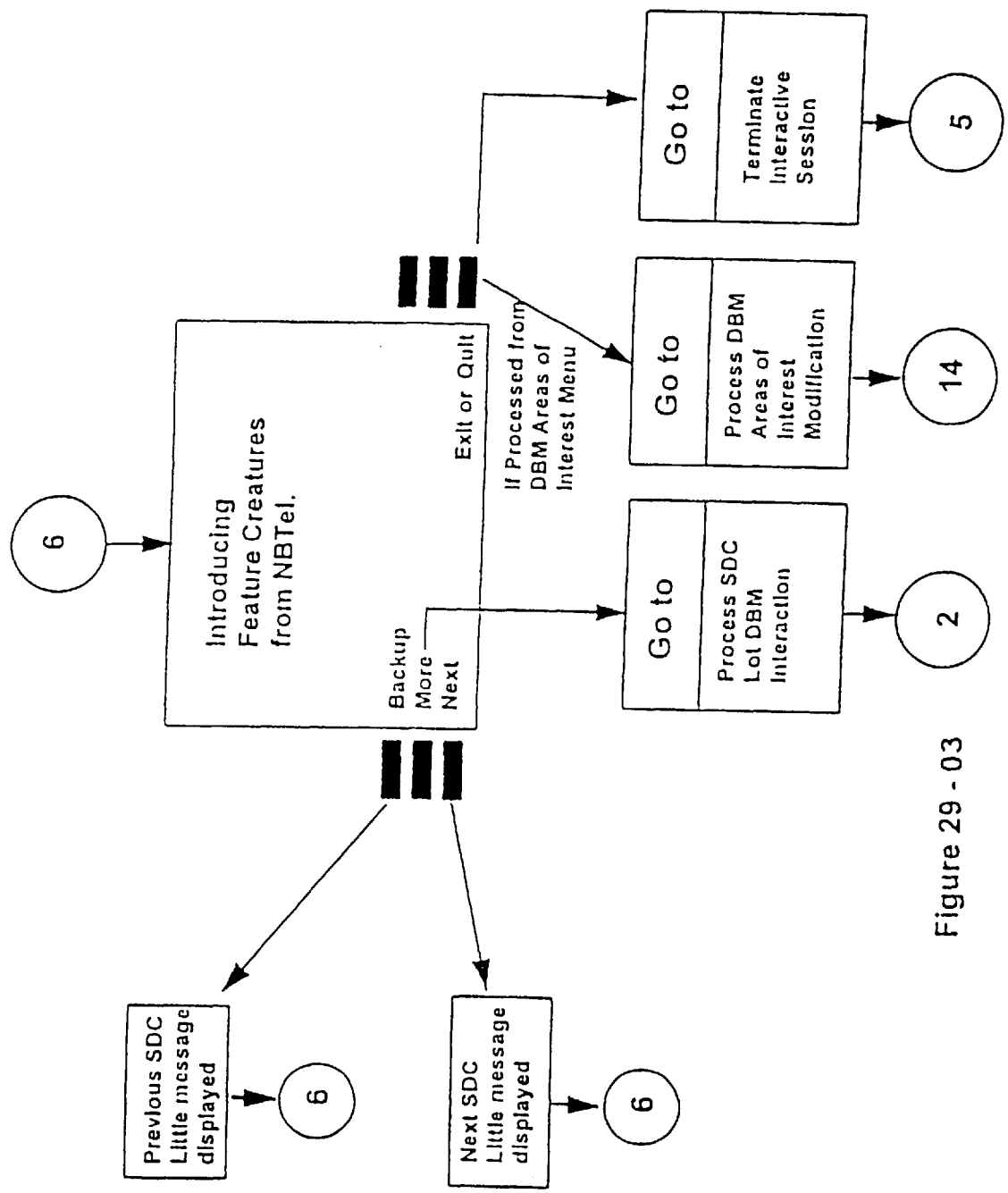
Figures 4, 29:
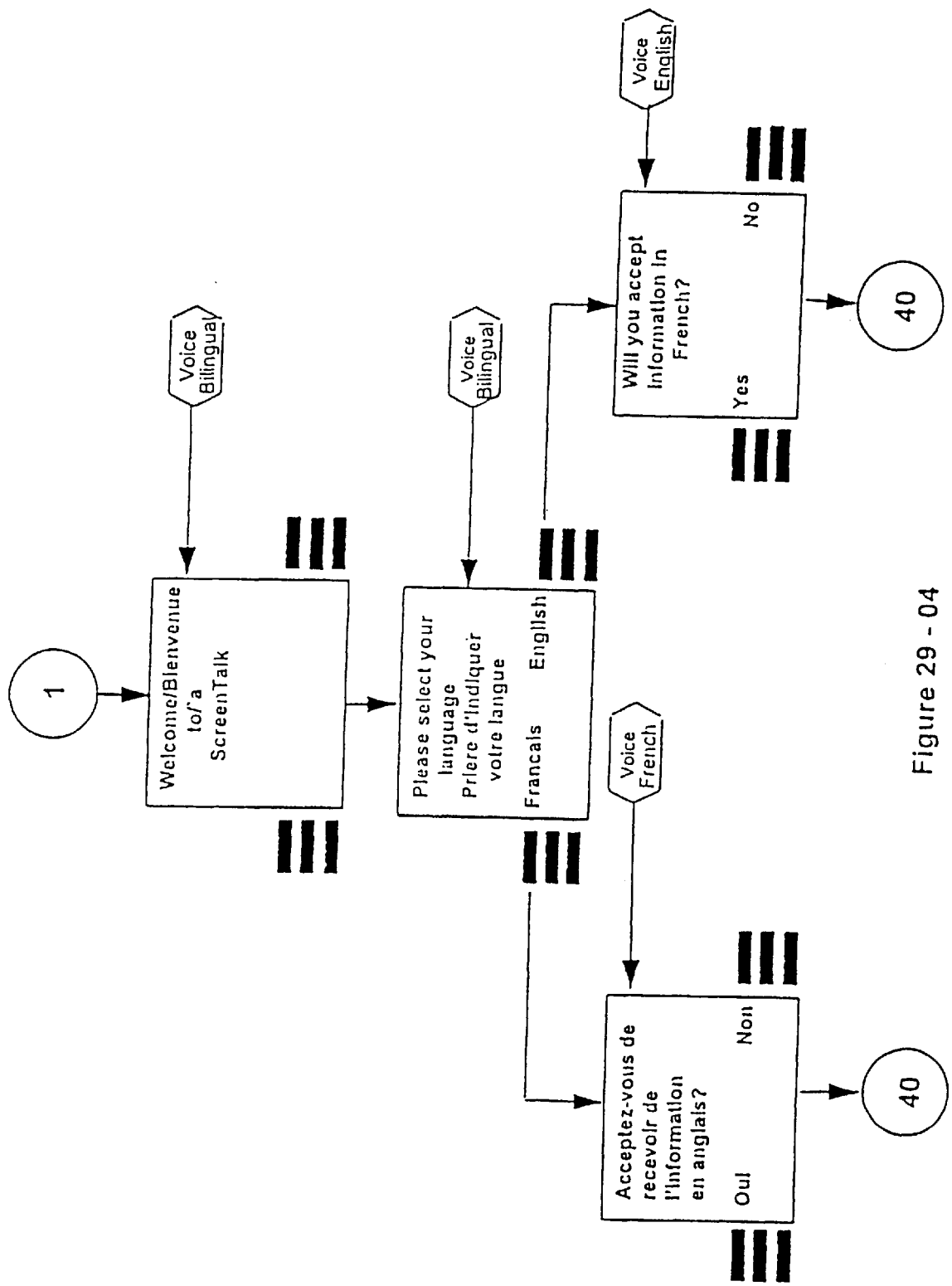
Figures 5, 29:
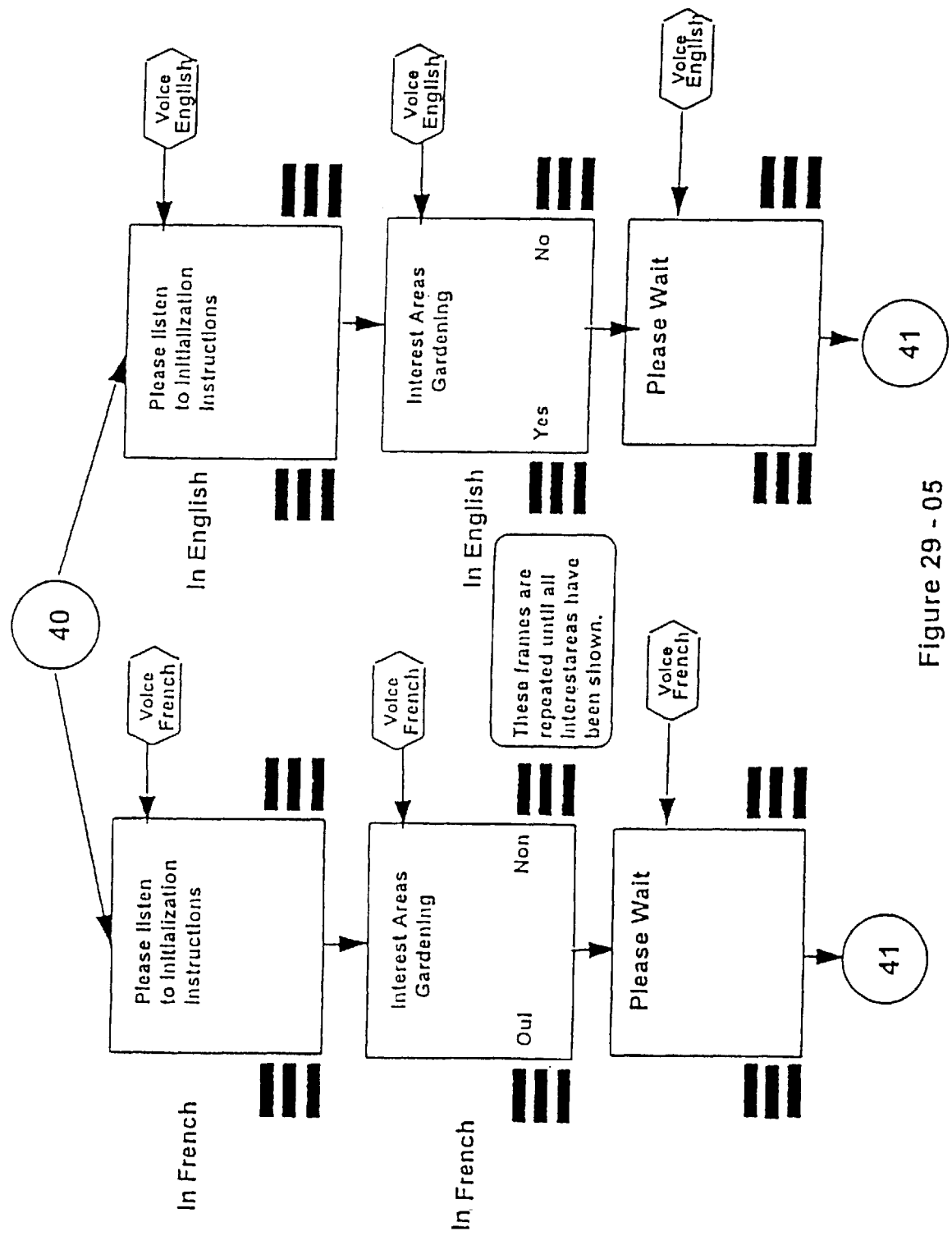
Figures 6, 29:
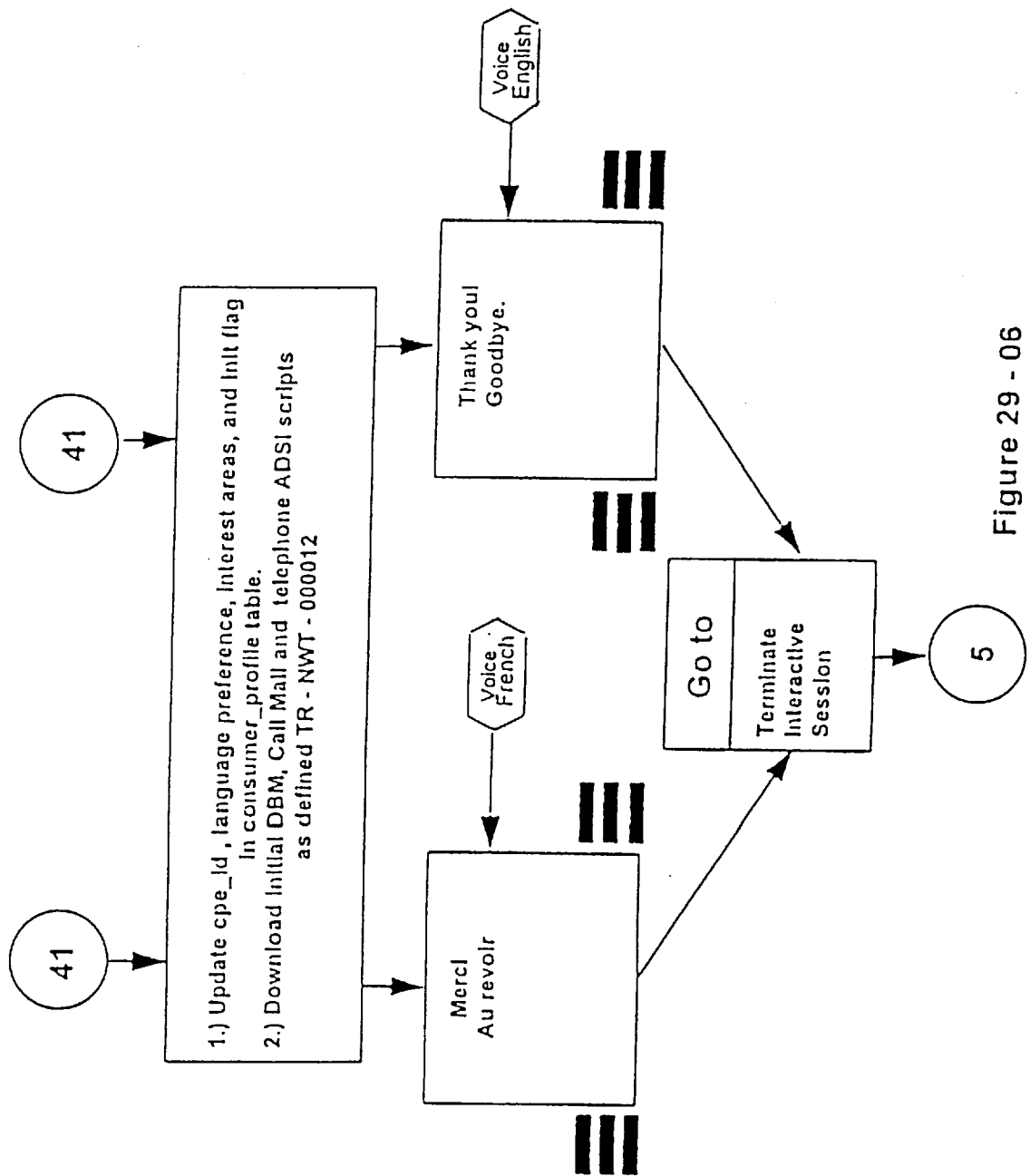
Figures 7, 29:
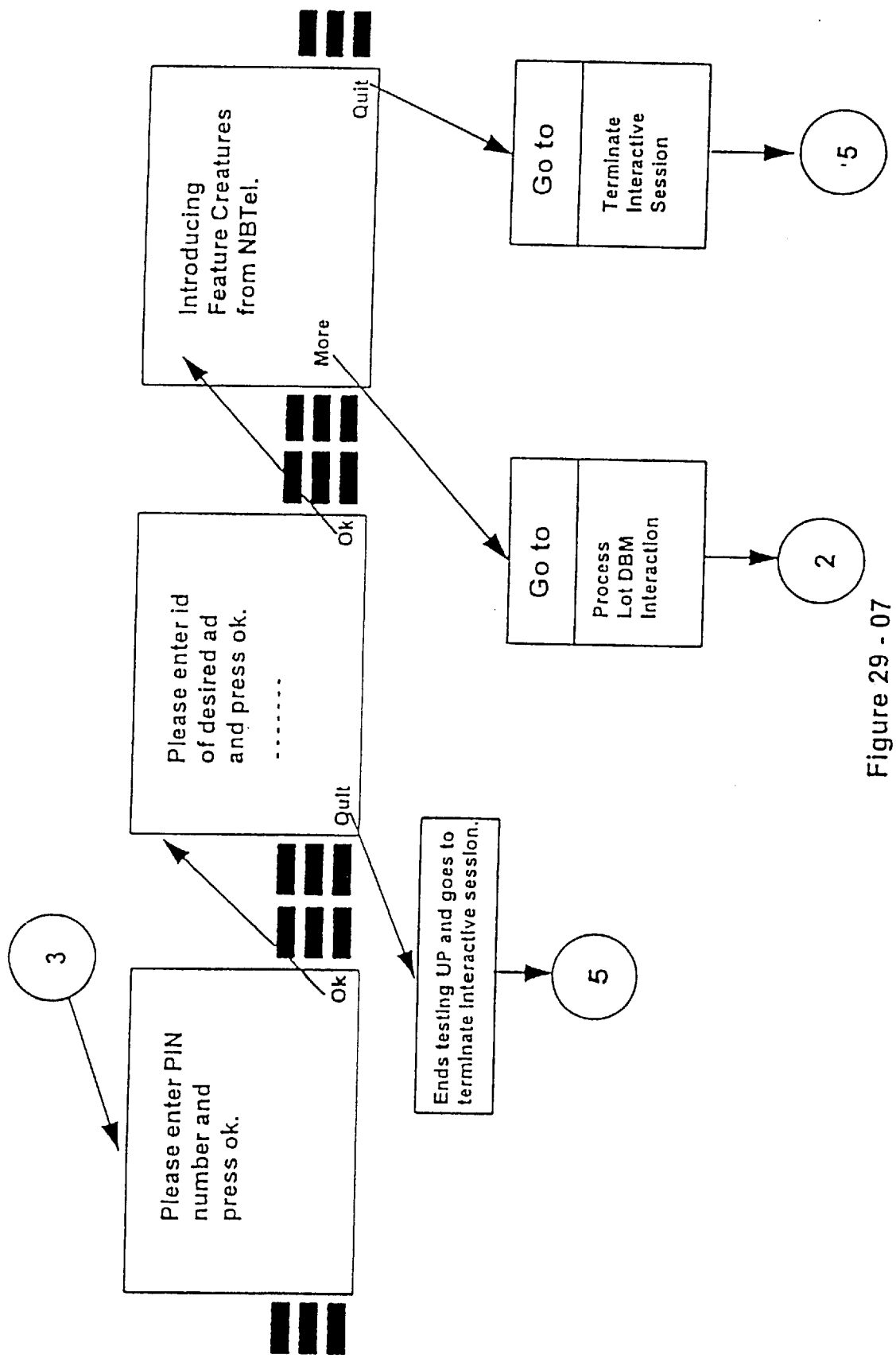
Figures 8, 29:
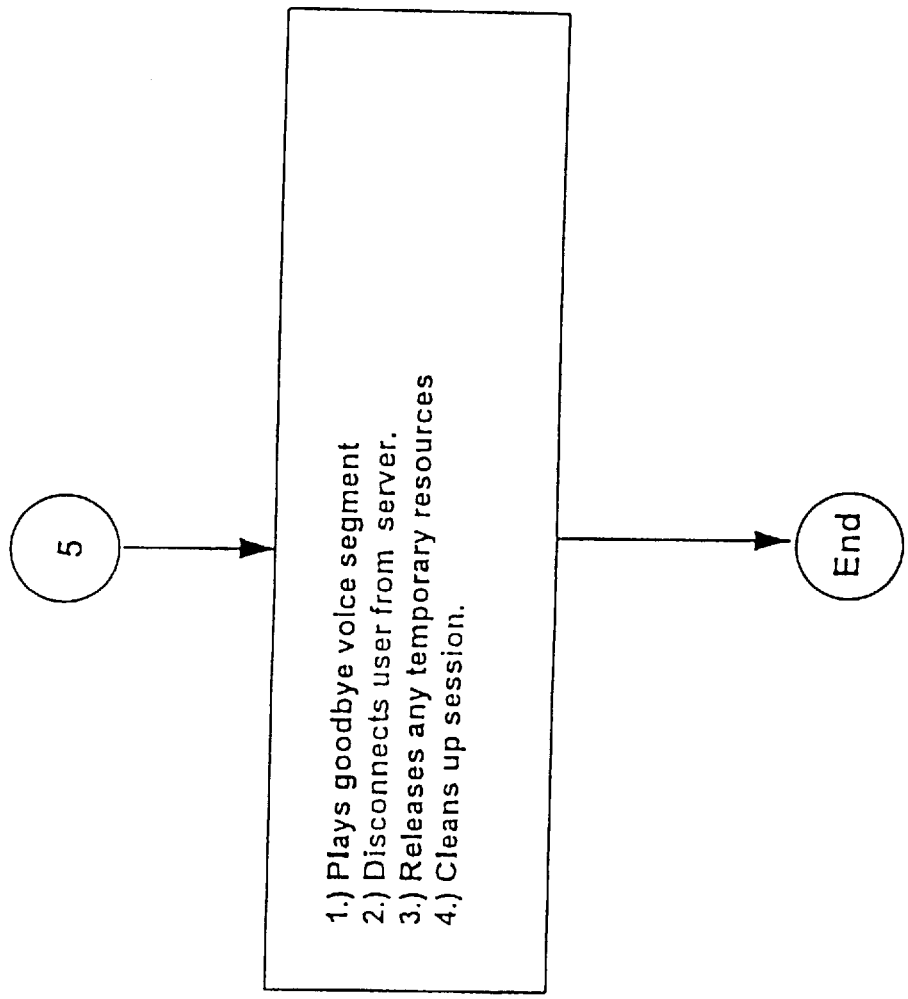
Figures 9, 29:
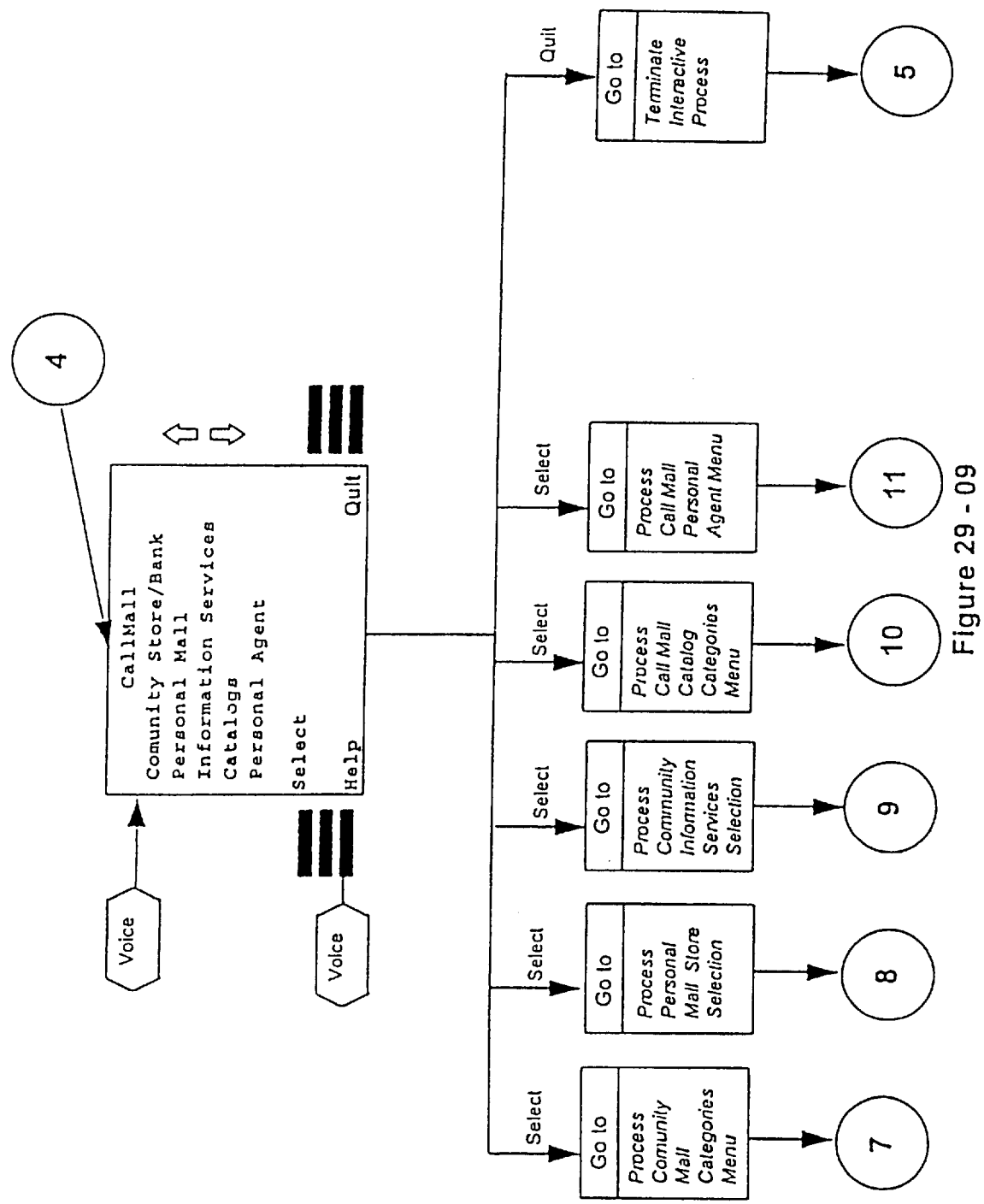
Figures 10, 29:
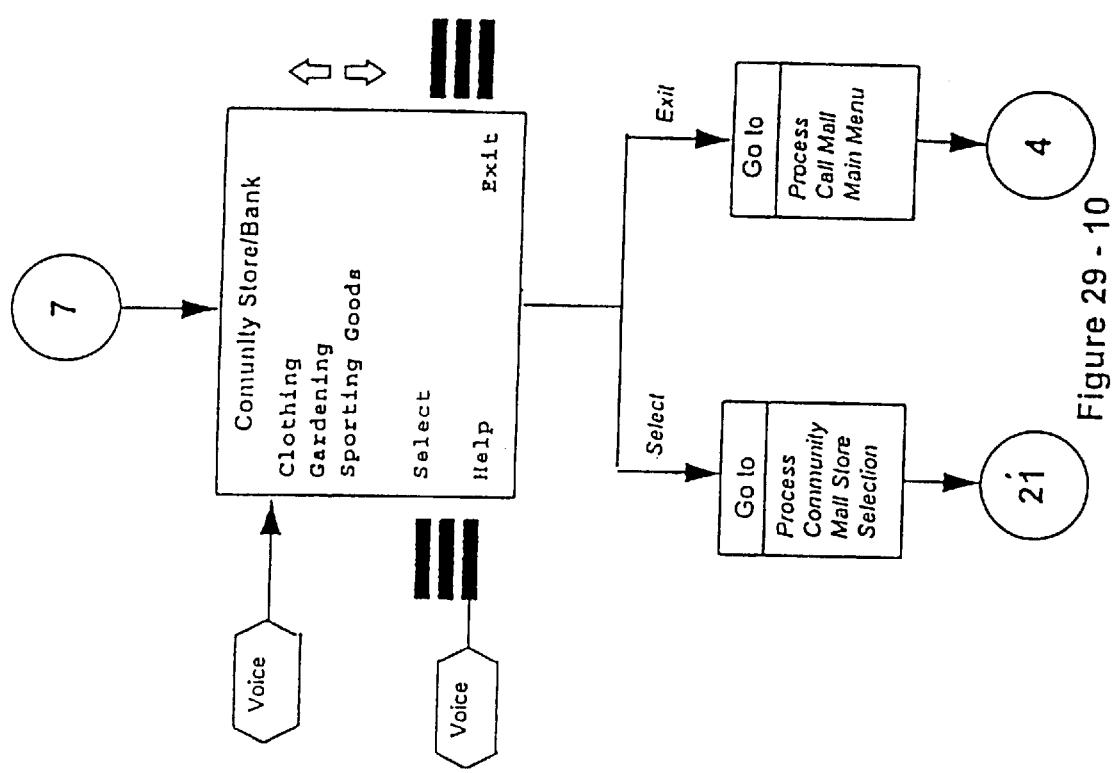
Figures 11, 29:
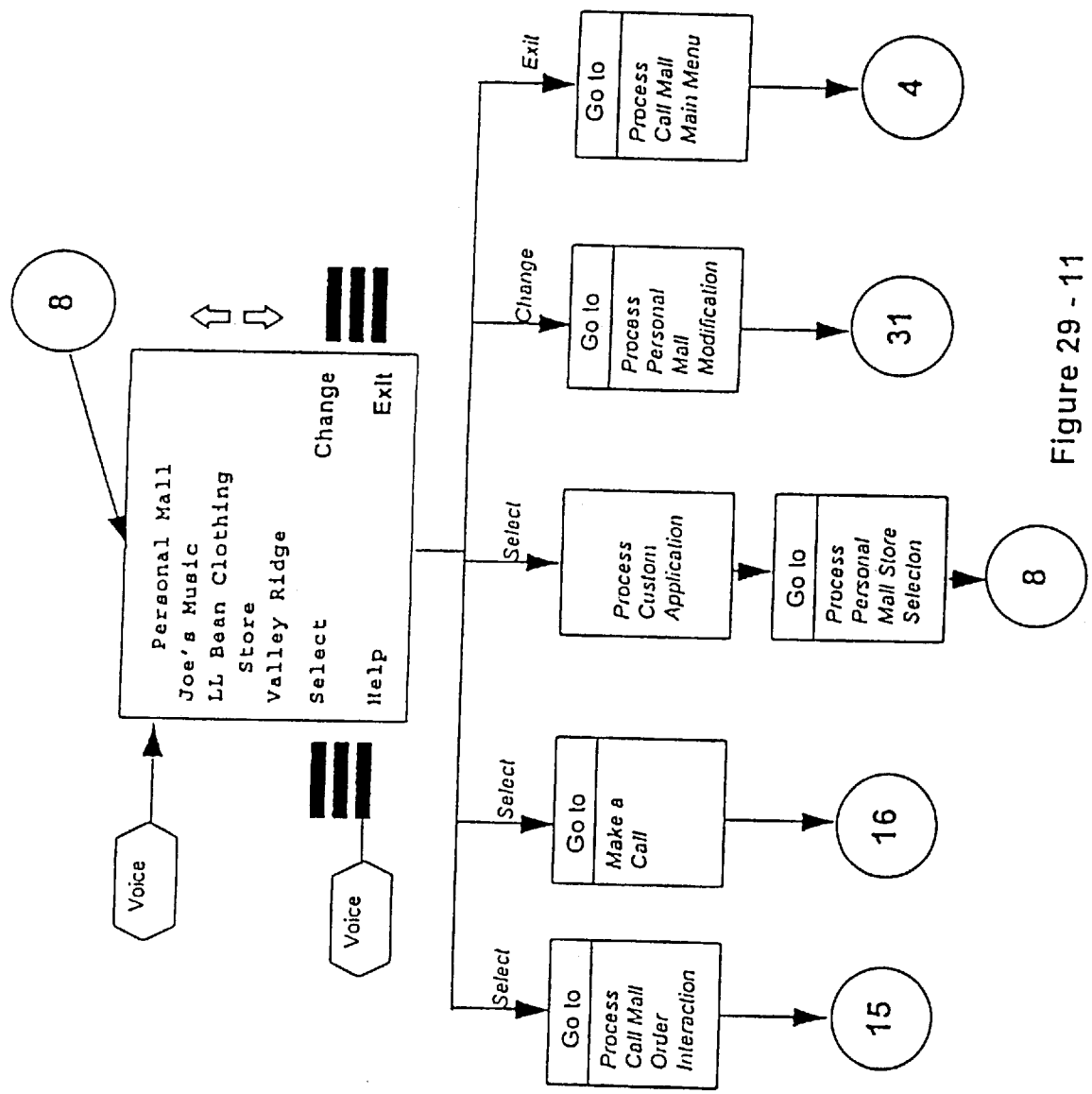
Figures 12, 29:
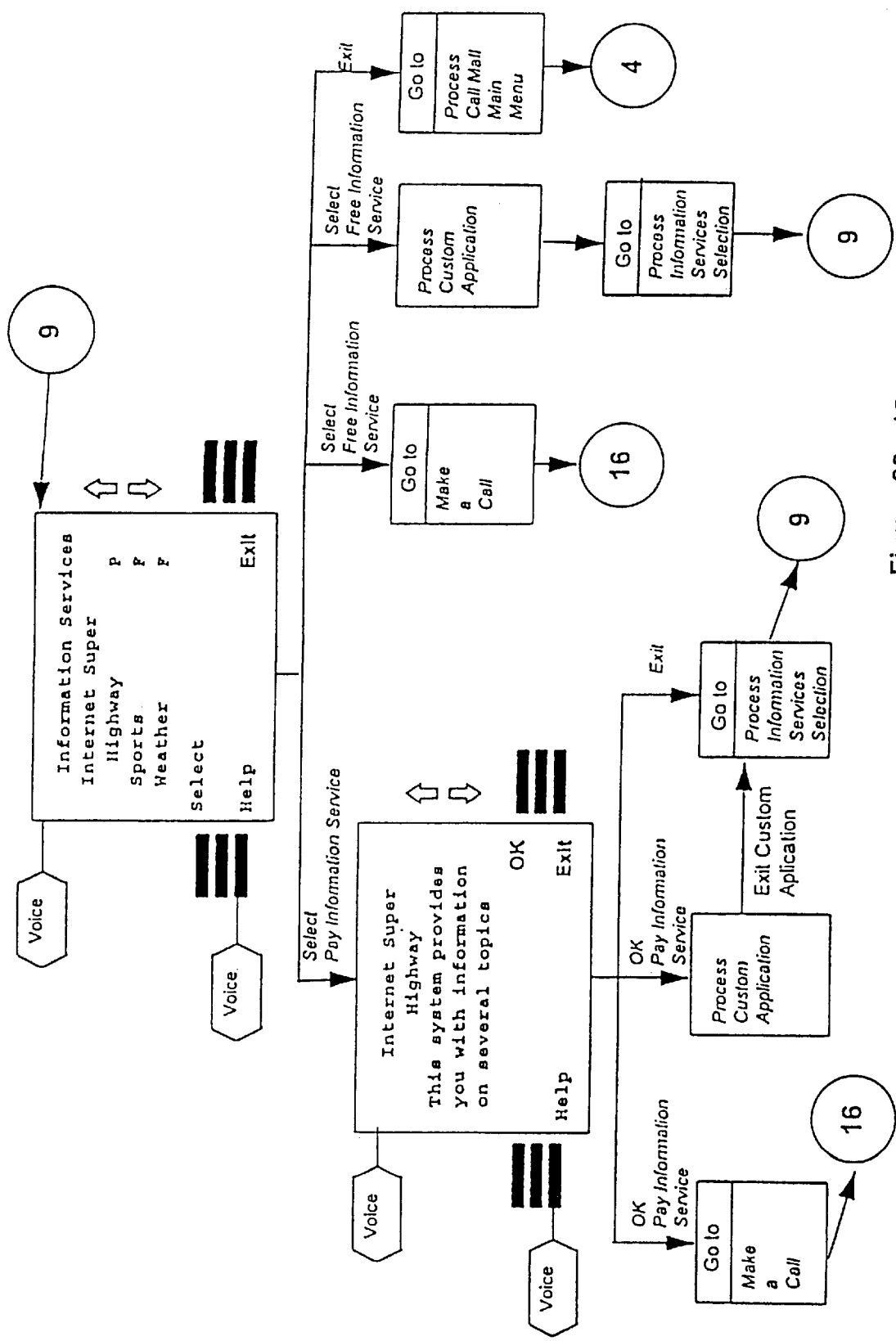
Figures 13, 29:
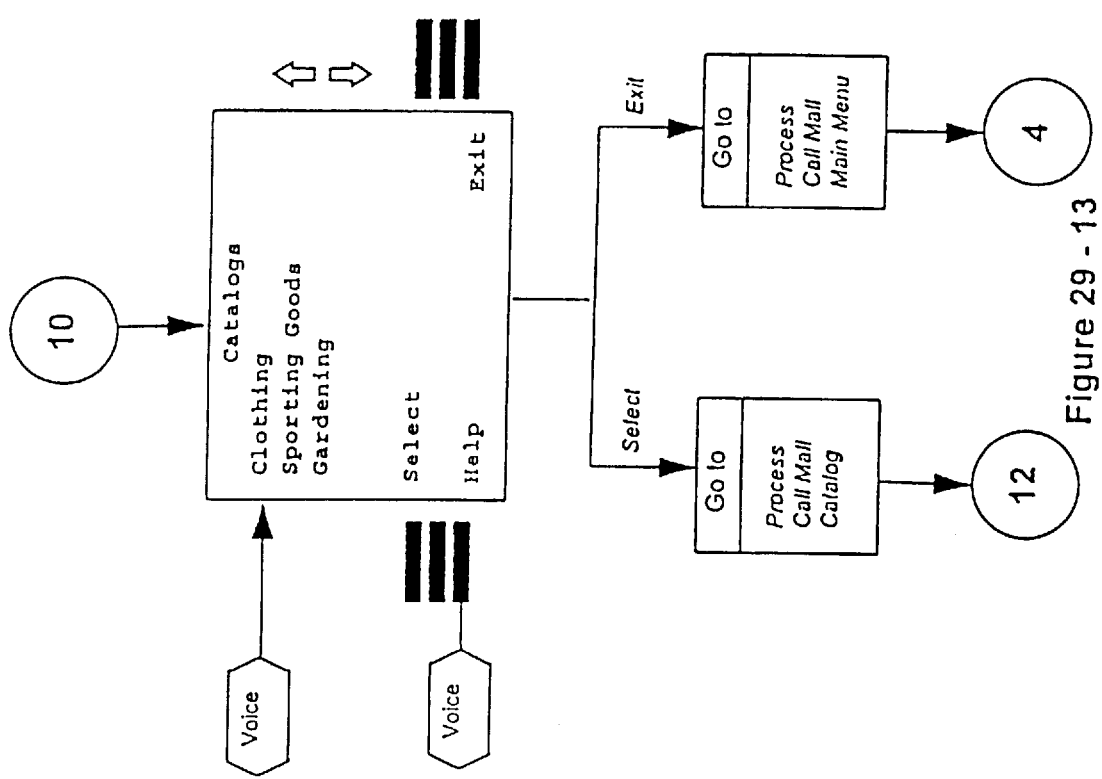
Figures 14, 29:
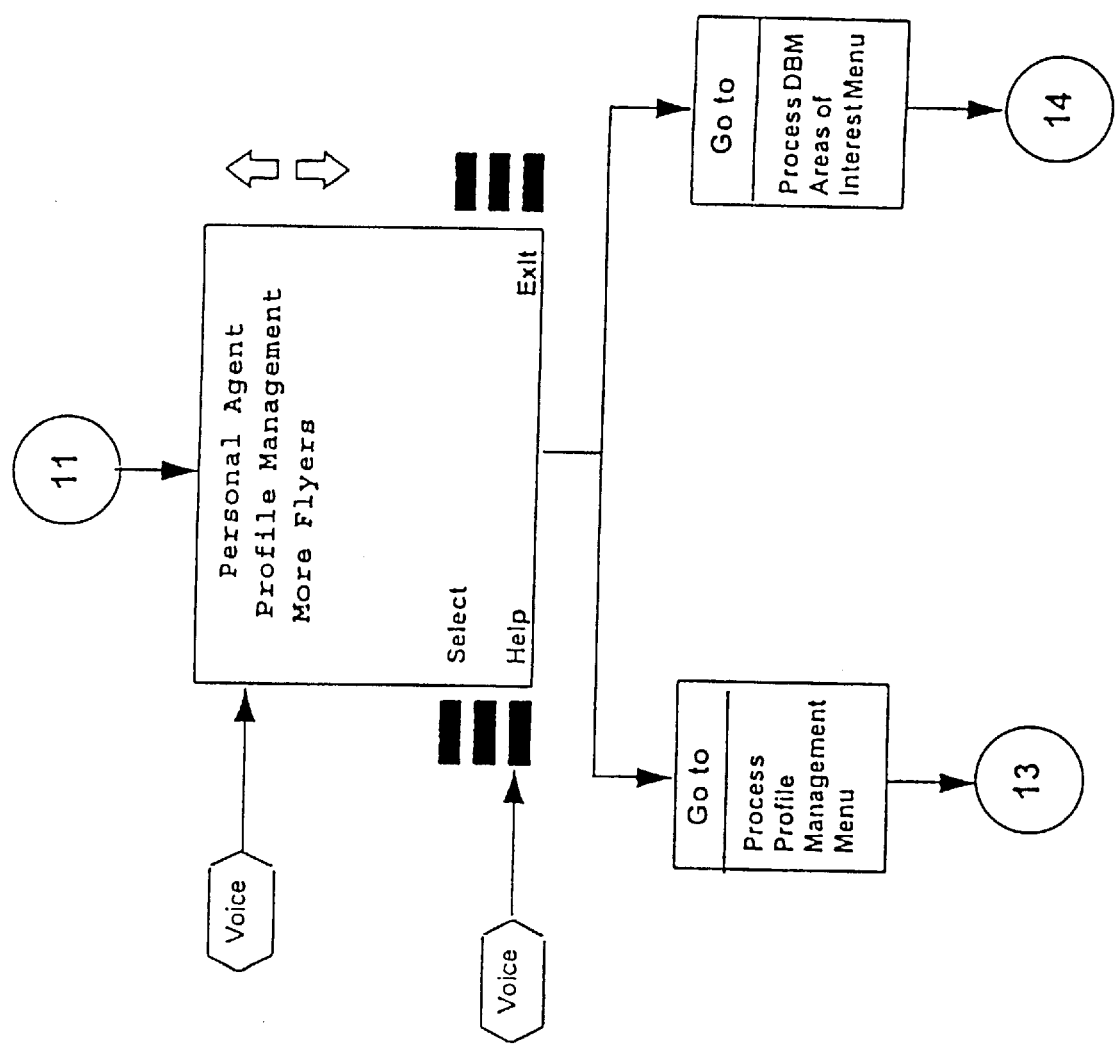
Figures 15, 29:
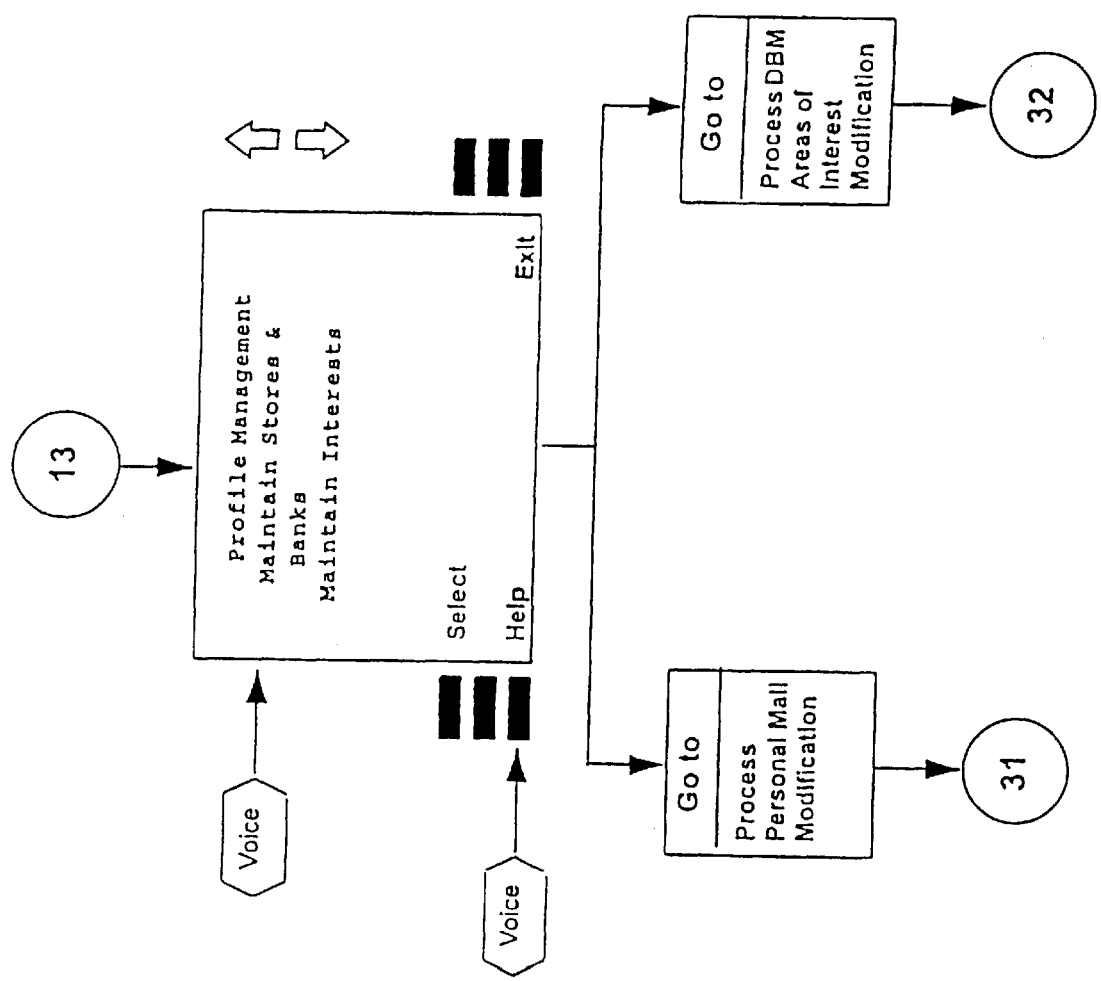
Figures 16, 29:
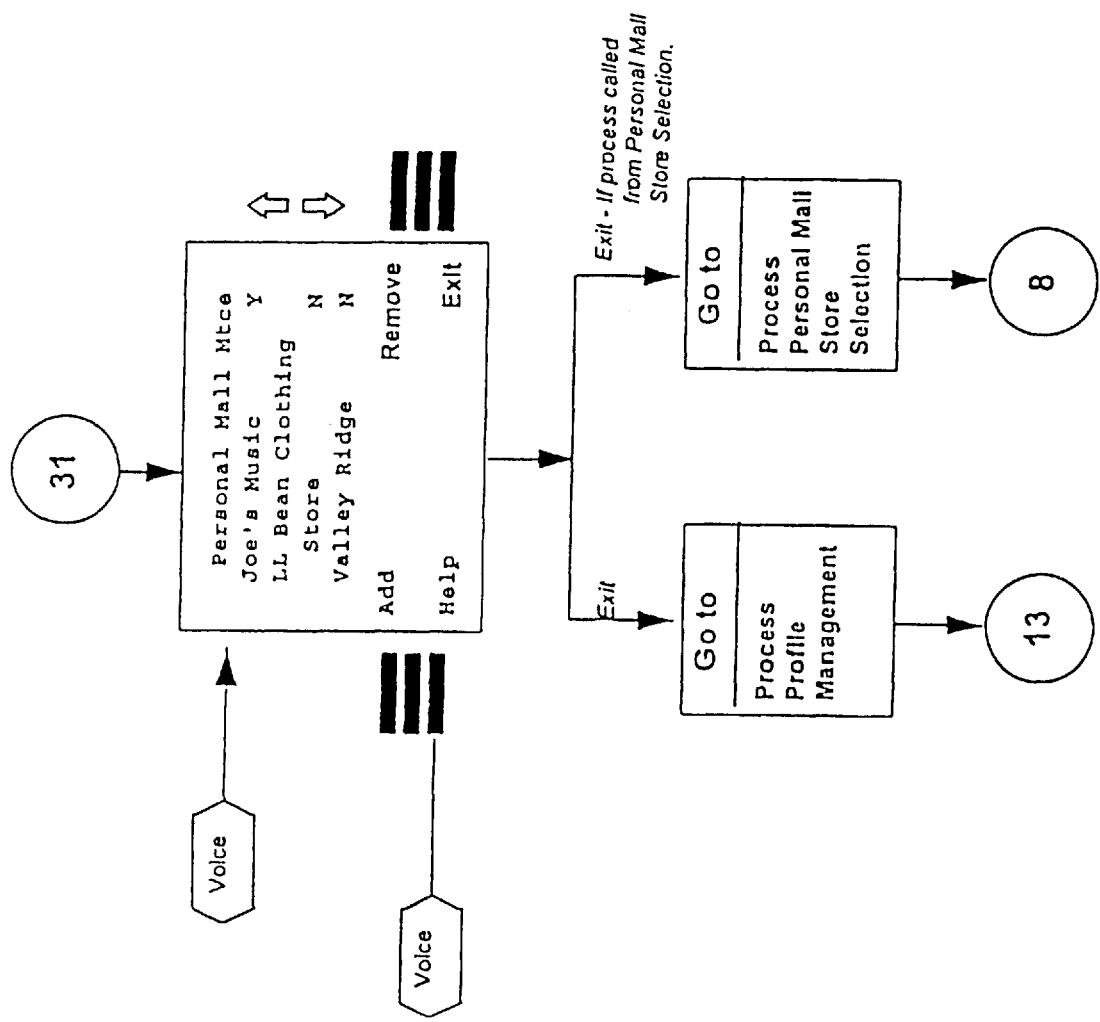
Figures 17, 29:
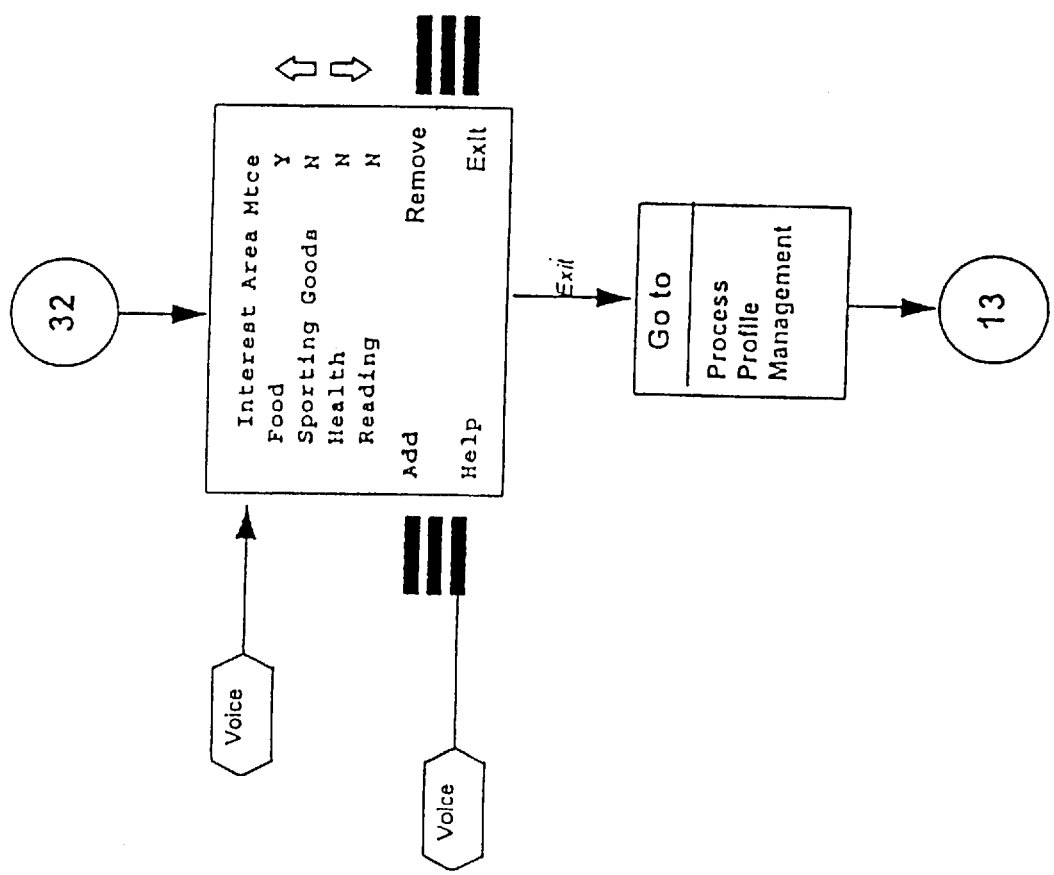
Figures 18, 29:
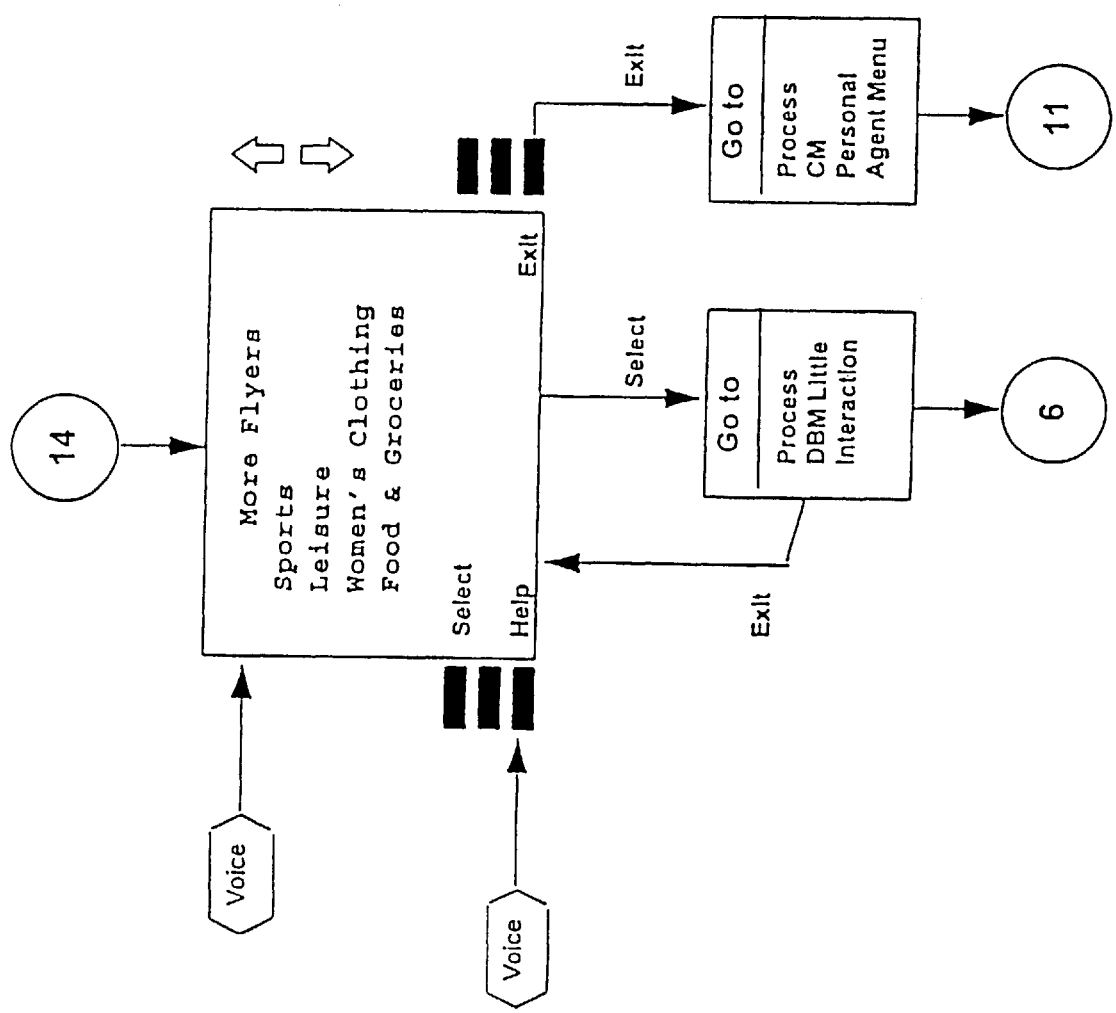
Figures 19, 29:
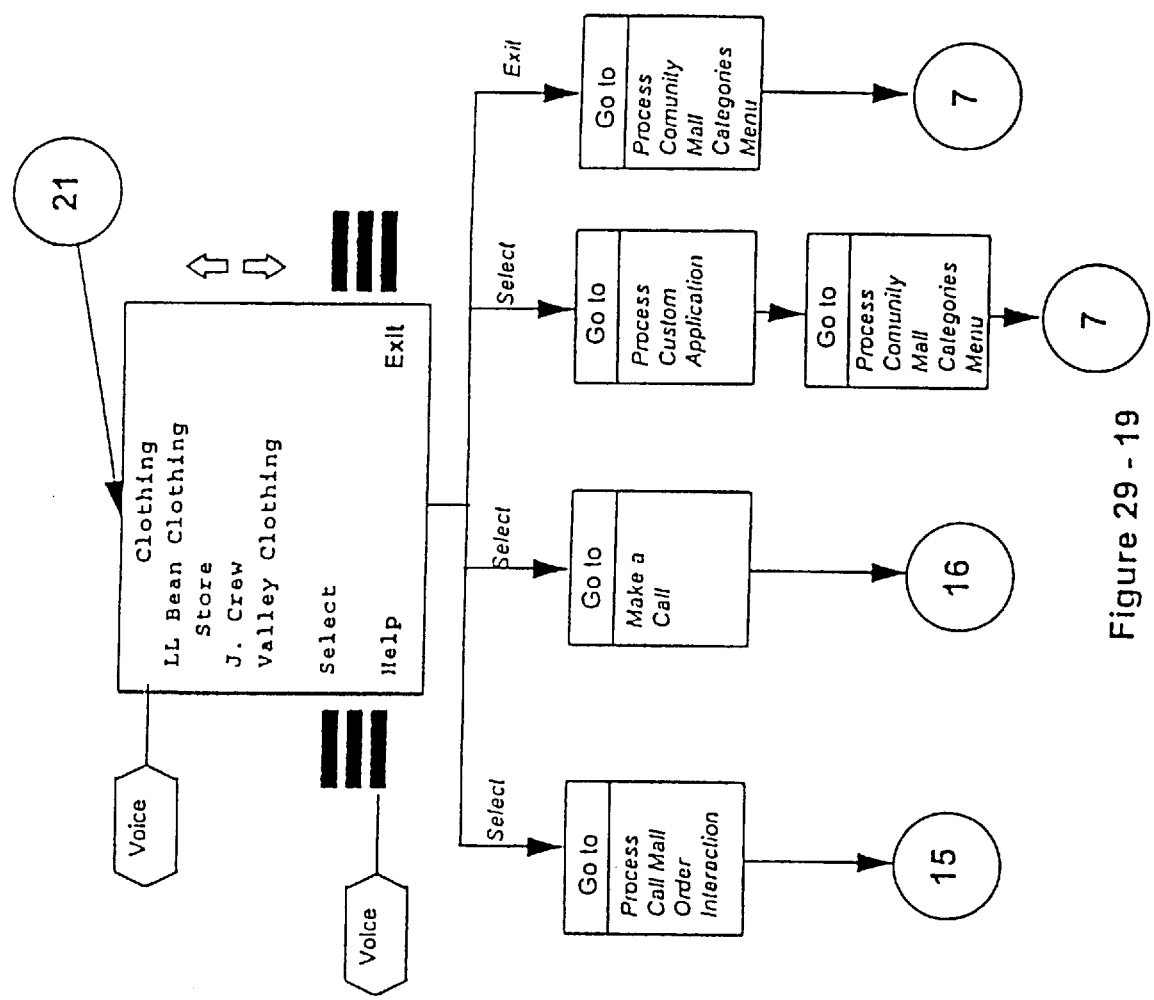
Figures 20, 29:
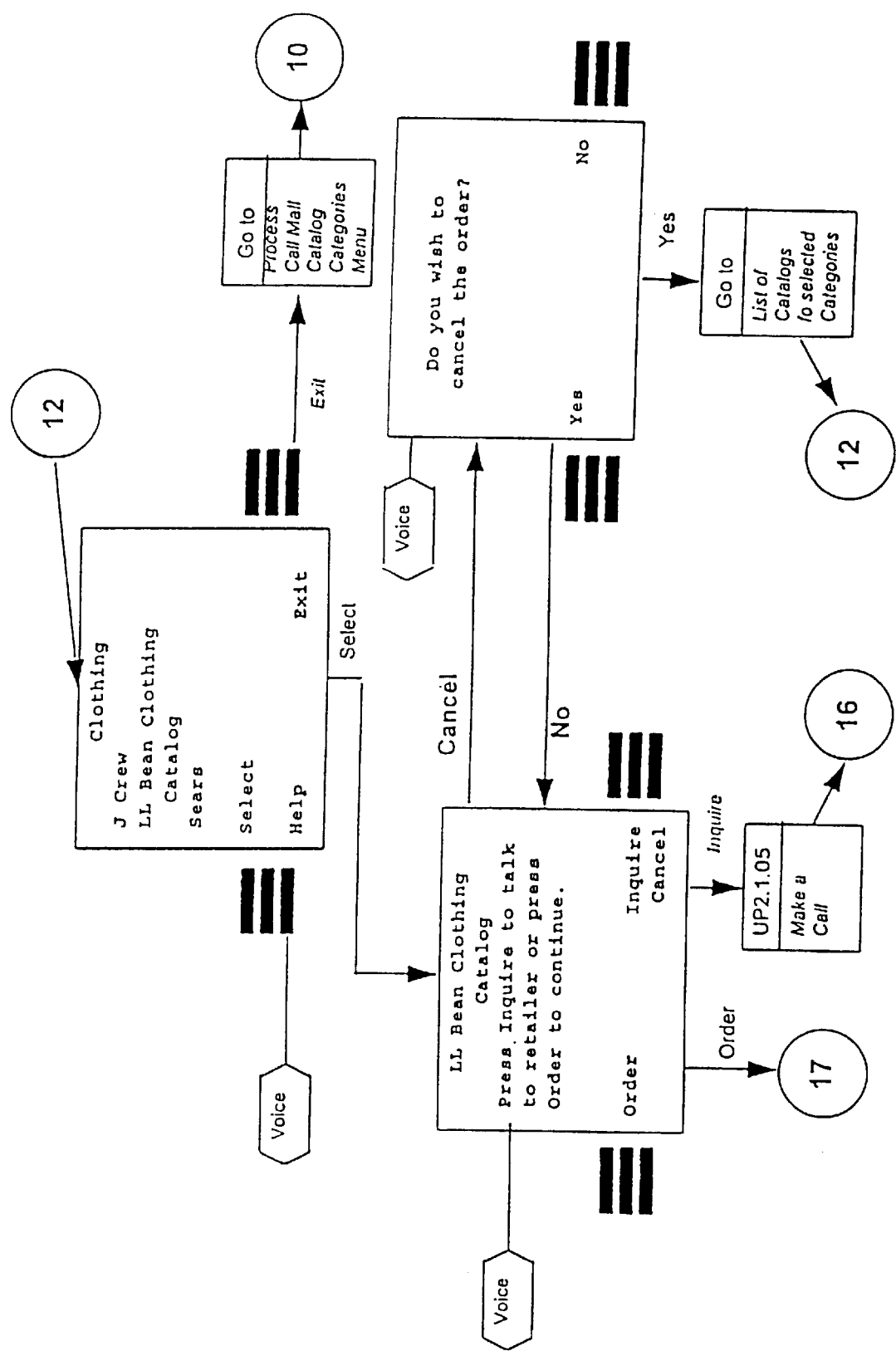
Figures 21, 29:
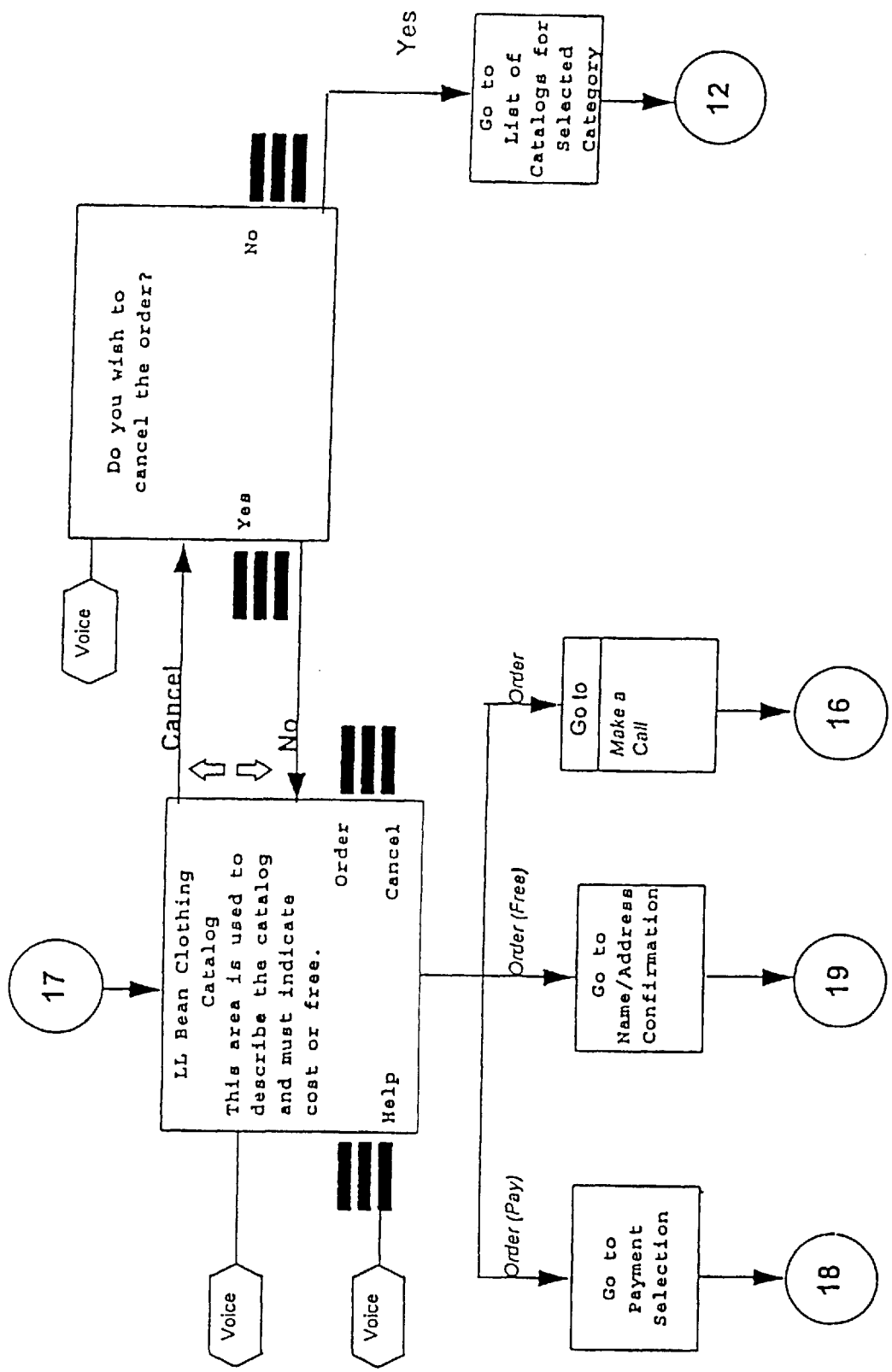
Figures 22, 29:
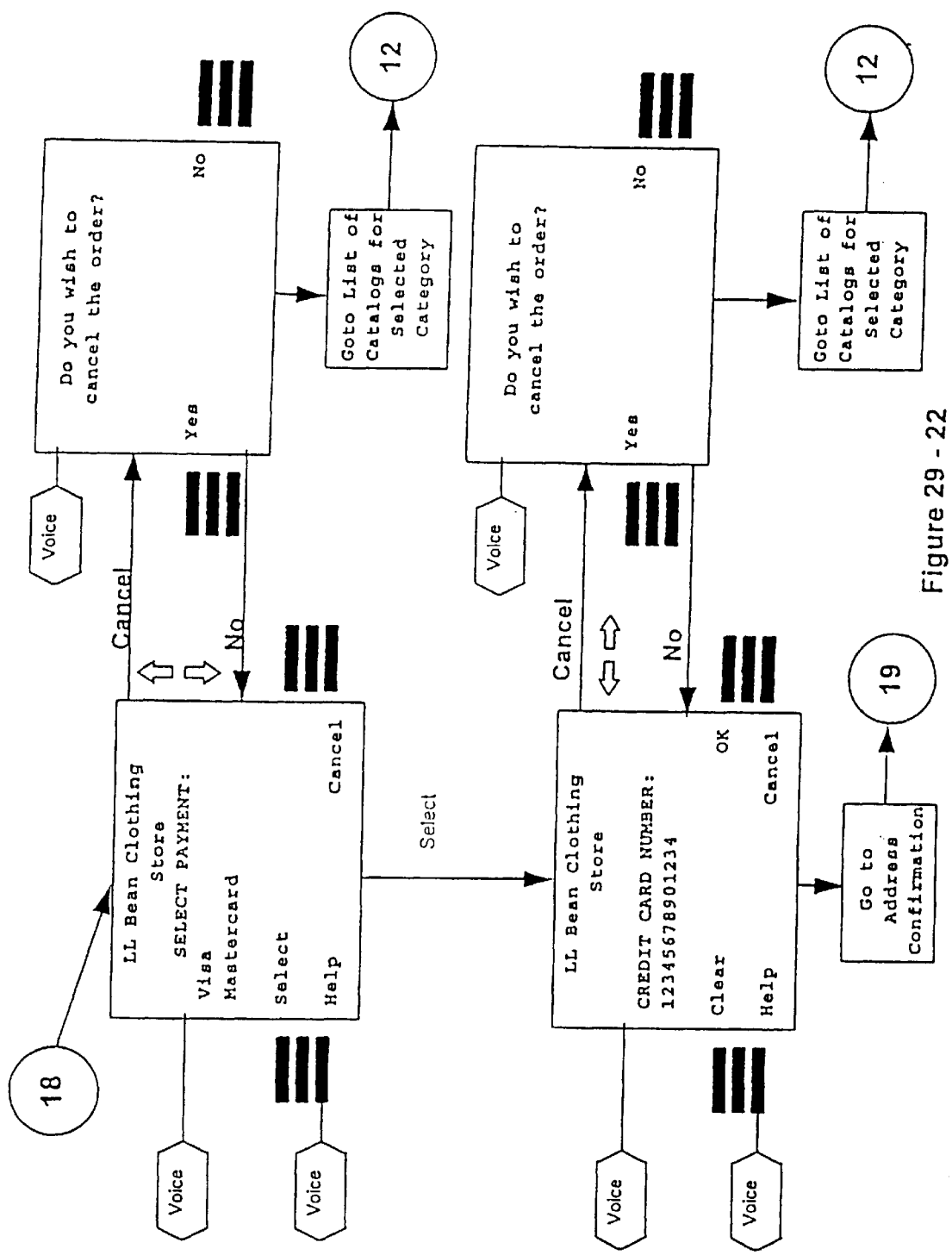
Figures 23, 29:
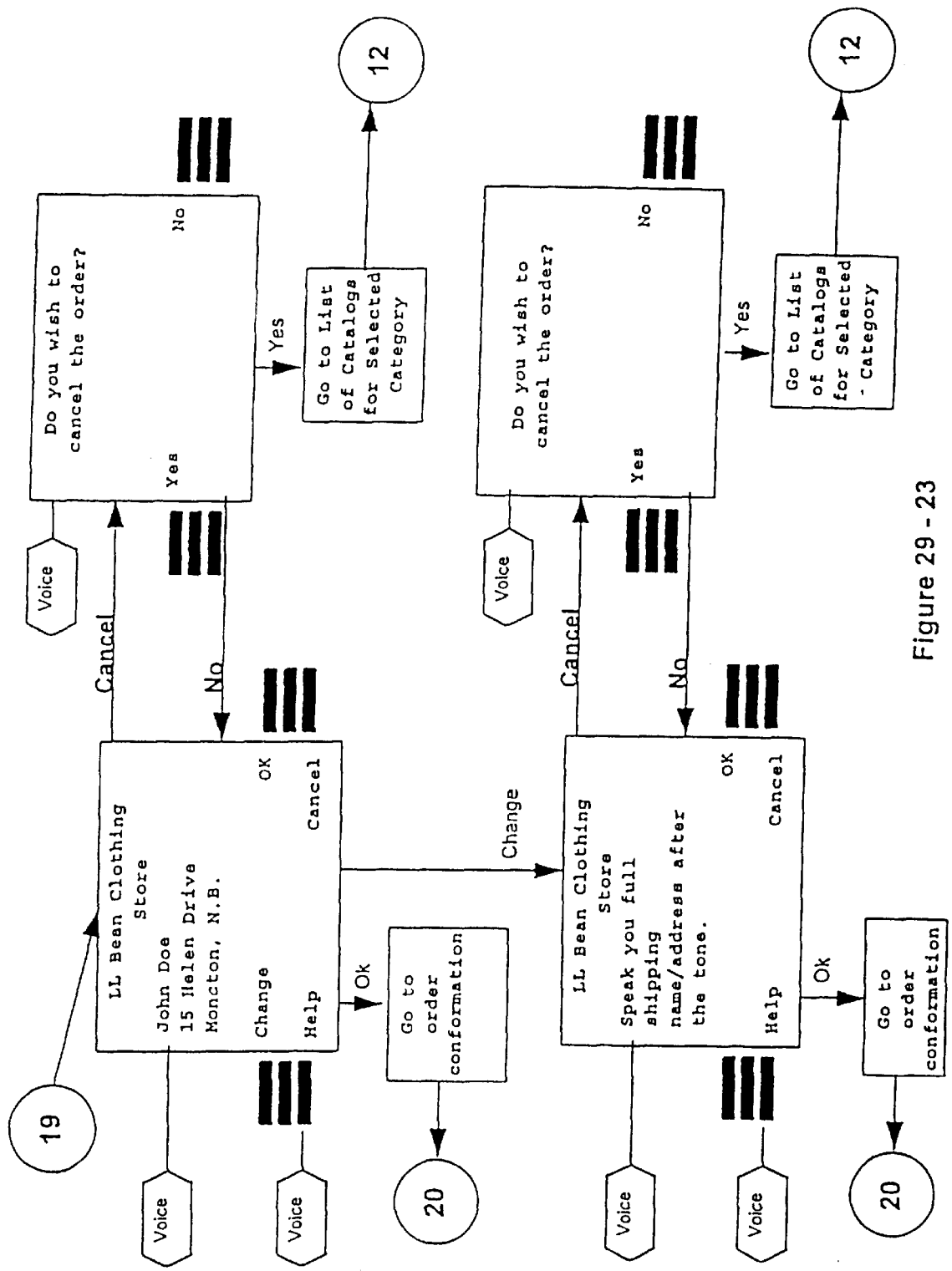
Figures 24, 29:
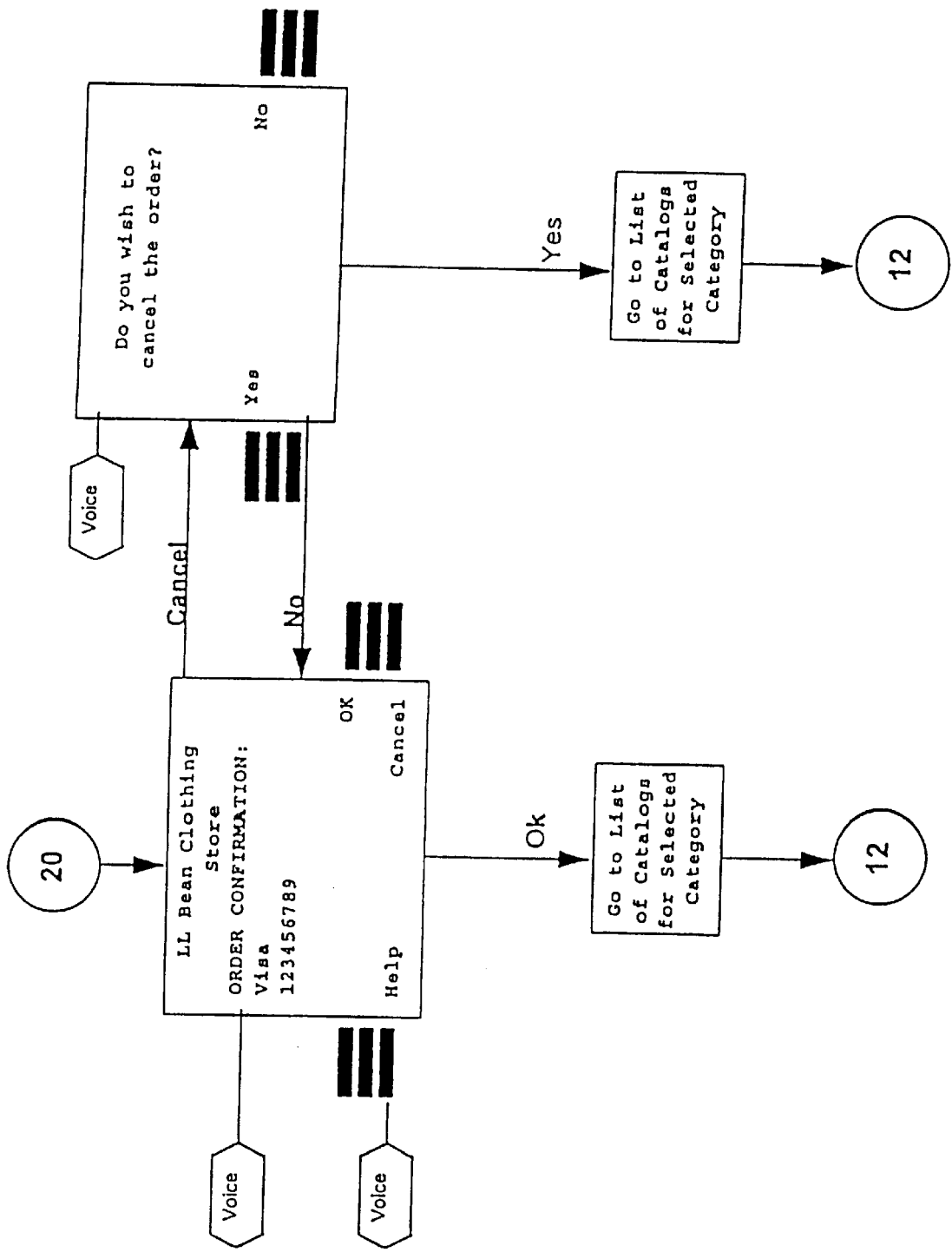
Figures 25, 29:
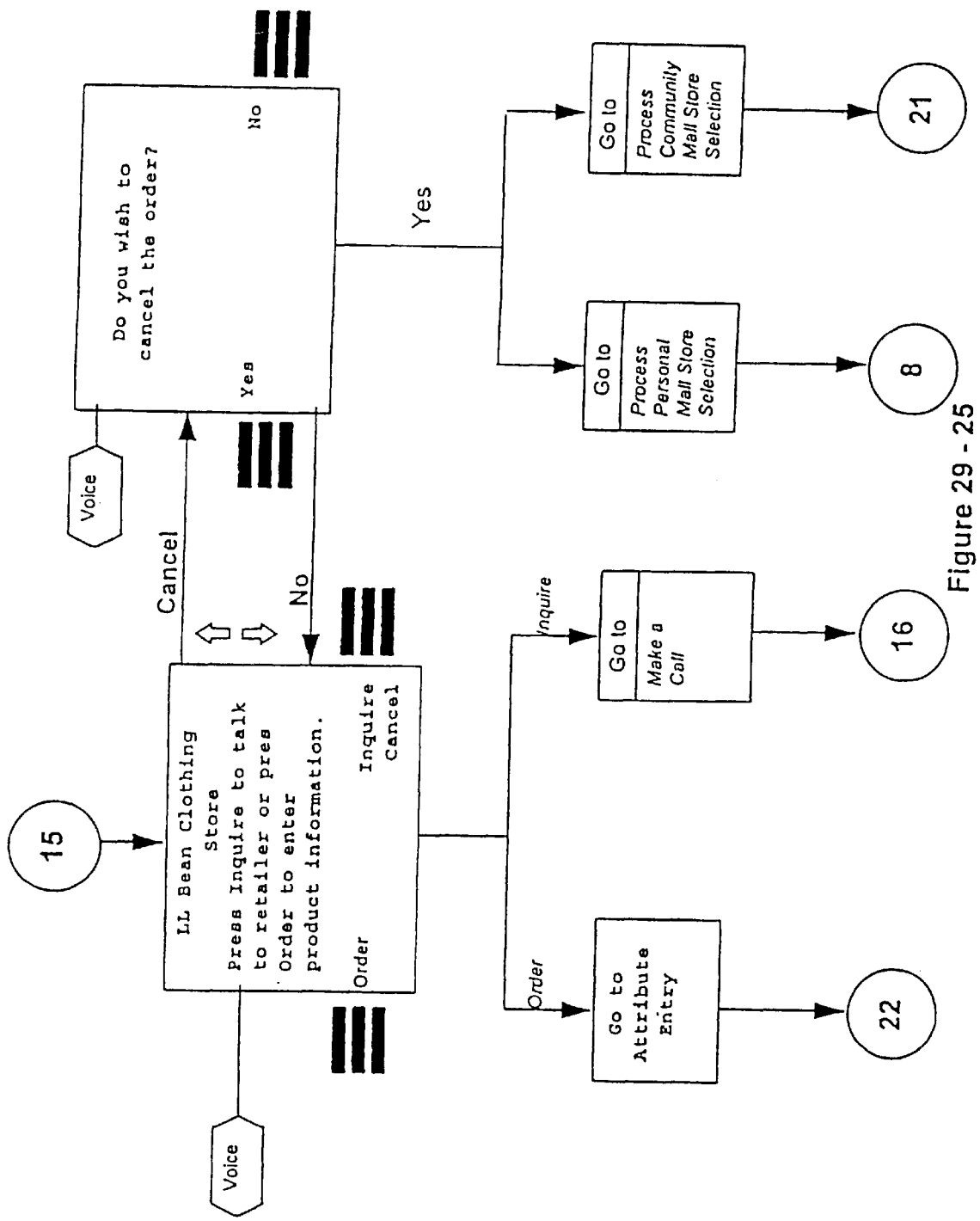
Figures 26, 29:
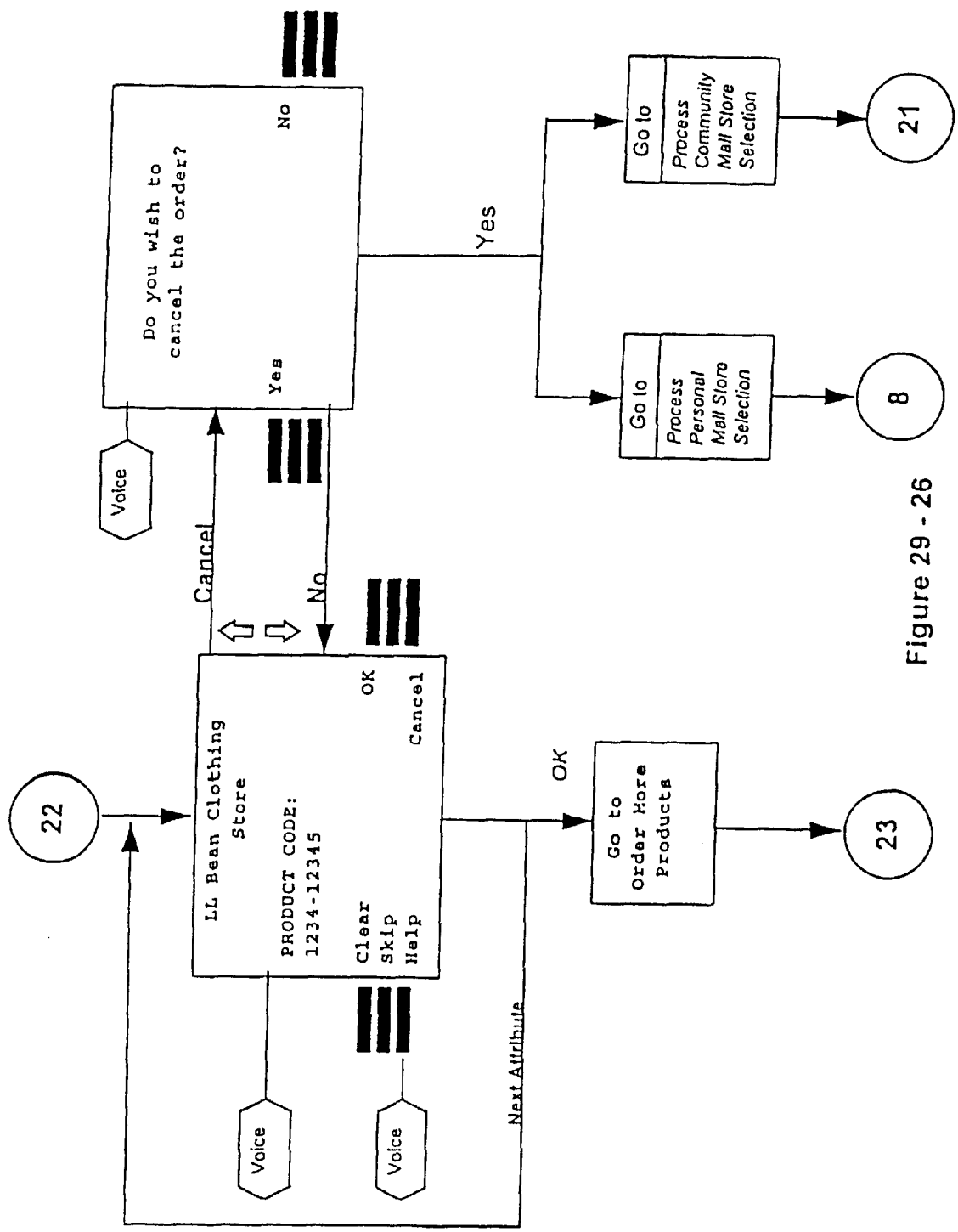
Figures 27, 29:
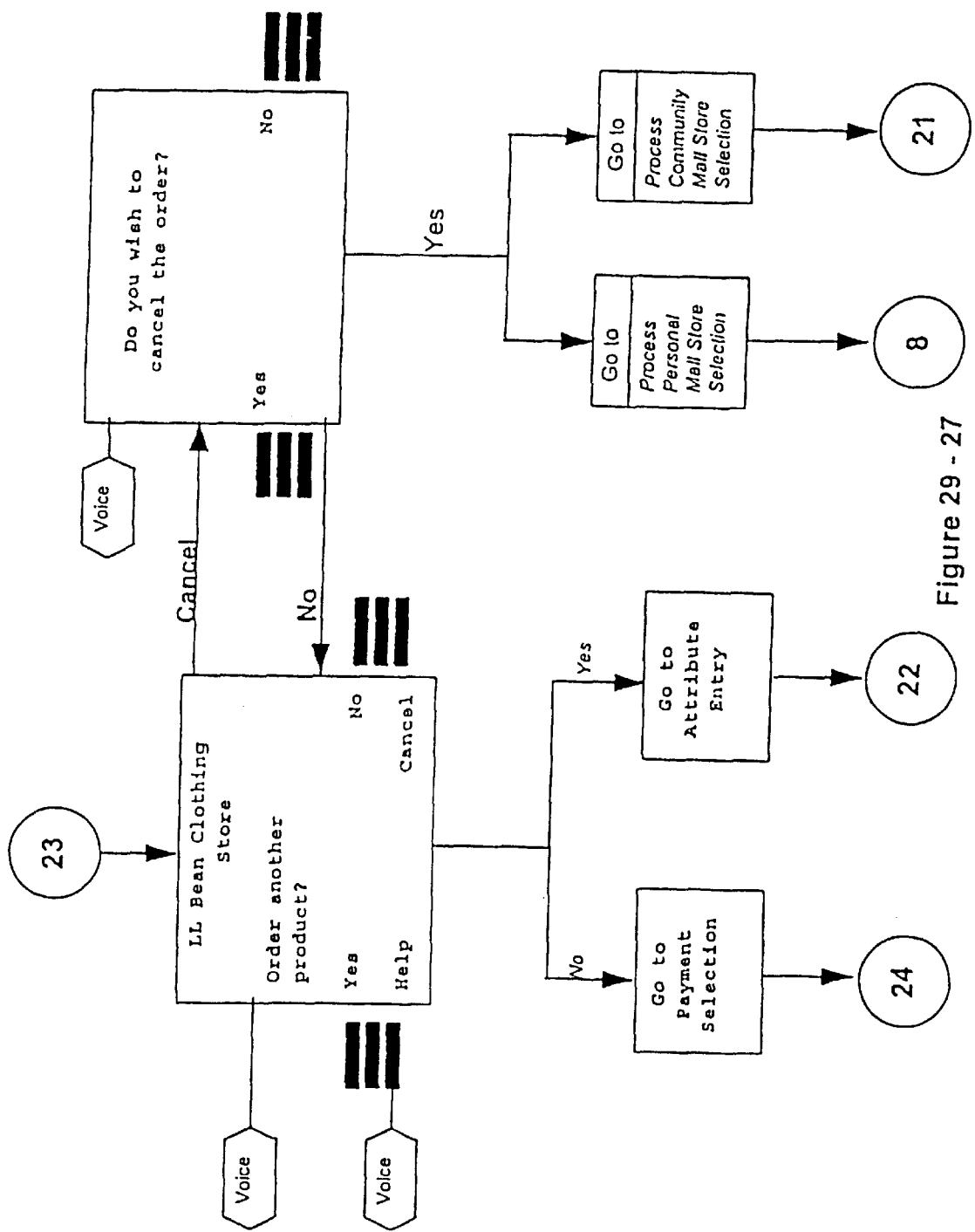
Figures 28, 29:
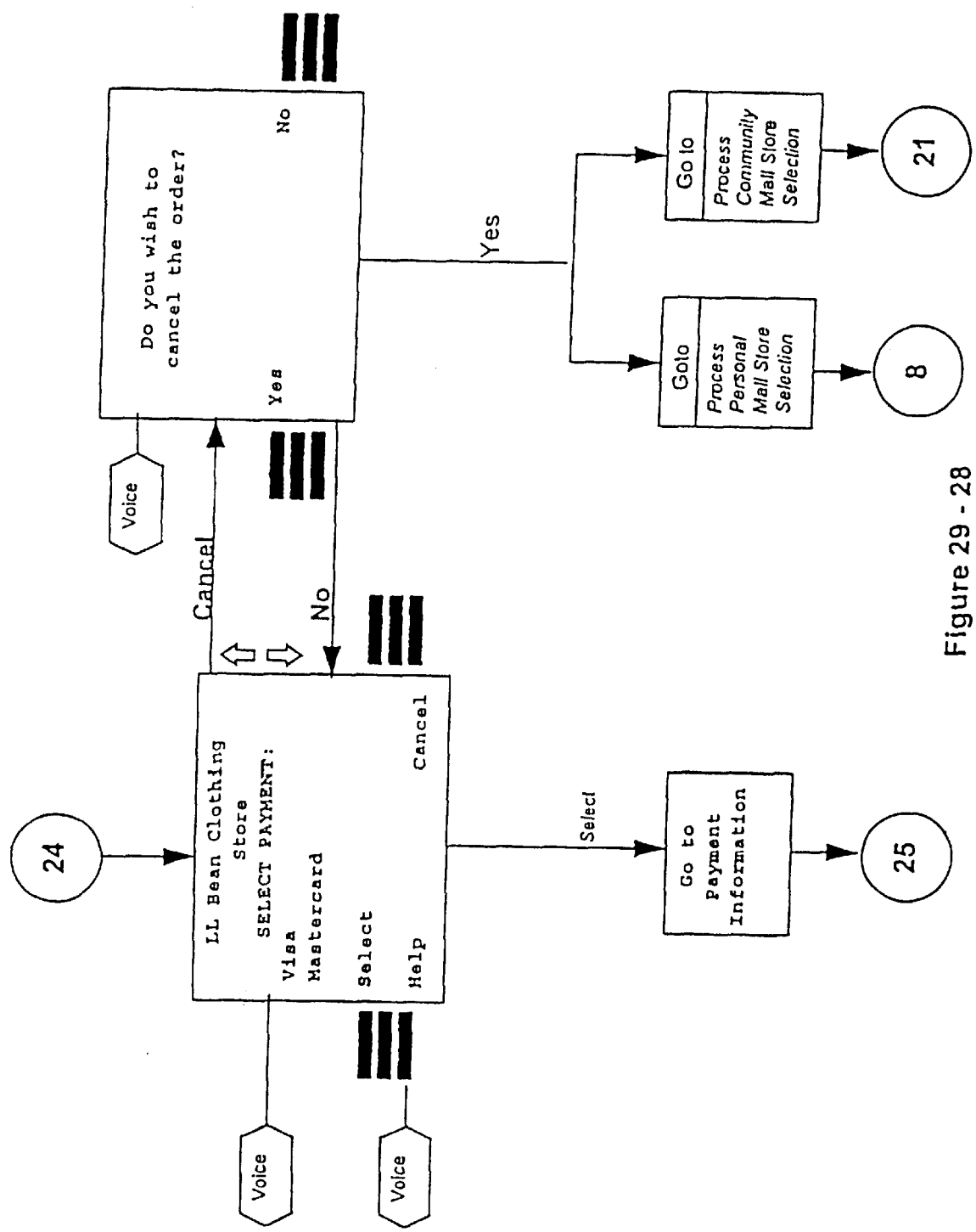
Figure 29:
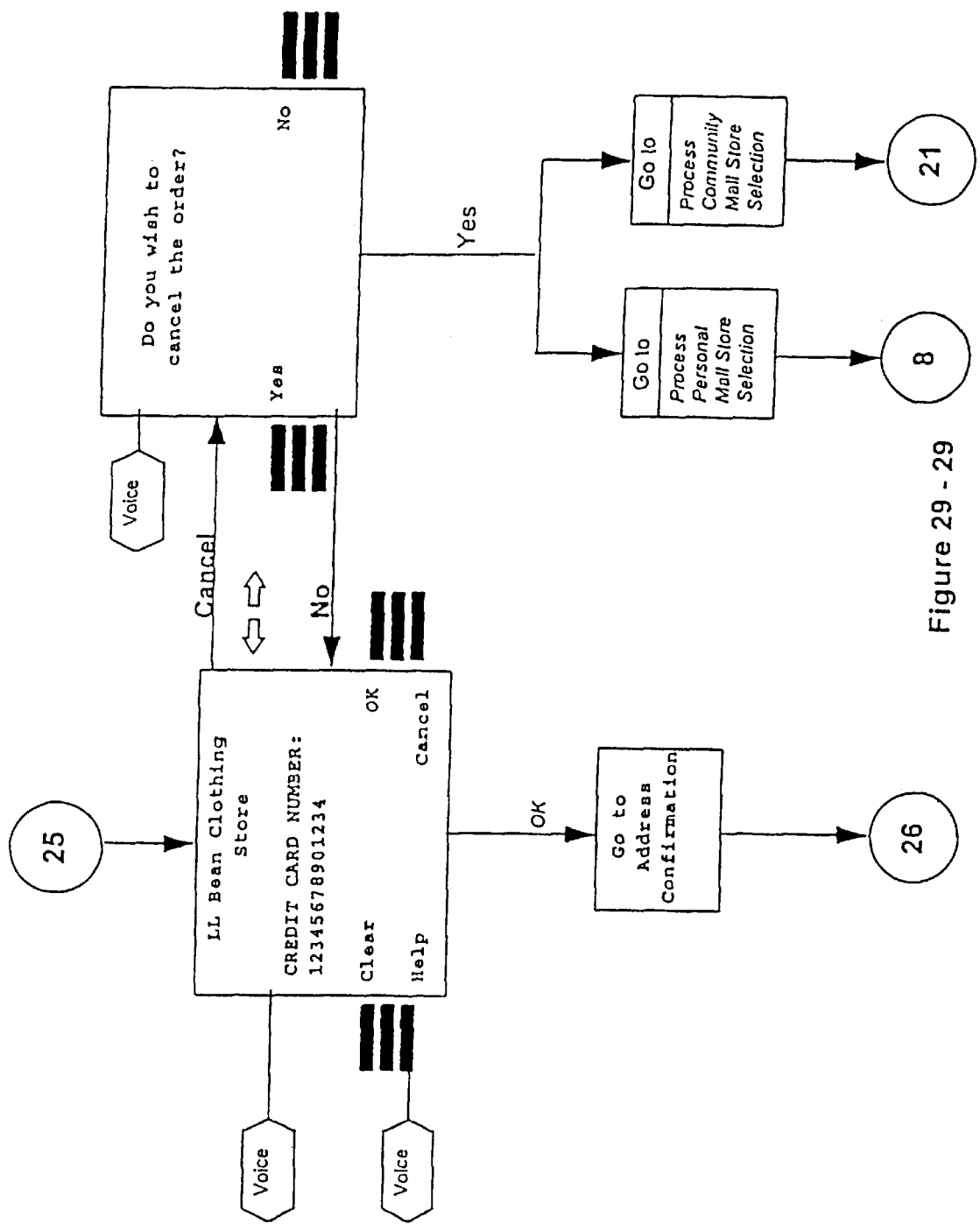
Figures 29, 30:
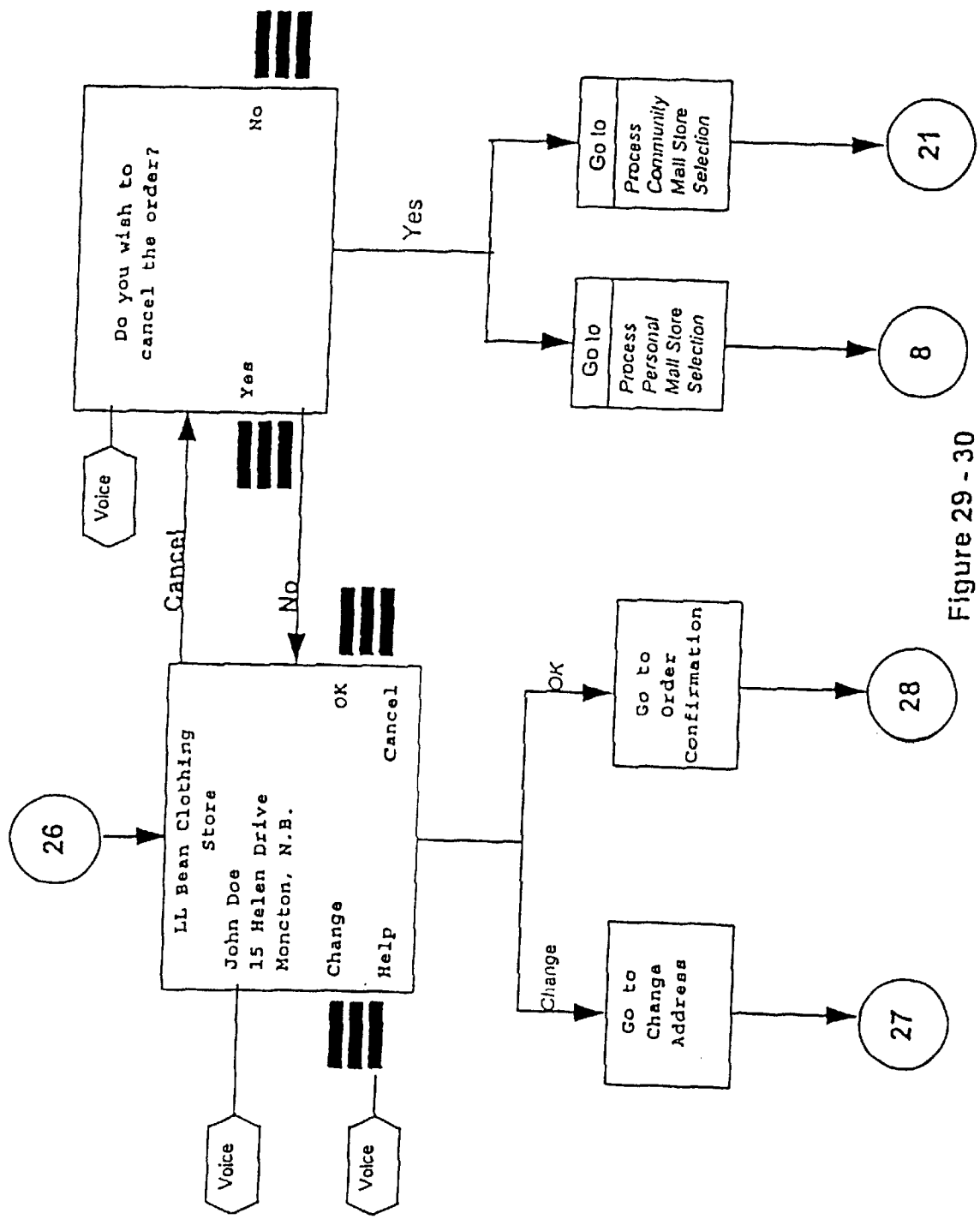
Figures 29, 30, 31:
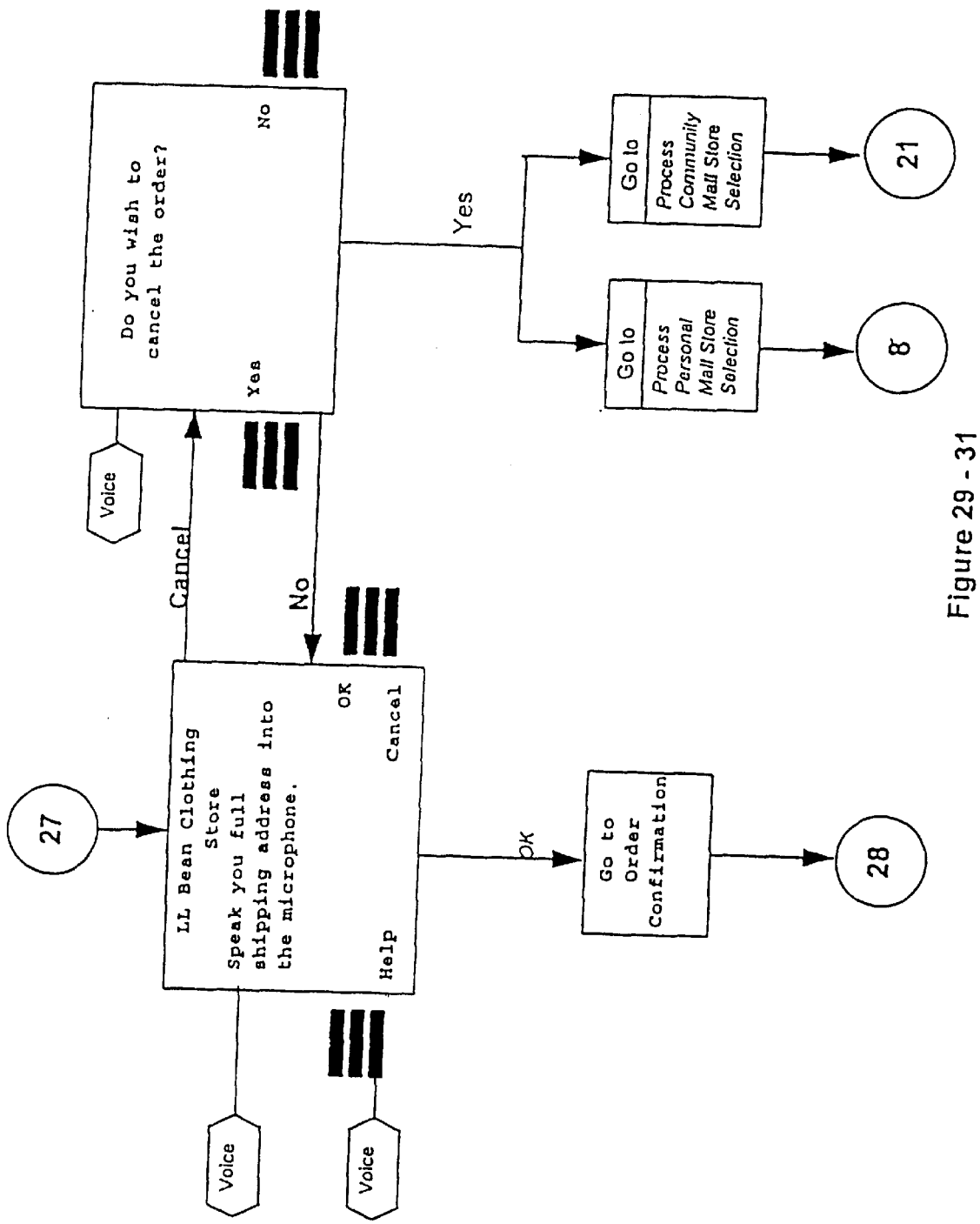
Figures 29, 30, 31, 32:
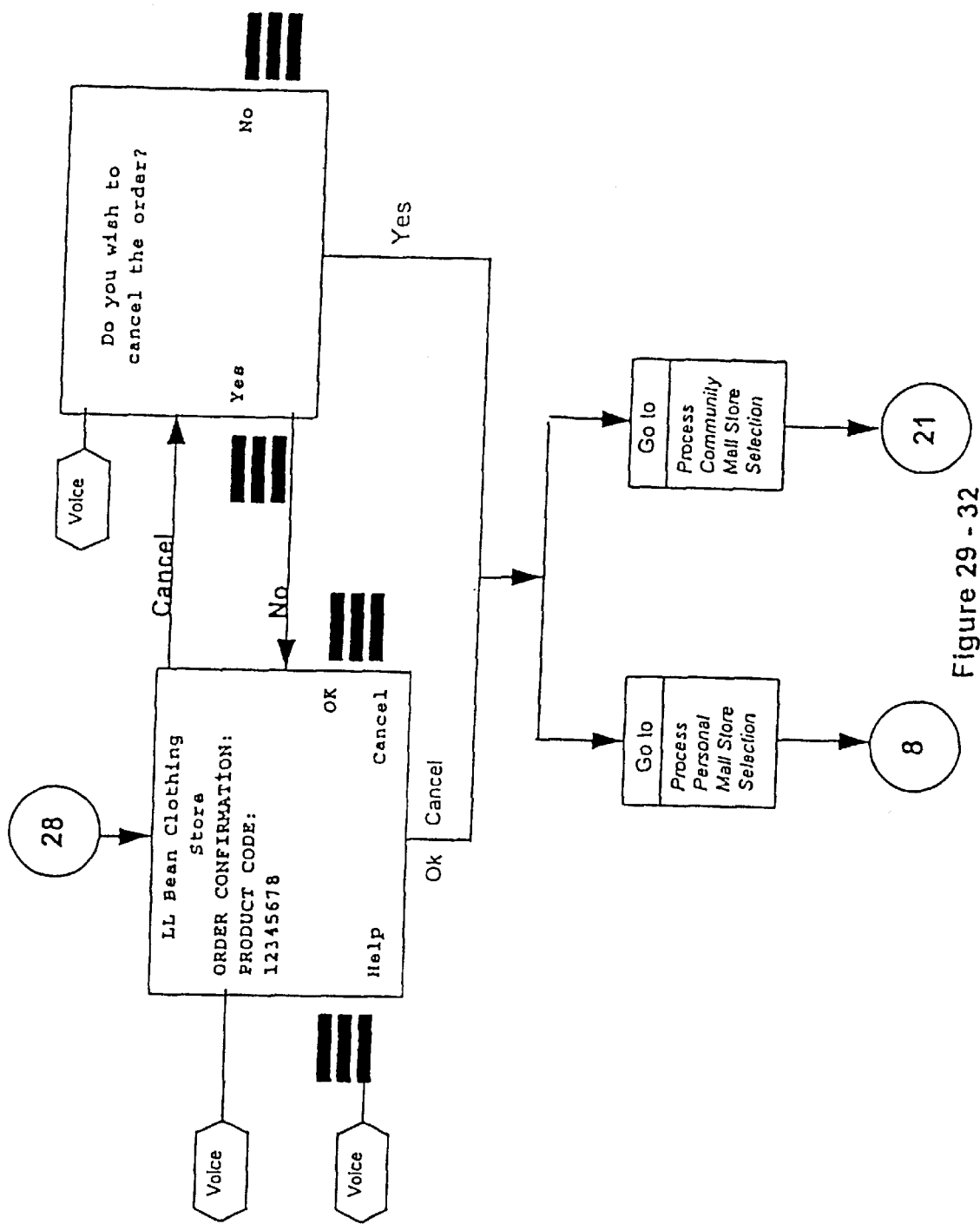
Figures 29, 30, 31, 32, 33:
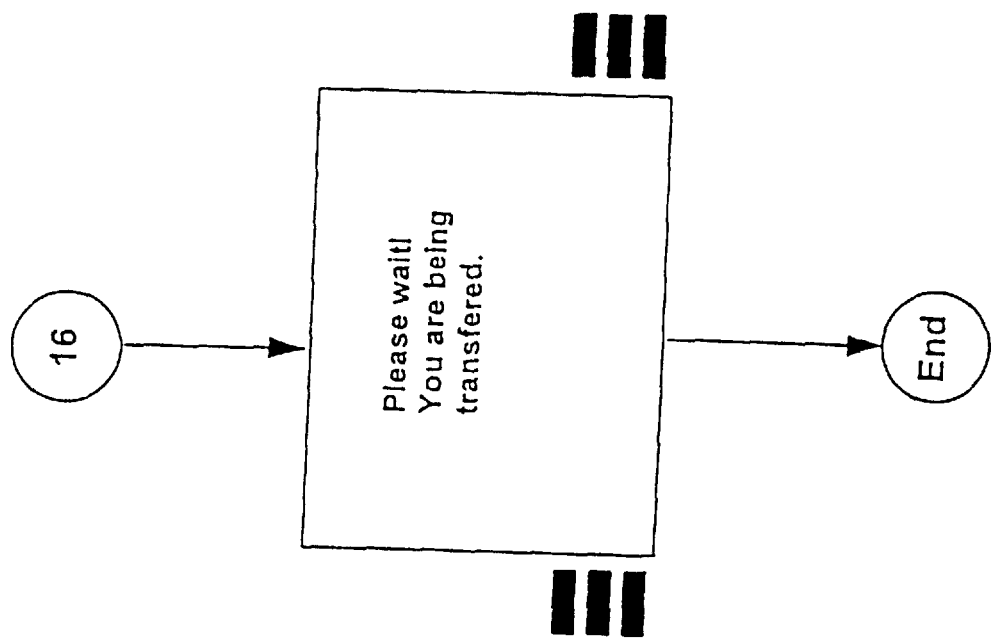

FIGS. 11-02 to 11-12 illustrate the various data input and selection screens and the type and nature of information stored by the TRDB in connection with each display based device in an area. FIGS. 11-13 and 11-14 illustrate the results of a targeting process, i.e. a list of telephone numbers. This list is stored in electronic form as an ASCII file, as previously mentioned, which will be accessed by the Message Assembly and Delivery System.

The screens illustrated in FIGS. 11-02 to 11-06 allow the operator to input and edit consumer information. The screen illustrated in FIGS. 11-02 allows the DBM operator to input consumer database information, such as customer name, telephone number, club card membership number, gender, family size, the various age categories of family members, marital status, employment status, level of education, range of family income, number of household members contributing to family income and which bank is used for day to day banking requirements. The screen illustrated in FIG. 11-03 allows the DBM operator to input consumer database information such as dwelling owned or rented, the type of dwelling, source of heat, if customer has pets, listed by number and type, number of automobiles including the year, make, model, and if serviced by dealer, if customer has facsimile machine, voice messaging, photocopier, computer or typewriter. The screen illustrated in FIG. 11-04 allows the DBM operator to input consumer database information such as sports in which household members actively participate, their leisure activities, how much is spent weekly on movies, fast food, dining out, bingo, at the horse races, theatre, on spectator sports and other categories of this nature, membership in clubs or associations, frequency of travel outside of the province, number of hours television viewed per day, radio station listened to and what radio information of greatest interest. The screen illustrated in FIG. 11-05 allows the DMB operator to input consumer database information such as customer ownership of video cassette recorder, microwave, compact disk player, video camera and NINTENDO® game system or comparable unit, frequency of usage of a pager, cellular phone and banking machine (ABM/ATM), comfortability factor in leaving a message on an answering machine and behaviour when reaching an integrated voice response system. The screen illustrated in FIG. 11-06 allows the DMB operator to input consumer database information such as frequency of playing lotteries, preferred grocery store, number of banks dealt with, number of credit cards including type, acceptance of various promotional mediums, preferred time to review screenTalk messages, which family members view messages, and preferred shopping location for various products and services.

Figure 7:
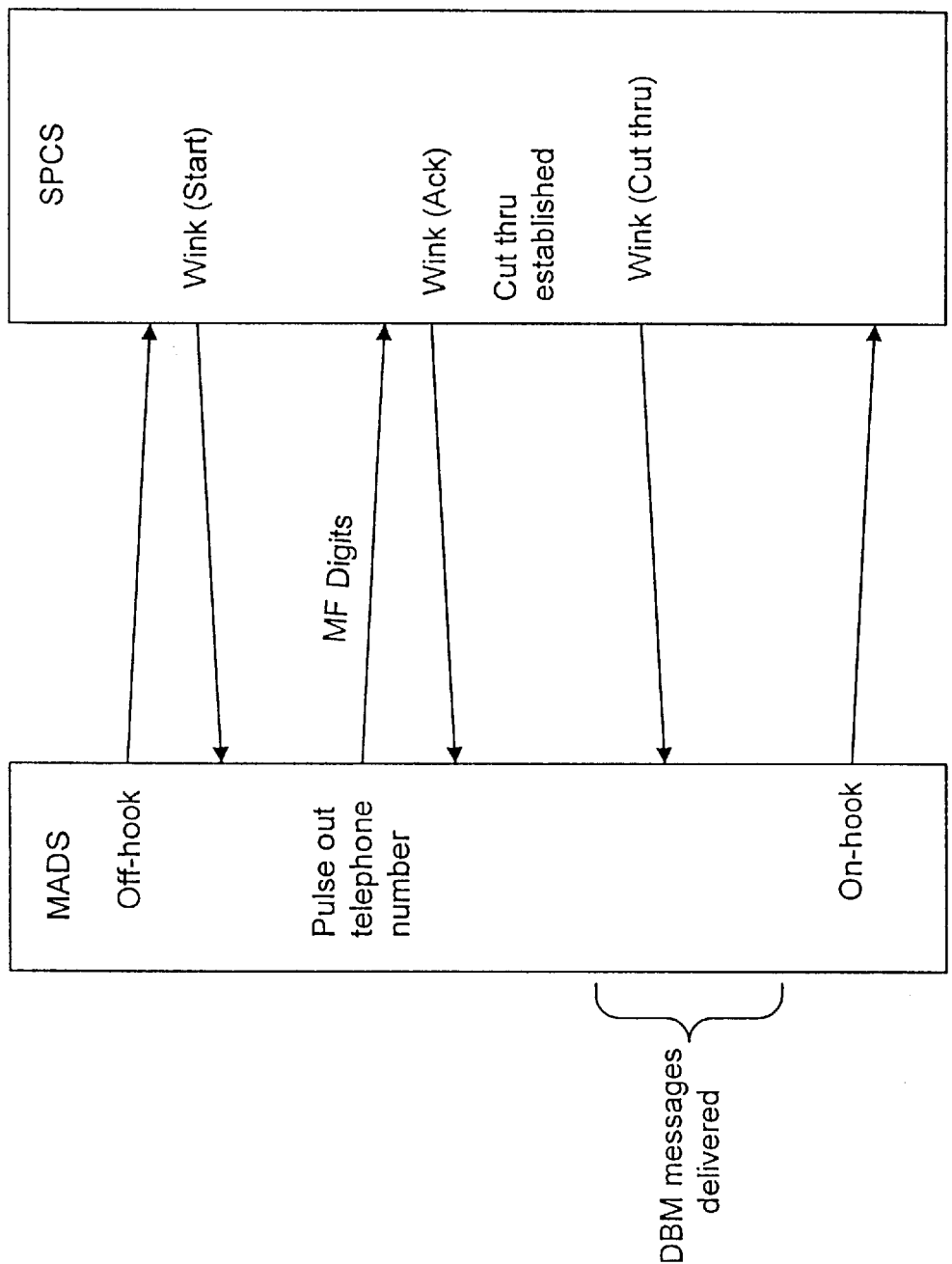
FIG. 7 is a block diagrammatic view of how Message Delivery Circuits are employed for a stored program controlled switch equipped with telemetry trunk type accesses.
Figure 10:
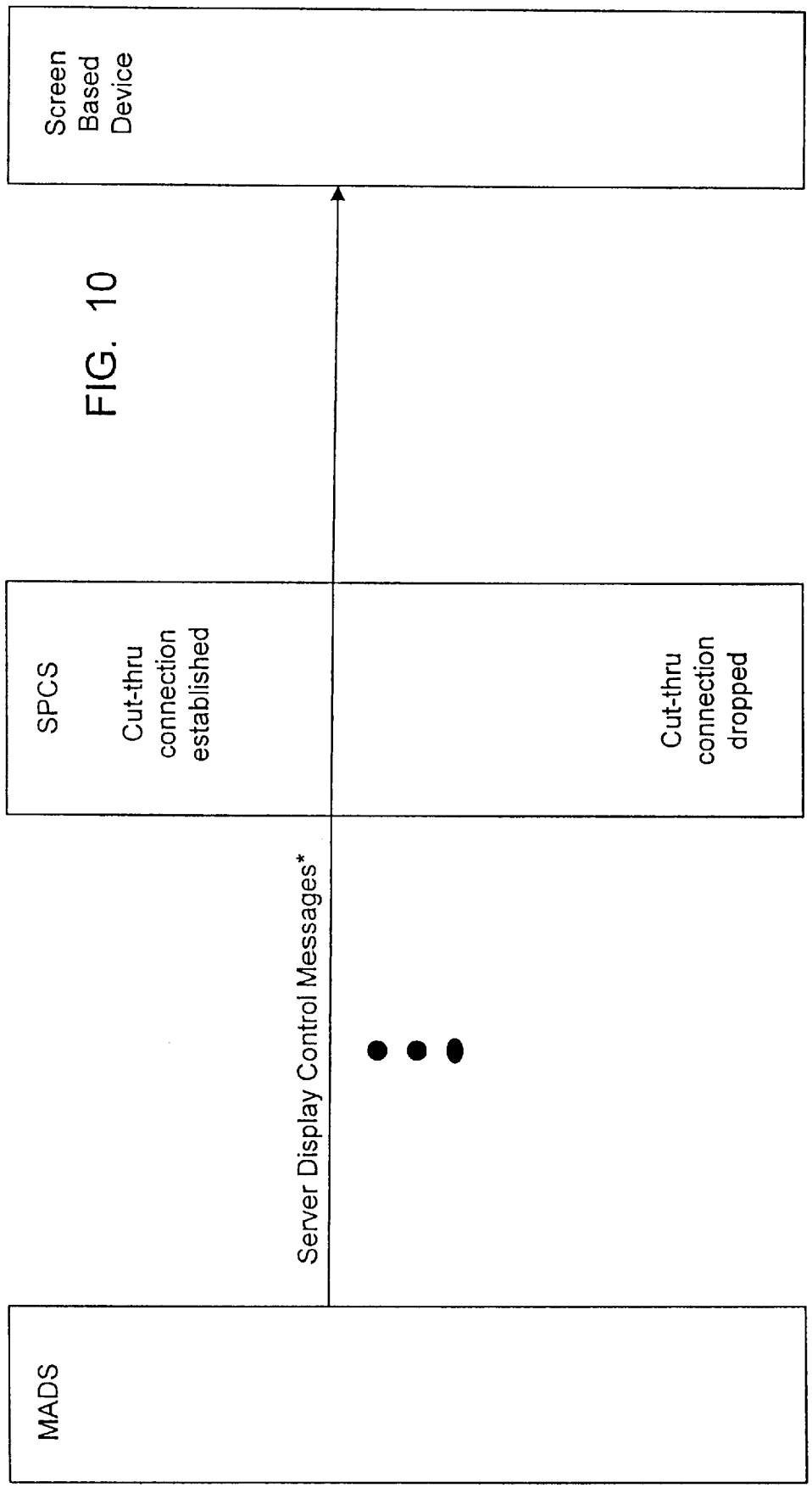
FIG. 10 is a view similar to FIG. 9 but for message delivery to SESAME® telephone after stored program controlled switch cut through connections have been established.

The screens illustrated in FIGS. 11-07 to 11-11 allow the operator to select consumer or target groups of consumers. The screen illustrated in FIG. 11-07 allows DBM operator to select a target consumer or target group of consumers, based on specific consumer information such as customer name, telephone number, club card membership number, gender, family size, the various age categories of family members, marital status, employment status, level of education, range of family income, number of household members contributing to family income and which bank is used for day to day banking requirements. The screen illustrated in FIG. 11-08 allows the DBM operator to select a target consumer or target group of consumers, based on specific consumer information such as dwelling owned or rented, the type of dwelling, source of heat, whether customer has pets, listed by number and type, number of automobiles including the year, make, model, and whether serviced by dealer, whether customer has a facsimile machine, voice messaging, photocopier, computer or typewriter. The screen illustrated in FIG. 11-09 allows the DBM operator to select a target consumer or target group of consumers based on specific consumer information such as sports in which household members actively participate, their leisure activities, how much is spent weekly on movies, fast food, dining out, bingo, at the horse races, theatre, on spectator sports and other categories of this nature, membership in clubs or associations, frequency of travel outside of the province, number of hours television viewed per day, radio station listened to and what radio information of greatest interest. The screen illustrated in FIG. 11-10 allows the DMB operator to select a target consumer or target group of consumers based on specific consumer information such as customer ownership of video cassette recorder, microwave, compact disk player, video camera and NINTENDO® game system or comparable unit, frequency of usage of a pager, cellular phone and banking machine (ABM/ATM), comfortability factor in leaving a message on an answering machine, and behaviour when reaching an integrated voice response system. The screen illustrated in FIG. 11-11 allows the DBM operator to select a target consumer or target group of consumers, based on specific consumer information such as frequency of playing lotteries, preferred grocery store, number of banks dealt with, number of credit cards including type, acceptance of various promotional mediums, preferred time to review SCREENTALK® messages, which family members view messages, and preferred shopping location for various products and services.

Figure 13:
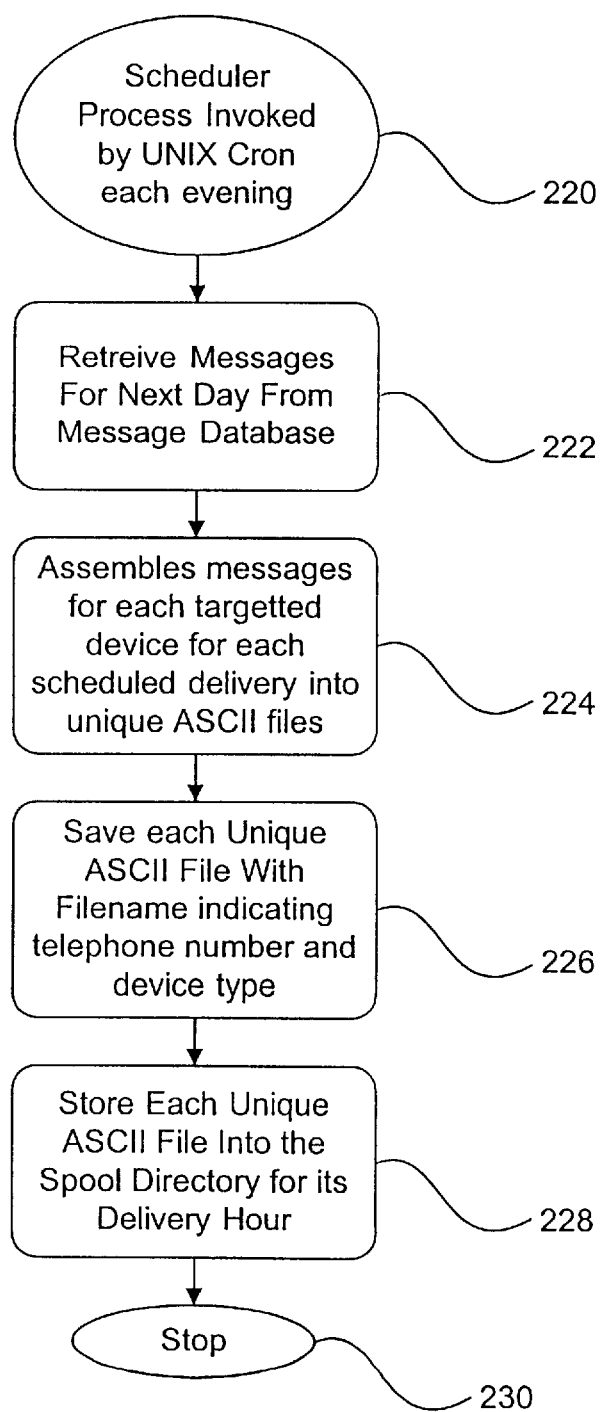
FIG. 13 is a flow chart illustrating the Scheduler process according to a preferred embodiment of the present invention.

FIGS. 11-12 and 11-13 are sample outputs of main menu item 2 "Select Survey Data". The outputs provide telephone number(s) and club card number(s). FIG. 11-14 is a sample of screen information displayed from a submenu option of main menu item 2 "Select Survey Data". FIG. 11-15 is a sample screen of main menu item 3 "Delete Survey Data" which allows the DBM operator to remove all information on an individual consumer from the TRDB by telephone number. FIG. 11-16 is a sample screen of main menu item 4 "Print Survey Data" which allows the DBM operator to print all survey data for an individual consumer in the database by telephone number. FIG. 11-17 is a sample screen of main menu item 5 "Load UNIX® Data" which allows the DEM operator to manually import response logs from the MADS into the TRDB. FIG. 11-18 is a sample screen of main menu item 6 "Load Unix Data" which allows DBM operator to view response activity on an individual or all consumers in database. FIG. 11-19 is a sample of screen information from a submenu option of main menu item 6 "Select UNIX® Data". FIG. 11-20 is a sample of screen information from a submenu option of main menu item 6 "Select UNIX® Data". FIG. 11-21 is a sample of screen information from a submenu option of main menu item 6 "Select UNIX® Data". FIG. 11-22 is a sample of screen information from a submenu option of main menu item 6 "Select UNIX® Data". FIG. 11-23 is a sample screen of main menu item 8 "Back Up Data" which allows back up and restore of TRDB. FIG. 11-24 is a sample screen of the "backup database" referred to in FIG. 11-23 which allows a particular database to back up. FIG. 111-25 is a sample screen of the "restored database option" of FIG. 11-23, which allows a restore of the TRDB.

With reference to FIG. 12, when a marketer wishes to send a DBM message to a target group of subscribers (100), he or she sends the text of the message and target information to the DBM operator (102). The operator then determines at (104) whether there already exists an ASCII file containing the telephone numbers of devices which satisfy the target information. This would occur, for example, if the marketer had previously sent: a message with identical target conditions. If there is no ASCII file containing the desired information or if new subscribers have been added to the database and it is desired to replace an existing file, the operator would input the target information into the TRDB (106) using option I "Load Survey Data" of the TRDB main menu (FIG. 11-01) and then select option 2 "Select Survey Data" which will cause the TRDB to interrogate its database and produce the desired ASCII file (108). If there is an ASCI file containing the desired information, the DBM operator logs into MMI of MADV 110. The operator would then log into the MMI (110) of the MADS, as described hereinbelow with reference to FIGS. 5,6-00 to 6-12, 12 and 13.

Message Assembly and Delivery System

The Message Assembly and Delivery System (MADS) 62 is used by the DBM operator, through the operator's console, to create and test a DBM message, assign a DBM message to a target group or groups and schedule a DBM message for delivery. The MADS delivers DBM messages to screen based devices at scheduled times and collects the responses of the screen based devices to the DBM messages. In the preferred form of the invention, the MADS is a personal computer running on a UNIX operating system. It is this element of the DBM control system that is connected to each SPCS by message delivery circuits and to the response measurement data lines compliant with TR-TSY-000032[3].

Figure 19:
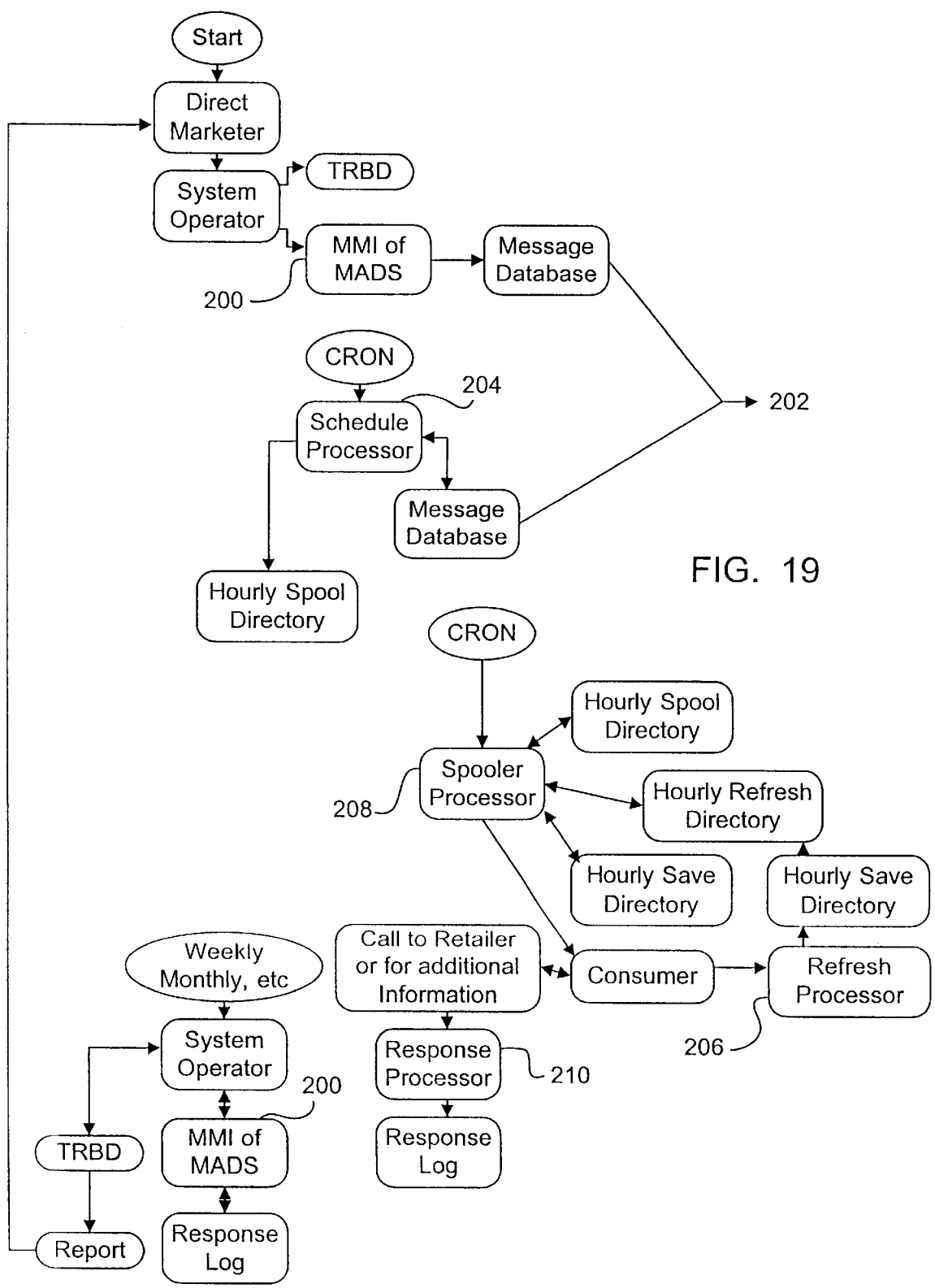
FIG. 19 is a block diagram representation of typical functional components of the overall Message Control System.
Figure 20:
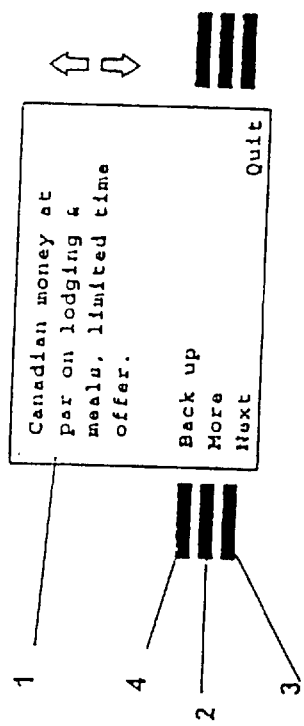
FIG. 20 is a diagrammatic representation illustrating how a DBM "little" message will be presented on the display of a screen based device and how the consumer will interact with the message.

The Message Assembly and Delivery System consists of six main software modules created with the SCO UNIX 3.2.2 C Language Development System. With reference to FIG. 19, these modules are the DBM Man Machine Interface module 200, the Message Database module 202, the Scheduler Process module 204, the Refresh Mechanism module 206, the Spooler Process module 208, and the Response Mechanism module 210. These modules are described hereinbelow.

DBM Man Machine Interface Module (MMI)

The DBM control system operator interfaces the system through the Man Machine Interface module 200. The MMI executes when the operator logs in and it allows the operator to create, add and delete DBM message text, test DBM messages with an accompanying screen based test device, assign DBM messages to specific target groups, assign telephone numbers to target groups, schedule DBM messages for delivery at specific hours, review or archive to disk response measurement information, stop or restart Spooler Processes, and review alarm information. FIG. 6-00 illustrates the menu of options provided by the MMI. Target group information, that is an ASCII file of the telephone numbers of the screen based devices to be targeted, is input to the Message Database through the MMI. The source of the ASCII file may be either the TRDB or a database of a retailer/direct marketer. The menu structure of the MMI is illustrated in FIG. 6-01 to 6-12.

Message Database Module

The Message Database module 202 stores data relating to DBM messages. This includes message text, target groups, the telephone numbers of the display based devices which are receiving DBM messages, the target groups assigned to each number, download priority and scheduling information. The SCO INTEGRA® database product has been employed although other commercially available products may be used without departing from the spirit of the present invention.

Referring once again to FIG. 12, once the operator has created and stored the ASCII of telephone numbers in the TRDB (108) and logged onto the MMI of the MADS, the operator retrieves the ASCII file and defines the telephone numbers as the target group and stores the data in the message database (112). The operator enters and stores the message text into the database using the message entry screens (114) and assigns and stores the target group to the message (116). The operator then schedules the message for delivery and stores the schedule information (118). The operator tests the message on a test facility (120) and, when the test is successful, marks the message as verified and stores the verified message in the message database (122).

Schedule Processor

Schedule Processor 204 retrieves all messages to be delivered to each screen based device for each hour from the Message Database module. The Schedule Processor organizes this data into a plurality of ASCII files, one file per screen based device per hour. That is, each ASCII file contains all messages to be delivered to a screen based device for a given hour. The filename created by the Schedule Processor identifies the seven digit telephone number of the screen based device to receive the file and an indication of whether the device is compliant with SR-INS-002461[1] or a SESAME® telephone. All files to be delivered for a given hour are stored in the same electronic directory. These directories are called "Hourly Spool Directories". These ASCII files are used by the Spooler Processor for delivery. The Schedule Processor can be invoked manually via the MMI for any specific hour (option 5 in FIG. 6-00), but normally runs each evening in preparation for the next day.

Thus, with reference to FIG. 13, at the prescribed time, indicated at 220, the scheduler process is invoked, causing the Schedule Processor to retrieve all of the messages for the next day from the message database (222), assembles the messages for each of the targeted devices for each scheduled hourly delivery into unique ASCII files (224), save each unique ASCII file with a filename indicating the telephone number and device type (226), and store each unique ASCII file into a spool directory for the prescribed delivery hour (228). The Processor then stops (230) until it is invoked again the next evening.

Refresh Processor

Figure 16:
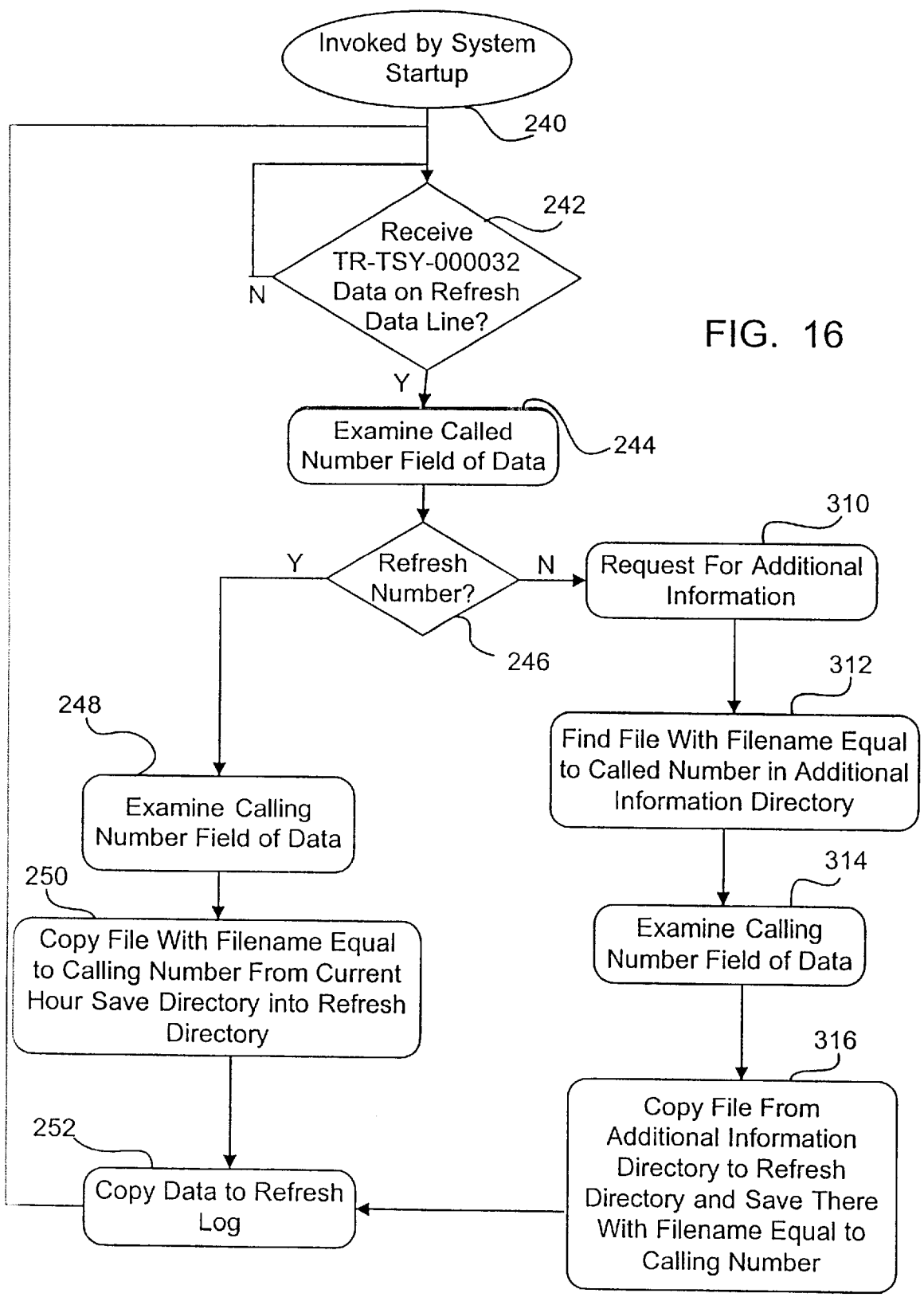
FIG. 16 is a flow chart illustrating the Refresh and the MADS Additional Information processes according to a preferred embodiment of the present invention.

Since DBM messages are lost if a SESAME® telephone is taken off-hook, the DBM control system provides a Refresh Mechanism 206 by which a user can request immediate re-delivery of lost DBM messages. Referring to FIG. 16, the Refresh Mechanism is automatically invoked on system startup (240). To request a re-delivery of lost DBM messages, the SESAME® telephone user calls the refresh facility telephone number then goes on-hook. The call is transmitted over the telephone to the SPCS which then automatically presents the called line and calling line identification information the DBM control system in a manner compliant with TR-TSY-000032[3]. As can be seen at (242), the Refresh Processor continuously monitors the refresh line and when it receives refresh data, examines the called and calling numbers (244) and determines whether it is a refresh number (246). It identifies the call as a refresh request from the called number field. If it determines that it is a refresh request, it identifies the requesting SESAME® telephone from the calling number field (248), and copies the appropriate ASCII file containing all messages to be delivered to the requesting SESAME® for the current hour to a Refresh Directory (250) and copies data to a refresh log (252). As explained below, the Spooler Processor will ultimately deliver the DBM messages.

Spooler Processor

Figure 14:
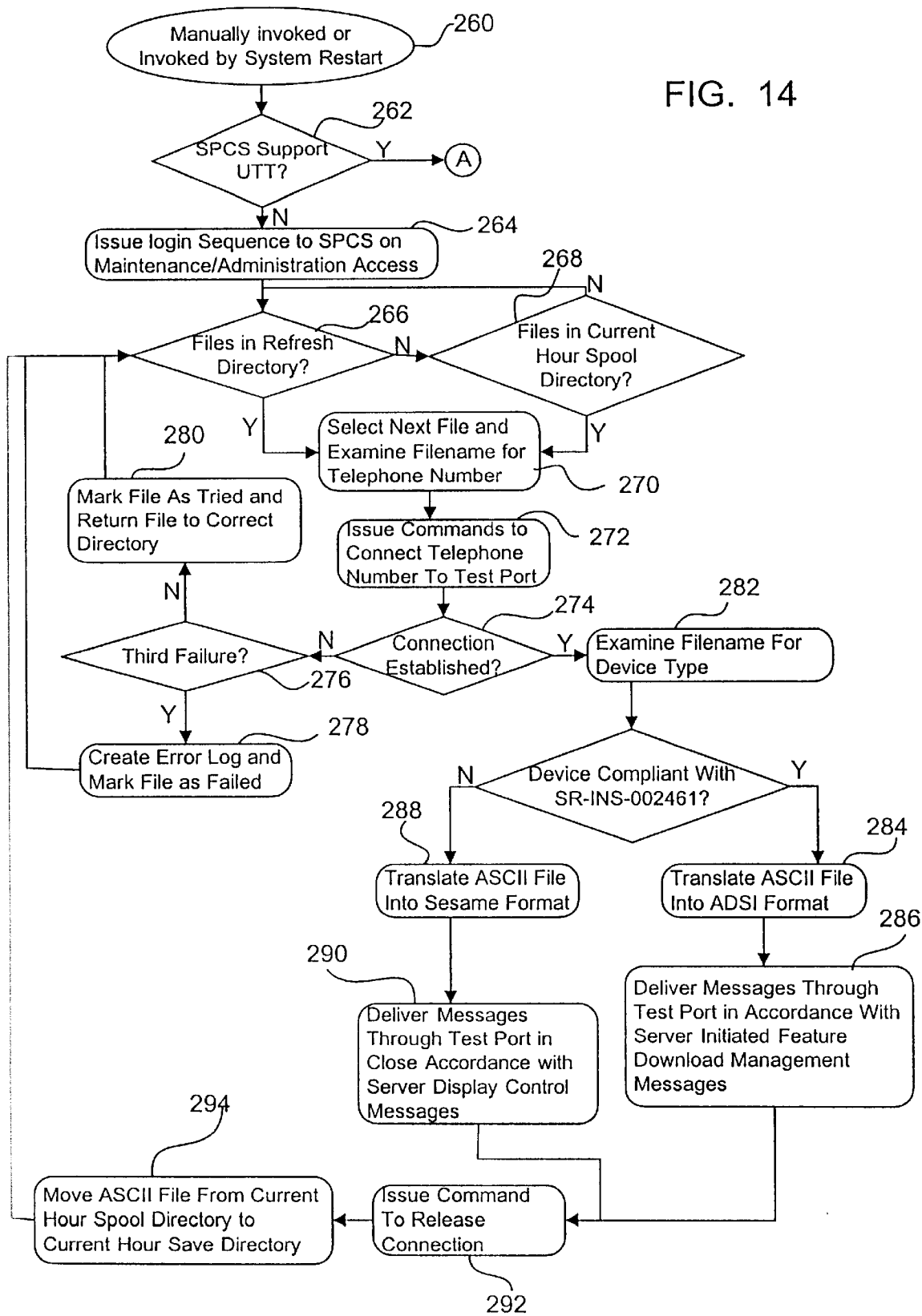
FIGS. 14 and 15 are a flow chart illustrating the Spooler process according to a preferred embodiment of the present invention.
Figure 15:
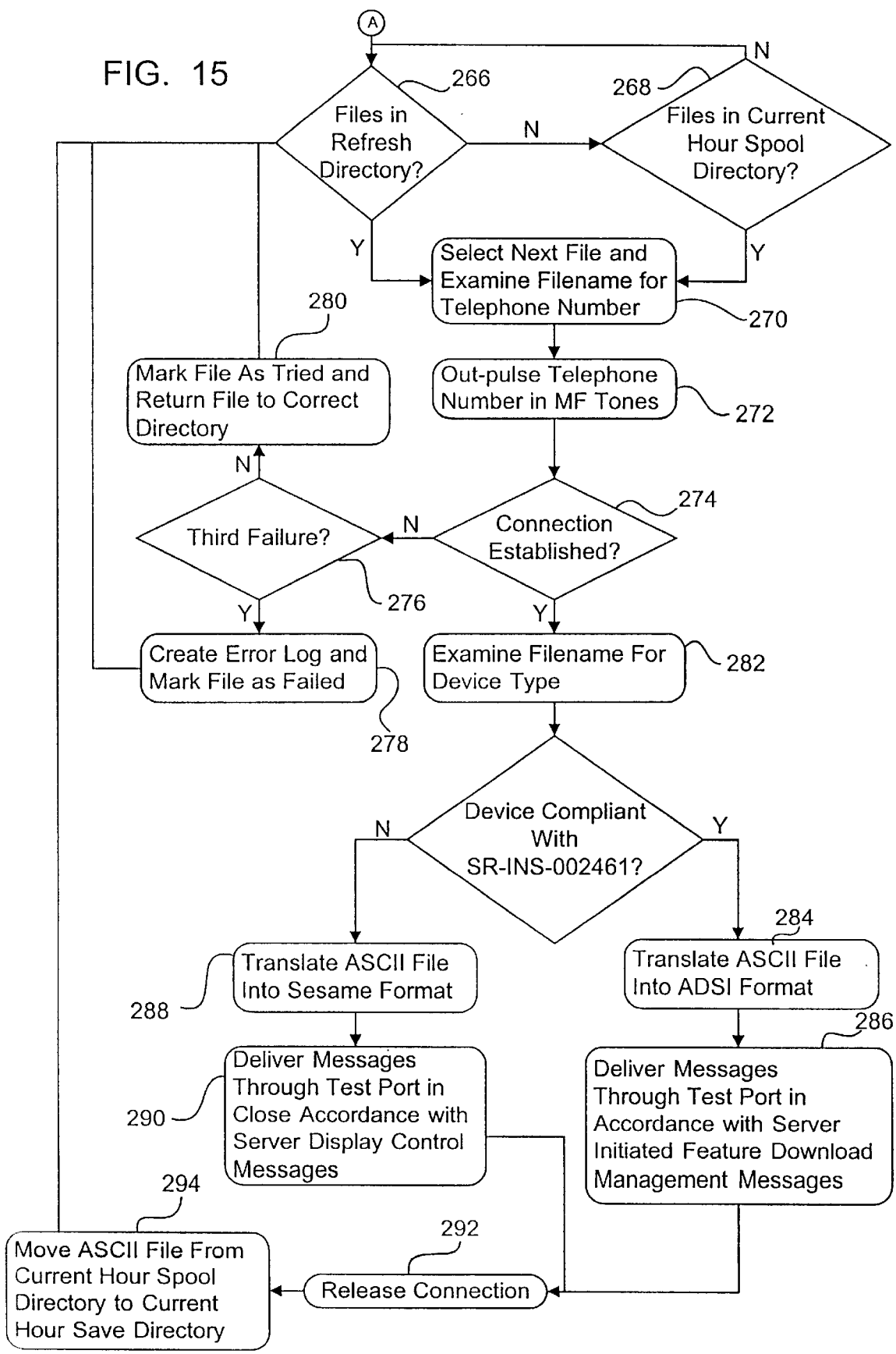

Spooler Processor 208 is illustrated in FIG. 14 and 15. It may be invoked manually or by system restart. The Spooler Process is implemented using Century Software's TERM® communications package along with C® and UNIX® programming routines. The Spooler Process can be started via a MMI menu command or on system initialization. It is the Spooler Process that communicates with the SPCS to establish connections through the SPCS to the screen based devices and invokes the message delivery process. It senses busy lines and reschedules when necessary. One Spooler Processor exists for each message delivery circuit to an SPCS. DBM has been designed to be unobtrusive, that is DBM messages are delivered to unattended screen based devices. Therefore, the Message Delivery Circuits provided by the SPCS must establish a connection to the screen based device without ringing the screen based device. The type of Message Delivery Circuits required to each SPCS depend upon the functionality of the SPCS. Two versions of the Spooler Process may exist, one for SPCS equipped with a Telemetry Trunk type accesses and one for SPCS not equipped with Telemetry Trunk type access.

(i) If the SPCS provides Telemetry Trunk type access, also referred to as "no-ring access" or "suppressed ring telemetry access", then connections may be made through the SPCS to idle lines without ringing the idle line. The Spooler Processor employs the "Off-Hook" call scenarios as described in Telemetry Trunk specifications as the BellSouth Telecommunications publication TA-73565[6] Generic Switching Requirements for Utility Telemetry Service or the Standards Committee IEEE SCC 31 which is responsible for developing the Industry Standards. On such equipped SPCS, the Spooler Processor is connected to the SPCS via the "no-ring access". The directory number of the targeted screen based device is out-pulsed with MF digits whereby the SPCS cuts through a connection between the DBM System and the screen based device without ringing the screen based device. FIG. 7 illustrates a possible scenario.

Figure 8:
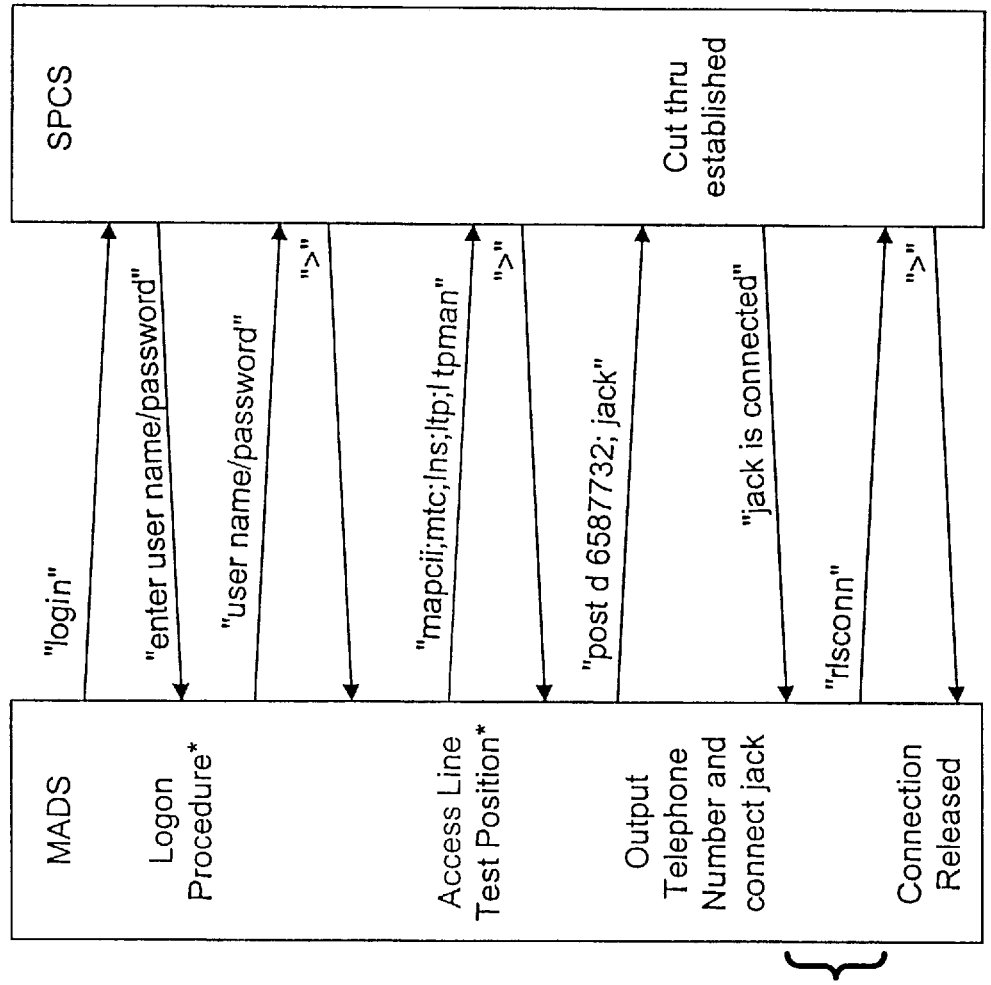
FIG. 8 is a block diagrammatic view of how Message Delivery Circuits are employed for a stored program controlled switch equipped with non-telemetry trunk type accesses.

(ii) If the SPCS is not equipped with Telemetry Trunk type access, then the DBM System connects to the SPCS via a Line Test Position. Typically, a Lines Maintenance Test Position on an SPCS consists of two physical accesses: first, a maintenance and administration access to which an asynchronous terminal is usually connected and through which commands may be issued to the SPCS, and, second, a test port to which analog test equipment for line testing is typically connected. Commands can be issued to the SPCS through the maintenance/administration access to establish a connection between the test port, and, thus, test equipment, and any idle line on the SPCS. The Spooler Processor emulates a maintenance type function on the maintenance/administration access. The Spooler Process issues commands to the SPCS to establish a connection between the test port and the directory number of the targeted screen based device, achieving a connection to the screen based device without alerting the screen based device. The DBM messages are transmitted over, through the test port, to the screen based device. The commands issued to the SPCS to establish the connection between the test port and a directory number vary with different SPCS vendors. The commands in FIG. 8 are specific to a Northern Telecom DMS-100 where the maintenance/administration access is called a MAP and the test port is called a JACK.

As shown at 260 in FIG. 14, the Spooler Processor may be invoked manually or on system restart. The processor then determines (262) whether the SPCS supports UTT. If it does then the process outlined in FIG. 15 is invoked; otherwise the process outlined in FIG. 14 is adopted in which case the processor issues a login sequence to the SPCS on maintenance/administration access (264), as discussed earlier. Thereafter, the Spooler Processor runs continuously and monitors the Refresh Directory (266) and the current hour Spool Directory (268) for files.

When a file is found (270), the filename is checked to determine the telephone number of the targeted screen based device and the type of screen based device targeted. Once the Spooler Processor establishes the "no-ring" connection through the SPCS to an idle screen based device, the Spooler Processor invokes the delivery sequence.

The delivery sequence employed depends upon the type of screen based device. If the screen based device is compliant with SR-INS-002461[1], then the Spooler Process delivers the DBM messages in accordance with Feature Download Management as specified for server-initiated service script updates (see FIG. 9). If the screen based device is a SESAME® telephone, the Spooler Process delivers the DBM messages in close accordance with the Server Display Control Messages provided in SR-INS-002461[1]. Since these devices do not support the FDM facility, they cannot be forced off-hook as defined in SR-INS-002461[1] section 3.1.3.1.2. Because of this, the DBM messages are delivered to on-hook SESAME® telephones. The SESAME® telephone closely follows the Data Transmission Protocol and Data Link Layer requirements for on-hook data transmission without power ringing as defined in TR-NWT-000030[5]. As such, the SESAME® telephone does not provide Data Link Layer acknowledgments and the Spooler Process does not expect such acknowledgments. The actual commands (Server Display Control Messages) closely follow those defined in TR-NWT-001273[4]. See FIG. 10.

With reference to FIG. 14, the processor issues the commands to connect the telephone number to the test port (272) and determines (274) whether a connection has been established. If it fails to make a connection after three failures, it creates an error log and marks the files as "failed"278. Alternatively, if it fails to make a connection before three failures 276, it marks the file as tried and returns the filed to the correct directory 280. If a connection has been established, the processor examines the filename for the device type (282). If the device is compliant with SR-INS-002461[1], it translates the ASCII files into ADSI format (284) and delivers the messages through the test port in accordance with the Server Initiated Feature Download Management Messages (286). If the device is not compliant with SR-INS-002461[1], it translates the ASCII files into SESAME® format (288) and delivers the messages through the test port in close accordance with the Server Display Control Messages (290). In both cases, the processor then issues the command to release the connection (292), moves the ASCII file from the Current Hour Spool Directory to the Current Hour Save Directory (294) and repeats the process starting at 266.

The process illustrated in FIG. 15, is very similar to that of FIG. 14 and, accordingly, like reference numerals have been used to designate corresponding steps. The primary difference, as already mentioned, is at 272' where the telephone number is out-pulsed in MF tones.

Response Processor

Figure 17:
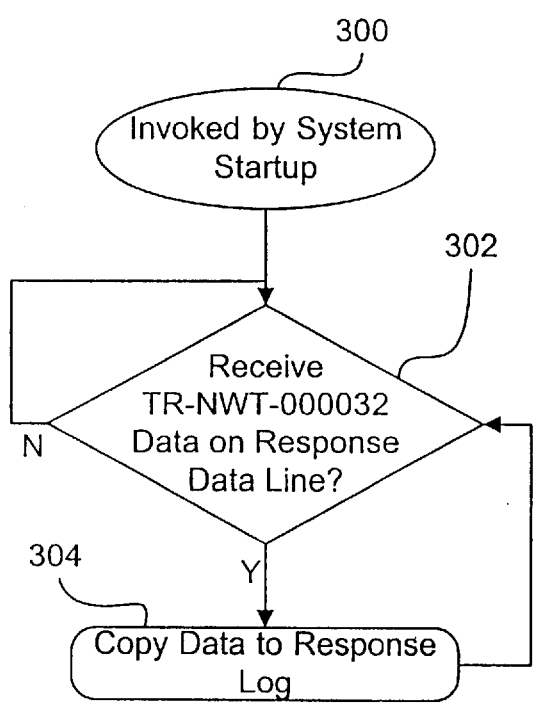
FIG. 17 is a flow chart illustrating the Response process according to a preferred embodiment of the present invention.

With reference to FIG. 17, the Response Mechanism is automatically invoked by system startup (300) and is implemented using in a manner similar to the Refresh Mechanism. Individual DBM messages prompt users to depress a softkey programmed with "Call" or "Listen" to allow the user to obtain additional information about a particular message, a product or a service. The "Call" soft-key causes the screen based device to generate a call to a retailer or direct marketer. The "Listen" soft key causes the screen based device to generate a call to information sources such as a voice mail box, an interactive voice response (IVR) system, or an interactive system that follows SR-NWT-002495[2]. When the call is presented to any of these locations or devices by the SPCS, called line and calling line identification information is transmitted from the SPCS to the DBM control system in a manner compliant with TR-TSY-000032[3] (302). The Response Processor stores this information as logs in a Report Directory (304). Through the MMI, the DBM System operator may extract this response data as an ASCII file and send it to the TRDB for report generation or other processing.

Figure 18:
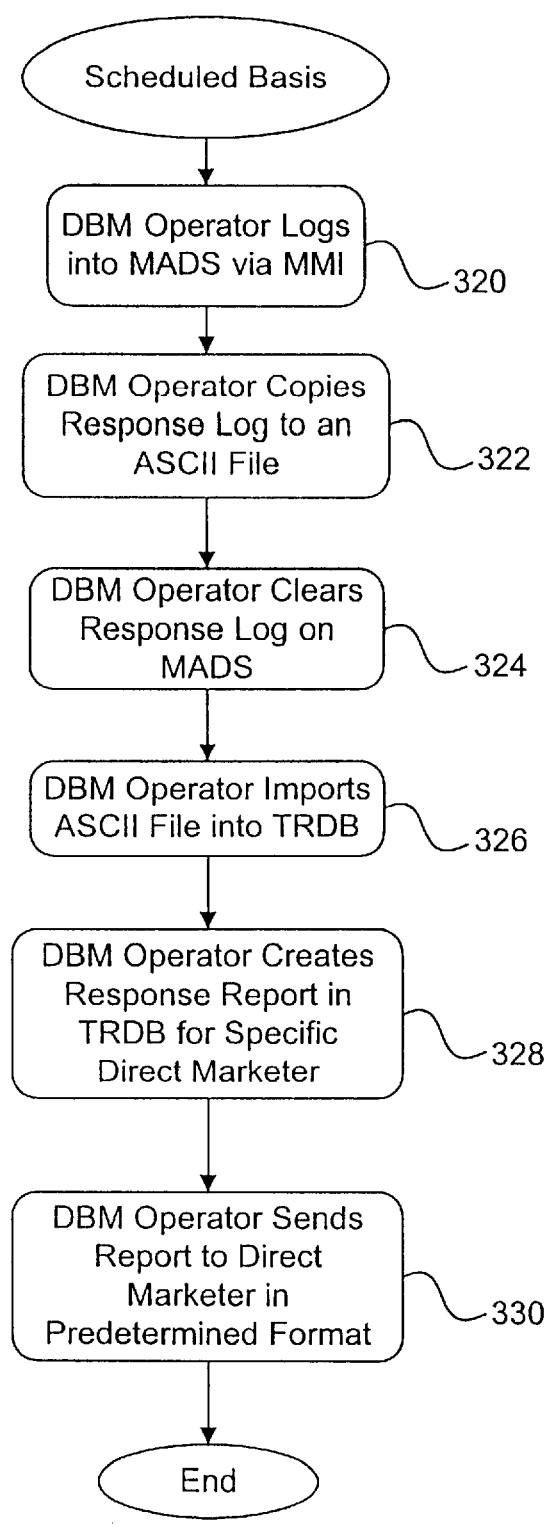
FIG. 18 is a flow chart illustrating the Response Report Generation process according to a preferred embodiment of the present invention.

FIG. 18 illustrates the process for generating a Response Report. The DBM operator logs in to the MADS via the MMI (320), copies the response log to an ASCII file (322) and clears the response log from the MADS (324). The operator then loads the ASCII file into the TRDB (326) and creates a Response Report in the TRDB for the or each specific marketer (328) and sends the report to the marketer in a predetermined format (330).

Interactive Information Platforms

The Interactive Information Platforms (IIP) allow the DBM System to provide additional information on DBM messages. The "Listen" soft key in a DBM message causes the screen based device to generate a call to an IIP. This has two benefits: first, the number of individual DBM messages sent at a scheduled delivery can be maximized by minimizing the size of each individual message; second, calls to these platforms generated through users pressing the "Listen" soft key are the principal means of providing a measurement of response to DBM messages. IIPs take the form of: voice mail systems and IVR systems providing voice only additional information; and interactive systems that follow SR-NWT-002495[2] providing interactive voice and display based additional information. The MADS functions as an additional information source through the Refresh Mechanism. To provide additional information from the MADS, calls made by users of screen based devices by pressing a soft key for additional information terminate on a voice mail system. The voice mail system simply thanks the user for calling and instructs the user to go on-hook. As illustrated in FIG. 16, when the call is presented to the voice mail system by the SPCS, called line and calling line identification information is transmitted from the SPCS to the DBM System in a manner compliant with TR-TSY-000032[3]. The MADS Refresh Processor examines the called and calling numbers (246), identifies the call as a request for additional information on a specific DBM message from the called number field (310), locates the file with the filename equal to the Called Number in an additional information directory (312), identifies the requesting screen based device from the calling number field (314), and copies the file as ASCII file containing additional information into the current hour to a Refresh Directory (316). The Spooler Processor then delivers the DBM additional information message.

An IIP, with a data connection into the Targeting and Response Database, may provide the facility to allow the screen based device users to change their targeting profile. This affords the user control over the message types and message contents to be delivered.

1. SR-INS-002461[1], Customer Premises Equipment Compatibility Consideration for the Analog Display Service Interface, Issue 1, Bellcore, December 1992.
2. SR-NWT-002495[2] Guidelines for Writing Applications Which Use the Analog Display Services Interface (ADSI) for Data Communications, Issue 1, Bellcore.
3. TR-TSY-000032[3] CLASS Bulk Calling Line Identification, Issue 1, Bellcore, November 1988.
4. TR-NWT-001273[4], Generic Requirements for an SPCS to Customer Premises Equipment Data Interface for Analog Display Services, Issue 1, Bellcore, December 1992.
5. TR-NWT-000030[5], Voiceband Data Transmission Interface Generic Requirements, Issue 2, Bellcore, October 1992.
6. TA-73565[6], Generic Switching Requirements for Utility Telemetry Service, BellSouth Telecommunications, April 1992.

The paradigm being altered in the present invention relates to that of a community shopping mall. These malls lease retail space to retailers that sell product, services and information to the mall community of interest. The mall management coordinates advertising for its tenants, and provides mall activities/promotions (easter egg hunts, radio station setup, etc) to attract consumers into the mall. The mall management typically has a help desk to provide guidance to consumers in fulfilling their requirements. Consumers view mass advertising and promotions and enter the mall, for a variety of individual reasons, to line up in front of businesses wanting to sell to them product and services. The present invention takes the concepts of a physical mall and recreates them in an "electronic mall", but with a power shift in the buying-selling relationship where consumers are given the control.

The present invention creates a new marketing communication channel allowing tenants of the electronic mall to gain access to consumers with screen based devices and be accessed by consumers with screen based devices. The new marketing communications channel facilitates Display Based Marketing—targeted display based informational, promotional and advertising messages delivered through the public switched telephone network to consumer's unattended screen based devices in a non-intrusive manner; facilitates the CallMall—powerful applications such as home banking, shopping and information services to screen based devices personalized by the consumer; and facilitates Enhanced Telephony Services as defined by Bellcore in FR-NWT-000012 ADSI Specification to screen based devices.

Display Based Marketing

Display Based Marketing is primarily a local advertising/direct marketing medium. It is Personalized Electronic Flyers. CallMall tenants will be able to send display based marketing messages that are targeted to consumers through consumer defined areas of interest. These messages will incent the consumer to go into the tenants CallMall store to buy some goods or services. Display Based Marketing becomes the advertising tool for the CallMall tenant. It plays a large role in moving consumers away from planned purchases and shifting them towards impulse purchases right from the household family room or kitchen. This is unlike the physical world where impulse buying takes place in the physical store through point of purchase displays. The traditional promotional methods available in the physical world are achieved differently in the electronic world. The differences amount to targetability—allows the message to be sent to the selected target market(s), non-intrusiveness—delivery of messages in a non-intrusive manner with messages having greater acceptance since they will be sent based on household's wants and demographic profile, timeliness—no long lead time required to send messages, measurability—message performance reports (response data) provided weekly with detailed response data provided to advertiser, environmentally friendly—paperless delivery, entertaining—consumer interactivity with combined voice and/or text information. These are significant advantages with today's "new consumers".

DBM is a unique interactive advertising/direct marketing medium which enables the delivery of targeted advertising to consumers in an efficient, cost effective manner and which will provide the advertiser with a true measure of actual consumer response in a timely manner. Delivered at various times of the day, this service provides non-intrusive, targeted delivery of marketing messages to screen based devices. The delivery of such messages also delivers prompts to activate auto dialers that access vendor information and/or special offers, providing businesses increased sales opportunities.

DBM messages will normally follow the "little-lot call" model.

The "little"—this is the component of the messages that is delivered through the public switched telephone network to consumer's unattended screen based devices in a non-intrusive manner by the present invention. This brief snippet of information detailed in FIG. 20, or "little" message (1) will include a "more" soft key (2) that the consumer can select to obtain further information about the described product or service. A "next" (3) and "backup" (4) soft key will allow the consumer to navigate between "little" messages stored in the screen based device as numerous "little" messages are delivered at a time. Retailers could be charged a small fee for delivery of "little" messages to consumers.

Figure 21:
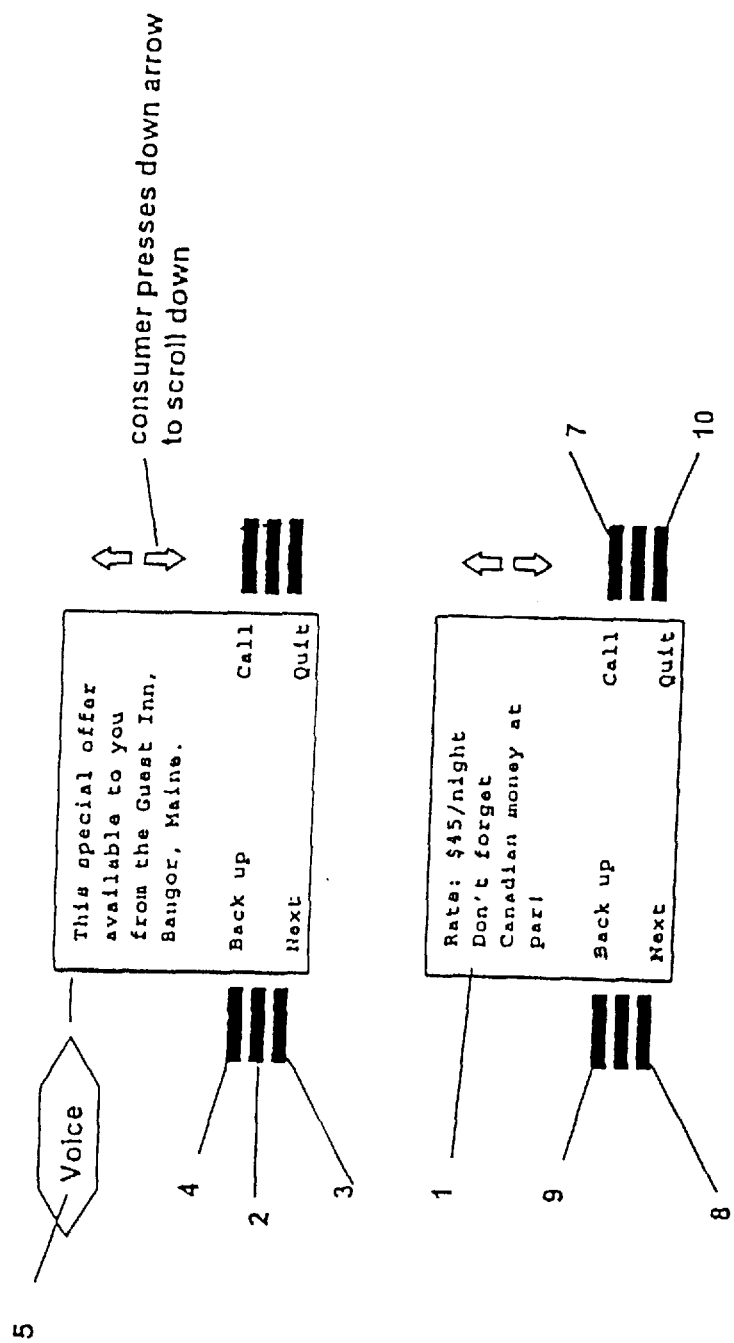
FIG. 21 is a diagrammatic representation illustrating how a DBM "lot" message will be presented and heard on the display of a screen based device and how the consumer will interact with the message.
Figure 22:
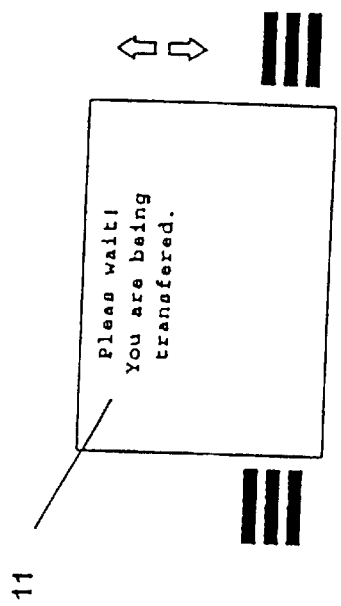
FIG. 22 is a diagrammatic representation illustrating the message presented on the display of a screen based device when a consumer selects the "call" soft key.

The "lot"—when a consumer selects the "more" soft key (2), associated with a "little" message, a call will be placed through the public switched telephone network to the present invention that acts as an interactive server that follows specifications defined by Bellcore in FR-NWT-000012 ADSI Specification. FIG. 21 details that the consumer will receive a detailed voice (5) and/or text (6) information for the selected message. The consumer may choose to be transferred through the PSTN to the associated retailer by pressing the "call" soft key (7). A "next" (8) and "backup" (9) soft key will allow the consumer to navigate between previous and subsequent "little" messages. These "little" messages will be the same "little" messages as previously defined, except they are viewed interactively. The interactive session will be maintained until the consumer exits the DBM service either by selecting the "call" (7) soft key or the "quit" (10) soft key. The "quit" (10) soft key will end the interactive session and cause the screen based device to go on-hook. The associated retailer could be billed each time a consumer views the "lot" message.

The "call"—from the interactive session a consumer may select the "call" soft key (7) to contact the associated retailer. The "call" soft key (7) will instruct the present invention to place a call through the public switched telephone network to the retailer, and transfer the consumer to the retailer (11) as detailed in FIG. 22. Retailers could be billed a premium charge each time a consumer makes this selection CallMall The CallMall is an interactive electronic mall facilitated by the present invention where consumers can interactively shop, browse, and/or purchase product and services from retailers with their screen based device. Each consumer will have access to a Community Mall and will configure, with the help of an electronic Personal Agent, a Personal Mall with the most frequently visited stores from all stores available in the Community Mall. The Personal Agent acts on behalf of the consumer, providing the consumer with a customized guide to the other available service components. The components of the CallMall are:

1. The Catalogue Store
2. Community Mall
3. Personal Mall
4. Information Services
5. CallMall Activities
6. Personal Agent Catalog Store The Catalogue store will be the location where consumers order catalogues. This area of the CallMall provides a very cost effective marketing channel for cataloguers. This store allows existing customers to order catalogues quickly and easily and more importantly allows new customers to order catalogues they have never heard of or did not know how to obtain. This store creates a point of presence in the home for cataloguers and it only costs them a small fee each time someone orders a catalogue through the catalogue store. When a customer requests a particular catalog the system will send the cataloguer a fax with all the required information about the consumer to successfully mail the catalogue to the consumer.

Community Mall

The community mall will target stores and banks. Bank applications can provide the following services through the screen based device:

Bill Payment

Intra Funds Transfer

Balance Inquiry

Interest Rates

Transaction Review

Services Information

Renewal Reminders

The system will be connected to a bank's host computer to provide these transactions, and the system provides the interactive interface to the consumer. The primary target for stores will be any business that has home delivery capability. The key groups will be cataloguers of consumer goods and retailers of consumer goods. There will also be some stores that do not have catalogues but are logical fits because they have home delivery capability or have some unique service capability they wish to provide, and also merchants that have a high level of brand awareness in the consumer market place. This will provide a level of confidence to consumers about the legitimacy of the service. The cataloguers who are in the catalogue store will also be in this section of the CallMall. This is the location where someone can place an electronic order with a cataloguer if the cataloguer is set up for this. Essentially a cataloguer, retailer, or specialty store can be set up one of three ways in the CallMall:

1. The first option is that when a consumer selects that store in the CallMall, the system will call transfer the consumer through the PSTN to one of the store's live agents or their own automated order taking system.

2. The second option places the shopping/ordering application on the server and the consumer interacts with the server through their screen based device. The system provides order screens that the consumer fills out with their screen based device in a means defined by Bellcore in FR-NWT-000012 ADSI Specifications. The completed order is faxed by the system to the store.

3. The third option is similar to option 2, except the system is directly connected by a plethora of data communication option to computer system. As the system is connected directly to the store computer system, up to date product information and prices are available and the completed order is transferred through the data communications facility to be processed by the store's computer. The system provides the interactive interface to the consumer.

Personal Mall

The consumer's Personal Mall is configured by the consumer by interacting with the system through their screen based device and selecting the stores from the Community Mall the consumer wishes to have in their Personal Mall. The Personal Mall is basically the most frequently used stores by the consumer.

Information Services

The information services section of the CallMall is intended to provide consumers fast and simple access to information they value but is routine in nature. This would be information like daily weather and weekly winning lotto numbers. This area of the CallMall will also provides access to information exchange that is time consuming and difficult today. This would be things like government vehicle registration. The providers of this information benefit from this area of the CallMall in that they are providing better service to consumers and are reducing their costs of handling these information inquiries. Service is improved due to the ease of access and the richer communication medium (i.e. sight and sound). Cost reductions result from the elimination of live agents answering the inquiry call. They will only get involved if the caller is not satisfied with the information provided in the automated content. The following are potential information services:

1. Weather Line

2. Lotto Line

3. Movie Line

4. Federal Government Job Bank

5. Government Road Report

6. Community Events Line

7. Entertainment Events

8. Investors Line

9. Education

Information services can be set up with the same three options identified in the Community Mall.

CallMall Activities

The CallMall Activity Center is where the CallMall gets its personality. This section of the CallMall is intended to be accessible from anywhere in the Mall and have linkages to the Merchant areas, Information Services, Display Based Marketing and Enhanced Telephony. Mall Promotions will be managed through this section of the CallMall. Many of the Mall promotions will take on a gaming element as a key strategy of "engaging" the consumers in the CallMall. The gaming strategy's intent is to create an environment that is "fun" and to continually bring the consumer back to the CallMall. By encouraging consumers that it is worthwhile to come back to the CallMall for free prizes they will at the same time become comfortable with navigating in the Mall, requesting information from the Mall and responding to the Mall. These promotions will be things like random "entry surprises" i.e. the 100th consumer to enter the CallMall gets a $100.00 gift certificate to be spent in the CallMall. A "treasure hunt" involving all the tenants of the CallMall will be promoted that forces the consumers into using all the functionality of the CallMall. In essence the treasure hunt will be an exciting way of training consumers about all the features and services contained within the CallMall. The activity center will run a "speakers corner" where there will be a weekly topic of discussion that people debate through their TalkMail service. Again the intent of this is to get people involved in the CallMall and make it a place of shopping and banking but also a "fun" place for getting information and stimulation. There will be a loyalty program based on a consumer's level of use of the CallMall services. This is intended to again drive traffic into the CallMall which in turn helps drive demand for tenant space in the CallMall. There will be a suggestion box available at all times for customers and tenants to leave their ideas, problems or general comments on the CallMall.

Personal Agent

There will be a CallMall Help facility continuously available. This facility will be text and audio based and will be requested when the consumer selects the "help" soft key. This help facility is the consumers personal agent. Consumers will have the ability to define the voice of the personality and voice of their personal agent(e.g., Marilyn Monroe, Elvis Presley, etc.). The personal agent also guides the consumer through configuring their areas of interests for targeting Display Based Marketing messages. The personal agent also guides the consumer through configuring their Personal Mall from the available stores in the Community Mall.

Enhanced Telephony Service

The present invention will facilitate the delivery of services scripts to screen based devices as defined by Bellcore in FR-NWT-000012 ADSI Specification, that enhance telephony features as defined by Bellcore in FR-NWT-000012 ADSI Specification.

GENERAL CONTEXT OF SECOND EMBODIMENT

Figure 23:
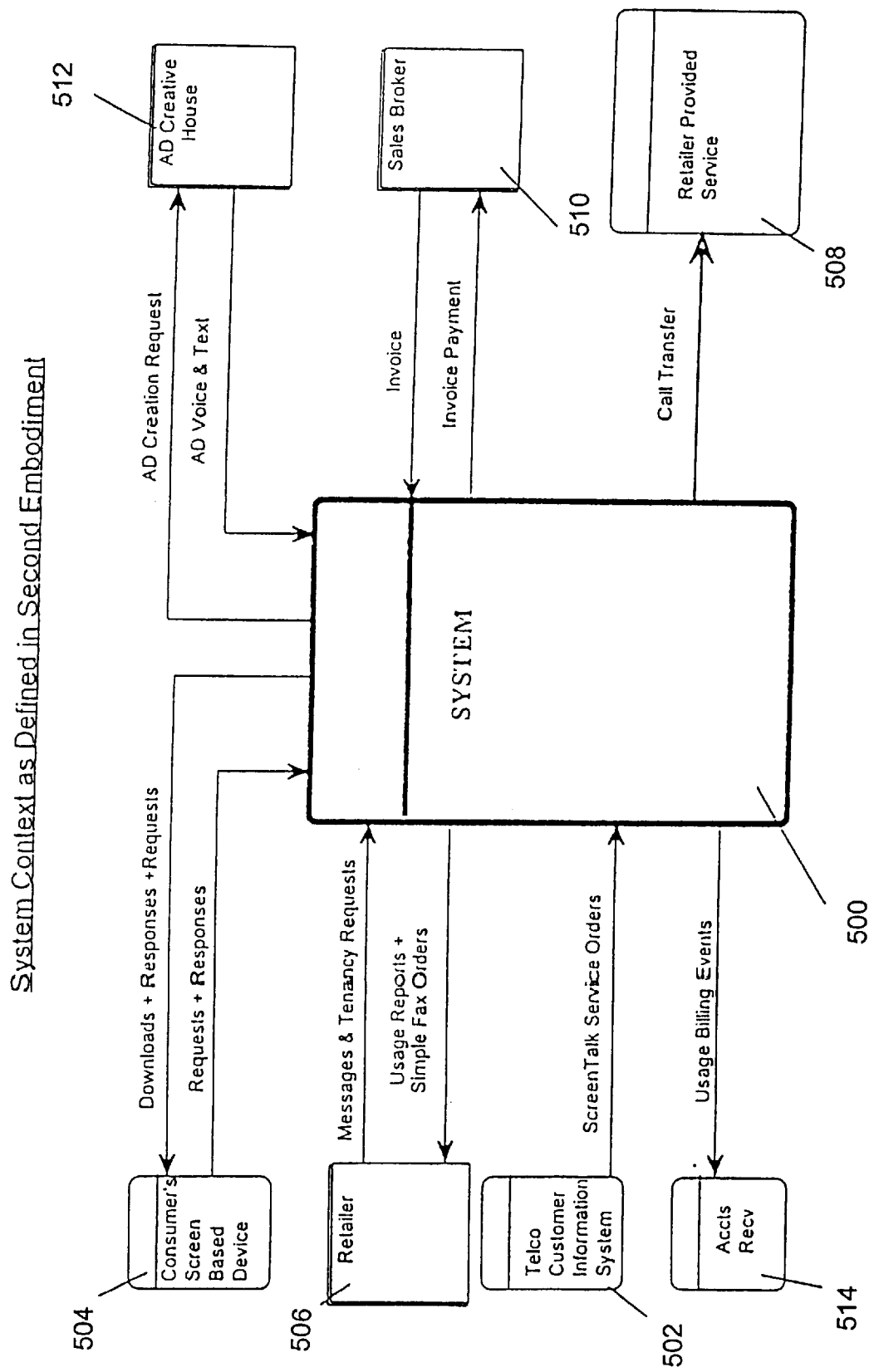
FIG. 23 is a diagrammatic representation illustrating the system context of the second embodiment of the system.

FIG. 23 details the present invention 500 and how it interacts with the following systems: telco customer information system 502; screen based devices 504; retailers 506; retailer provided services 508; sales brokers 510; advertisement creation house 512; billing system 514.

The system

The scope of the system in terms of activities are as follows:

Management of areas of interest, personal profile, preferred CallMall stores, and other consumer information by administrative personnel and by the consumer themselves;

Creation and scheduling of marketing messages for retailer advertisers;

Delivery of marketing and informational messages to consumers;

Creation and delivery of an ADSI telephony features script to the consumer, where the script is dependent upon the telco involved;

Collection of transaction information detailing consumer CallMall and Display Based Marketing interactions;

Collection of recent Fax Order information for inquiry purposes by administrative personnel;

Collection and completion of incomplete Fax Order information for the consumer by administrative personnel;

Generation of usage reports to retailer tenants in the CallMall, and to retailer advertisers;

Capture and rating of consumer usage events; passing rated usage events to be billed to the applicable retailer by the Billing system;

Management of retailers leasing space in the CallMall; and

Management of advertisement and CallMall tenant sales.

Telco Customer Information System

The following summarizes the roles and information flows between the system and the Telco Customer Information System. The Telco Customer Information System maintains customer information for purposes of service provisioning. Consumers will request service for enhanced telephony features through the telco which in turn triggers a message to the system administration requesting the delivery of the ADSI FDM telephony feature scripts to the consumer's screen based device.

Consumer Screen Based Device

The following summarizes the roles and information flows between the system and the consumer screen based devices. The consumer's screen based device is compliant with enhanced telephony services defined by Bellcore in FR-NWT-000012 ADSI Specification. Display Based Marketing "little" messages delivered to screen based devices take the form of FDM scripts. The enhanced telephony services rely upon a FDM script. The DBM "lot" component are interacted through ADSI Server Display Control. All interactions with the CallMall are through ADSI Server Display Control.

The consumer inputs personal profile management information (interests, demographic information, etc.) to the system through interactive sessions between the consumer's screen based device and the system.

The consumer requests changes to his/her personal CallMall.

The consumer receives DBM "little" messages.

The consumer receives telephony feature scripts.

Consumer actions dealing with viewing "lot" messages and using "CALL" soft key will be recorded, rated, and ultimately billed to the appropriate Retailer/Advertiser via Billing System.

Retailer

The following summarizes the roles and information flows between the system and the retailer. The retailer requests distribution of advertisement messages and lease of tenant space in the CallMall. The retailer receives from screenTalk usage reports and customer orders in the Fax format.

The retailer approves ad content and target criteria for any ads sent regarding their products or services.

Retailer may provide actual target lists of subscribers who should receive their ad.

Retailer/advertisers receive detailed reports on message delivery and consumer response (View of "lot" component of DBM messages) information, as well as calls placed to retailers as a result of ad campaigns. Reports will be sent to retailers weekly.

Retailer will be billed via the Billing System based upon the number of consumers who have received advertisements, viewed "lot" messages, and visited the CallMall store.

Tenant Provided Services

The following summarizes the roles and information flows between the system and tenant provided services. CallMall tenants provide their own retail services, with the exception of fax order forms. Most services will be provided on external platforms and will interface to the system as an external telephone number. User interface and program flow are under the direction of the Retailer. The system will call transfer the consumer through the PSTN to one of the store's live agents or their own automated order taking system. Retailer/CallMall tenants receive reports that summarize consumer usage of their mall.

Billing System

The following summarizes the roles and information flows between the system and the Billing System. The Billing System receives rated usage information from the system for the following events which are billable to the appropriate retailer:

individual setup charges;

DBM usage charges at the campaign level; and

CallMall usage at the retailer level.

AD Creative House

The following summarizes the roles and information flows between the system and the Ad Creation House. Requests will go out to the AD Creative House to develop the text and voice requirements for specific screenTalk DBM advertisements. Once complete this information will be sent to screenTalk administration staff for entry into the system.

Sales Broker

The following summarizes the roles and information flows between the system and the Sales Broker. The Sales Broker agency sells DBM advertisements. The agency invoices the system for advertisements sold. The system administration manually issues a payment to the sales broker for advertisements sold.

Contracting retailers to advertise using screenTalk

Determining criteria to select target population

Demonstration of advertisements for retailer approval

SERVICE CONCEPTS OF SECOND EMBODIMENT

The service components implemented by the system are Display Based Marketing, the CallMall, and Enhanced Telephony Services.

DBM Service Concepts are as follows:

DBM message will not cause the consumer, or the system to incur long distance telecommunications costs to reach the retailer. Messages will be filtered to ensure the consumer can only access retailers whose messages are a free call.

DBM messages may be available in multiple languages. The consumer controls whether he/she will see messages in one or more languages. In the event that a message is available in multiple languages, the messages will be presented in the consumer's language preference.

"Little" messages will be downloaded multiple times per day.

Consumers can not remove specific ads or retailers from their profile or set. Retailer deleted ads will remain on the set and server until the next day.

When consumer hits "CALL" from a "lot" message the action taken is that server flashes to activate three-way-call, dials retailer, waits for answer, flashes, and drops (this means that the system captures successful completion events).

Consumers served by SPCS that do not provide a suppressed ring facility will not be delivered DBM "little" messages. They will instead use the interactive session to view both "Little" and "Lot" components of messages; accessed from a different FDM script.

A consumer is represented by a combination of telephone number and a screen based device. A given household may have multiple screen based devices and therefore be viewed as multiple consumers by the system.

A message will be associated with one "CALL" telephone number only. There will be no dynamic routing of consumers to different retailer destinations for the same message based on consumer location.

When retailers provide consumer target lists and want detailed feedback, the "lot" message will ask the consumer for authorization to release telephone number to the retailer. No other information will be released. This only applies when retailers provide the target list. No other retailers will be provided this information. This protects consumer privacy.

Messages in multiple languages will be viewed as a separate message per language for the same campaign. The pricing schema is to accommodate this approach.

DBM areas of interest Categories are different from CallMall areas of interest Categories.

Message creation will include prioritization of DBM messages but will not allow bumping of messages based on the same priority.

Messages will be targeted on a geographic basis to the levels of granularity provided by the Postal Code structure.

A few standard reports will be created to satisfy all retailers; they will NOT be built on an individual retailer basis.

Maximum messages "little" messages sent to consumer's screen based device will be a Message creation costs are a separate chargeable item.

Soft key labels will always be standard across all messages of a specific template. Soft keys will not be customized on a per message.

Message number does NOT have to be displayed on screen to let consumers know where they are.

Forty seconds after last voice segment an idle timer will disconnect caller to minimize server facility impact.

A PIN number is NOT required for access to Personal Agent services or Catalog Shopping services. It may be added at some future date.

Consumers will be allowed to view untargeted "little" messages in an interactive session with the CallMall. Consumers will only see untargeted "little" messages that can be reached within their free calling area.

Small business will be viewed as potential consumers. Return telephone numbers must support different dialing plans (ie 9+).

CallMall Service Concepts are as follows:

Consumers will not be billed for CallMall usage.

CallMall stores may be available in multiple languages. The consumer controls whether he/she will see stores in one or multiple languages. In the event that a store provides services in multiple languages, the store will be presented in the consumers language of preference.

A CallMall store will not cause the consumer, or system to incur long distance telecommunications costs to reach the retailer. Consumers will have access to CallMall stores in their Extended Area of Service (EAS) area only, unless 800 access or an application on the system is provided.

A store can be in up to 3 CallMall categories.

CallMall personal profile updates take effect on the next call after update by consumer.

Consumers customize the CallMall into a Personal Mall by specifically de-selecting stores by category. The default is to display all CallMall tenants within an EAS until specifically deselected by consumer.

There will be only one level of categorization for CallMall.

Telephony Service Script Service Concepts are as follows:

The system will support a delivery of a telephony service script for all users within a particular telco and residential/business service.

DETAILED DESCRIPTION OF SECOND EMBODIMENT

Technical Implementations

System Partitioning

Figure 24:
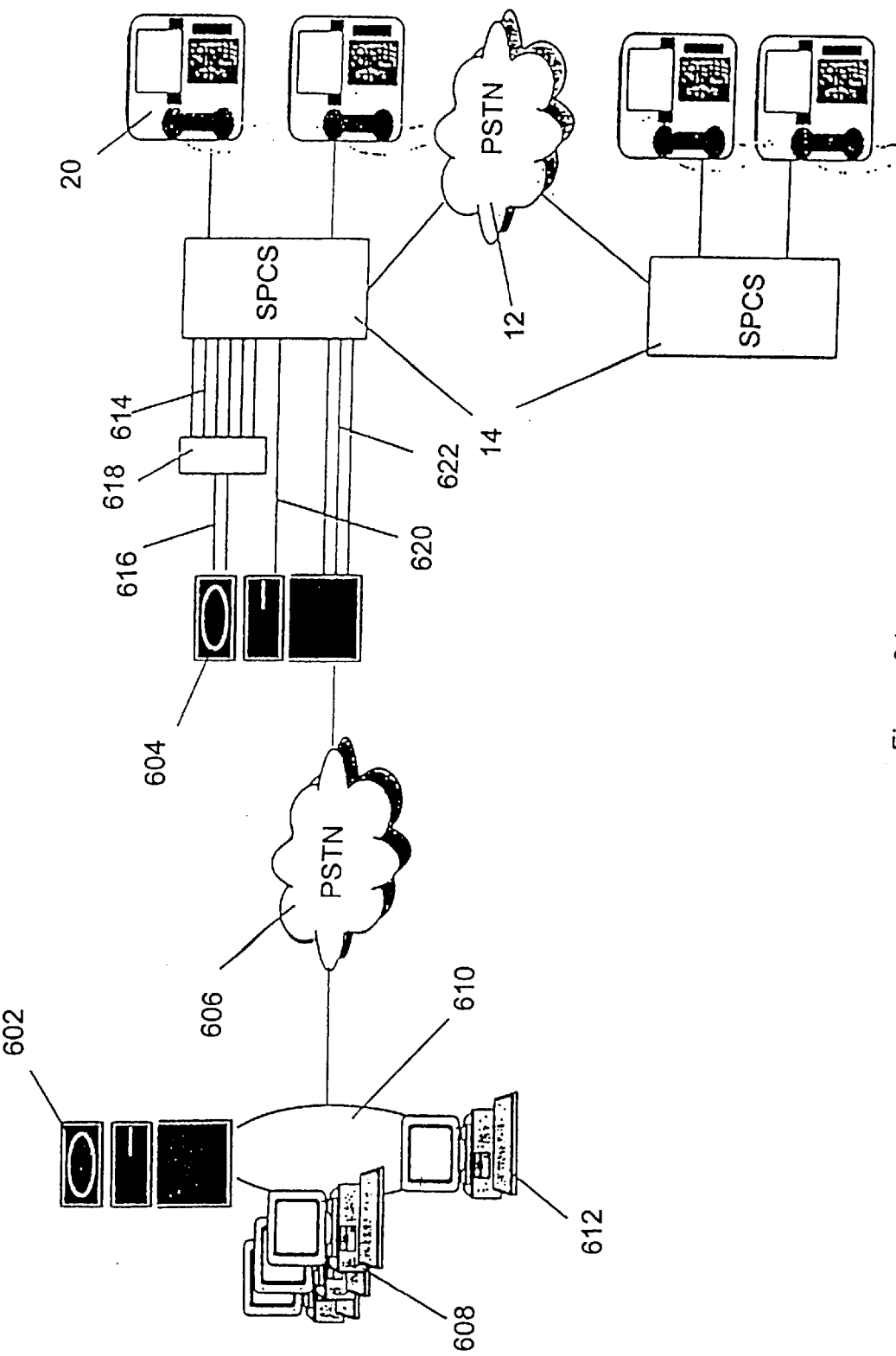
FIG. 24 is a diagrammatic representation illustrating the system physical partitioning of the second embodiment of the system.
Figure 25:
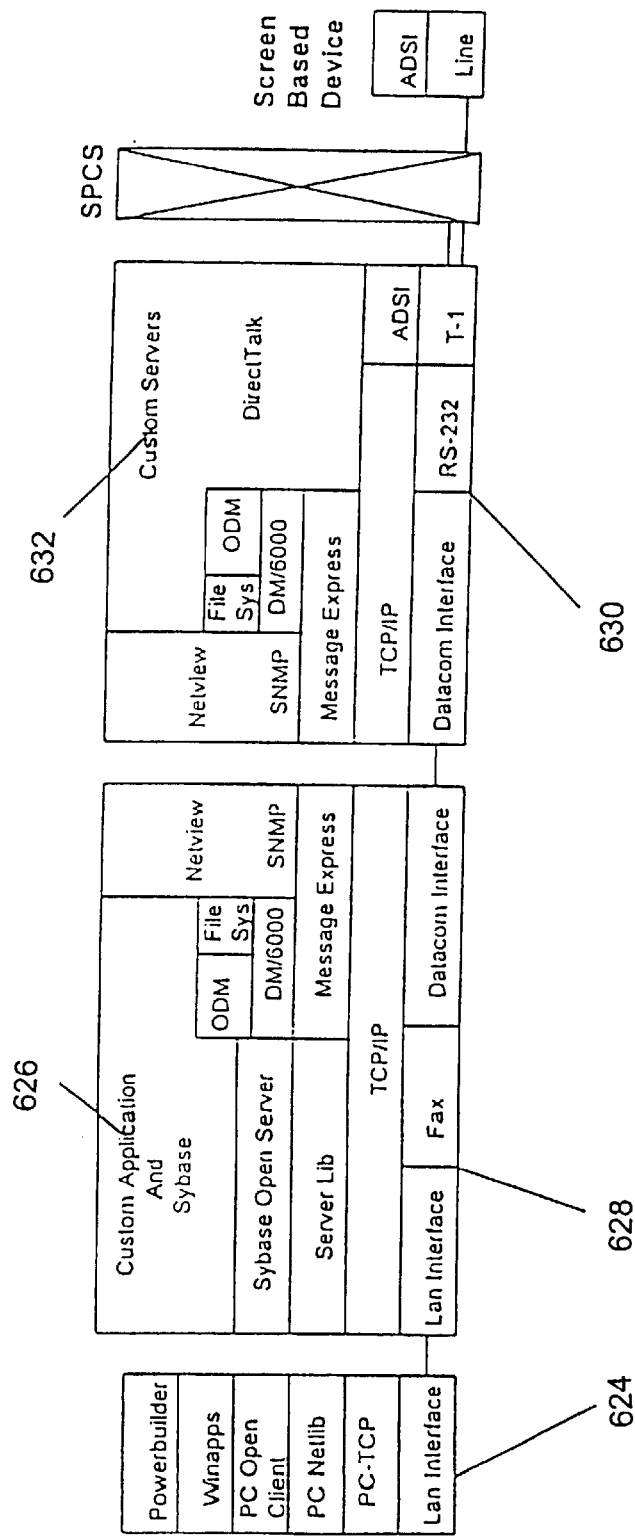
FIG. 25 is a diagrammatic representation illustrating the system software components of the second embodiment of the system.

The system consists of 2 major physical component types as detailed in FIG. 24: a Backend Administration and Operations Server 602, used for administrative, provisioning and billing functions, and one or more Frontend Application Servers 604, used to provide interactive application session with consumer's screen based devices and message delivery to consumer's screen based devices. The system was physically partitioned in this manner to permit centralization of business and operations functions (Backend) and the geographic distribution of the application servers (Frontend) to place these engines as close to large consumer bases as possible minimizing voice communication costs of the interactive sessions and message delivery sessions. The Backend and Frontend servers can be connected together by a plethora of data communications schemes 606, either a local area network if co-located or a wide area network if geographically distributed. The administration and operations personnel access Backend Administration and Operations Server via work stations 608 on a local area network 610. The billing system 612 will be a workstation on the same local area network.

Public Switched Telephone Network (PSTN) Requirements

For interactive sessions the Frontend is connected to one or more SPCS 14 in the Public Switched Telephone Network 12 via telephone lines 614 as detailed in FIG. 24. This is necessary as the Frontend must perform three-way-calls and call transfers. The Frontend physical connection is a T1 line 616 and the SPCS lines connection is an analog line requiring channel backs 618 to perform the signalling conversion. The Frontend requires calling number and called number information from the PSTN to identify consumers and what application to start. This information is provided to the Frontend by a Simplified Message Desk Interface (SMDI) 620 from the serving SPCS. The Frontend requires a suppressed ring facility 622 in the serving SPCS to be able to deliver the DBM messages in a non-intrusive manner. The suppressed ring facility allows the Frontend to place calls to consumer's unattended screen based devices 20 and establish a connection with unattended screen based devices without ringing the device. Suppressed ring facilities will be a feature of the serving SPCS and will be provided in varying methods. Suppressed ring facilities can be provided by a plurality of means not limited to Operator Verification type circuits that telephone operators use to "barge-in" on calls, or by Automatic Meter Reading Trunks as defined by IEEE SSC-31 Subcommittee 5, or by Generic Switching Requirements for Utility Telemetry Service TA-73565 as defined by BellSouth Telecommunication, or by Suppressed Ringing Service as defined by Stentor Resource Center Inc. Once the suppressed ring call has been made the means for communicating with an unattended screen based device are defined by Bellcore in the FR-NWT-000012 ADSI Specifications.

System Components

Both the Backend and Frontend hardware components are implemented using IBM RS/6000 hardware technology with the AIX operating system and the workstation are personal computers running DOS and Windows as detailed in FIG. 25. The major Backend software components 628, Frontend software components 630 and personal computer software components 624 are primarily commercially available products. Some customer applications 626 and custom servers 632 are incorporated as custom C code.

Major Data Areas

The screenTalk system stores data in four major data areas: consumer, retailer, ad and event.

Consumer

This data area contains information which pertains specifically to the consumer, as well as screen based device, available interest areas, etc. Consumer information deals with consumer identification, location, and profile data. The device information also deals with ADSI.

Retailer

This data area contains information that specifically defines a retailer. A retailer may be an advertiser in the case of Display Based Marketing (DBM), a tenant in the case of CallMall, or both. CallMall data in this area also covers types of CallMall applications and retailers' CallMall stores. Location information is also maintained within this area. Locations are defined in terms of a group of postal codes. Information is also maintained with respect to Extended Areas of Service (EAS's) or telephone free calling areas. An EAS is defined in terms of a group of NXX's.

Ad

This data area contains information which is specific to Display Based Marketing ads. This includes information that identifies and defines ads, and their contents. The contents include information involving the text, the voice, and the soft key components of the ads. This area also deals with information involving the targeting, reservation, and downloading of ads. Information involving the ad sales force, ad pricing, and ad discounting is also within this area.

Event

This facet contains information captured on the system for billing, reporting, and operational uses. Events are created for usage involving DBM Ads, CallMall stores, and consumer authorizations. Events created for retailers with respect to downloading ads, consumer responses to targeted ads (call and more), consumers entering CallMall stores, and consumers performing simple fax orders to CallMall stores are billable, whereas the others are merely reported. Operational events are those required to manage the screenTalk system itself and insure that it is performing properly. Information identifying specific consumer fax orders and their contents are also maintained in this area. This area also contains usage pricing information.

Table 1 defines the data tables inside each of the four major data areas.

Consumer Areas of Interest

Table 2 shows a small sample of possible consumer interest areas and category types that consumers would select from when choosing their areas of interest in the personal agent section of the CallMall. These are used by the system for DBM message targeting.

System Processes

The System is composed of 6 SubSystems. The SubSystems and their purpose are as follows:

SS1—Manage Consumer/Retailer/System Table Information

This grouping deals with the functionality that is required within the system administration office(s) for maintaining consumer, retailer, order, EAS, script, system table, back-end security and help information.

SS2—Manage Consumer Interactions

This grouping of functionality contains all of the interactive processing that takes place between the consumer's screen based device and the Frontend interactive server. These interactions deal with Display Based Marketing messages, and CallMall services including both shopping and personal agent functions.

SS3—Manage Ad Sales and Development

This grouping deals with the functionality that is required to administer, sell, create, forecast, and reserve Display Based Marketing messages. The administration deals with the sales force, as well as with ad development.

SS4—Manage Information For Distribution

This grouping contains all of the functionality necessary to manage information that is to be distributed from the Backend to the Frontends, as well as acquiring information for the Backend central from the Frontends.

SS5—Manage FDM Delivery

This grouping contains the functionality that deals with the delivery of Feature Download Management information to the consumer's screen based device. The FDM delivery deals with both scheduled downloads (unattended screen based device), and with those made upon consumer requests (on-line/interactive).

SS6—Manage Event Information

This grouping contains the functionality that is required to create screenTalk reporting and billing events based upon the raw events captured in SubSystems 2 and 5. It is also responsible for the creation of system reports.

Table 3 defines the functions that comprise each subsystem.

Administration and Operations

System administration and operations personnel will employ the administration and operations workstation (30) to perform the following tasks.

1. Manage DBM

Establish retailer in ScreenTalk and billing (if new)

Establish new campaign (if needed)

Establish new Ad
      input setup charges

Duplicate Ad and change language

Request Audio

Import target list from diskette

Determine postal codes to be targeted (optional)

Determine Target penetration for Ad

Respond to sales queries on potential target size and cost for criteria

Schedule Ad

Import Audios

Assemble Ad

Test/review Ad

Update Ad/request new audio

Replace audio

Ensure scheduled Ads in production status

Follow-up with retailers for next Ad

Respond to Queries about Ads

Provide diskette of consumer telephone numbers wanting info

2. Manage CallMall

Add/remove catalogues from catalogue store
      input setup charges

Add/remove speed call stores
      input setup charges

Add/remove fax order stores
      input setup charges

Send out fax orders

Update stores

Update catalogues

3. Manage Billing

Execute monthly billing Run

Manage physical mailing

Handle bill inquiries

Follow-up on past due accounts

Provide input to the GL

4. Manage report Preparation

Prepare and distribute report on consumers by interest areas

Prepare and distribute customer reports

Review customer reports and follow-up on any perceived problems

Prepare report for the field indicating retailers currently on the service

5. Prepare service indicator results

Query the system for performance indicators on a weekly basis

Prepare a report package

6. Manage Consumer Information

Add new consumers

Update consumer records from order activity

Remove consumers

Update consumers based on consumer calls

7. Complete incomplete fax orders

On a daily basis query the system for incomplete fax orders and complete any found Identify Consumers with multiple incomplete faxes and query to determine if the address should be changed 8. Maintain System tables (Define the inputs for changing each table)

9. Review suggestion box

Figure 26:
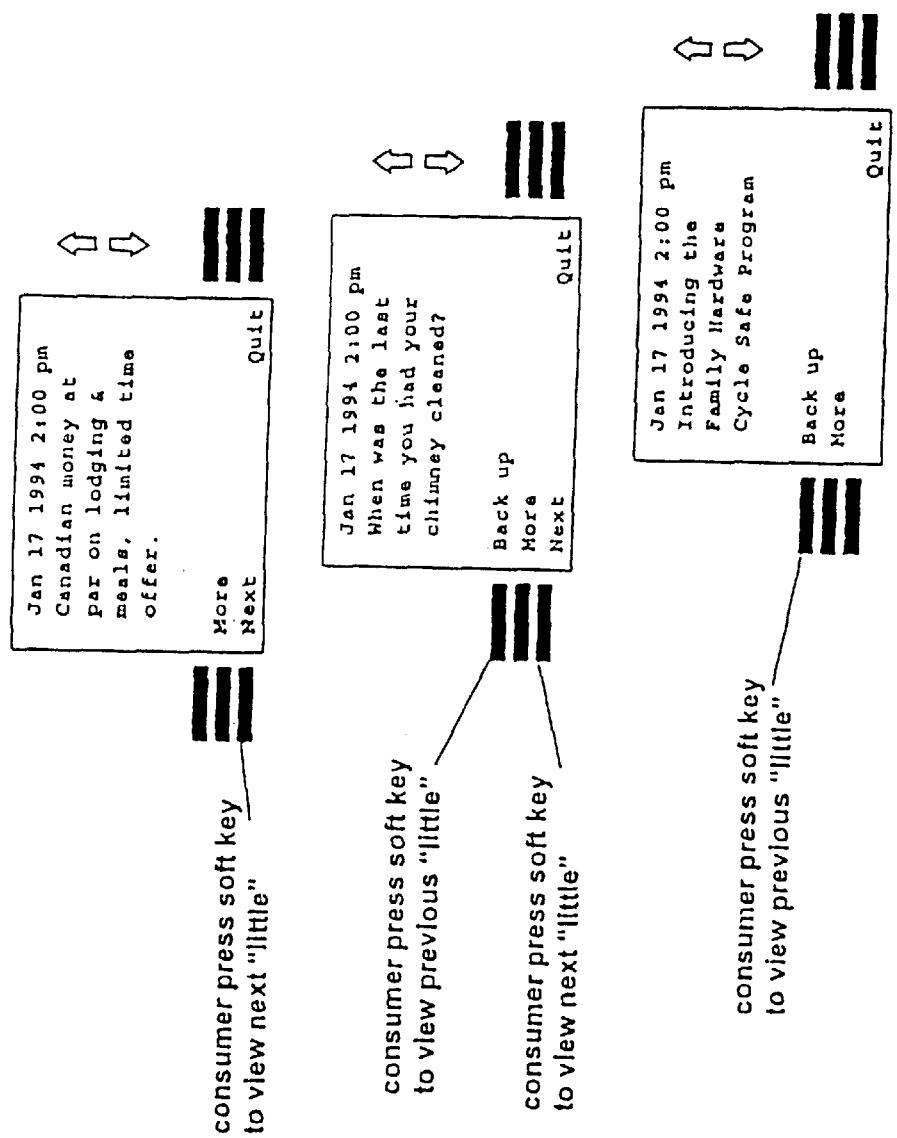
FIG. 26 is a diagrammatic representation of how DBM "little" messages are reviewed in the idle state of a Northern Telecom Vista 350 in the second embodiment of the system.
Figure 27:
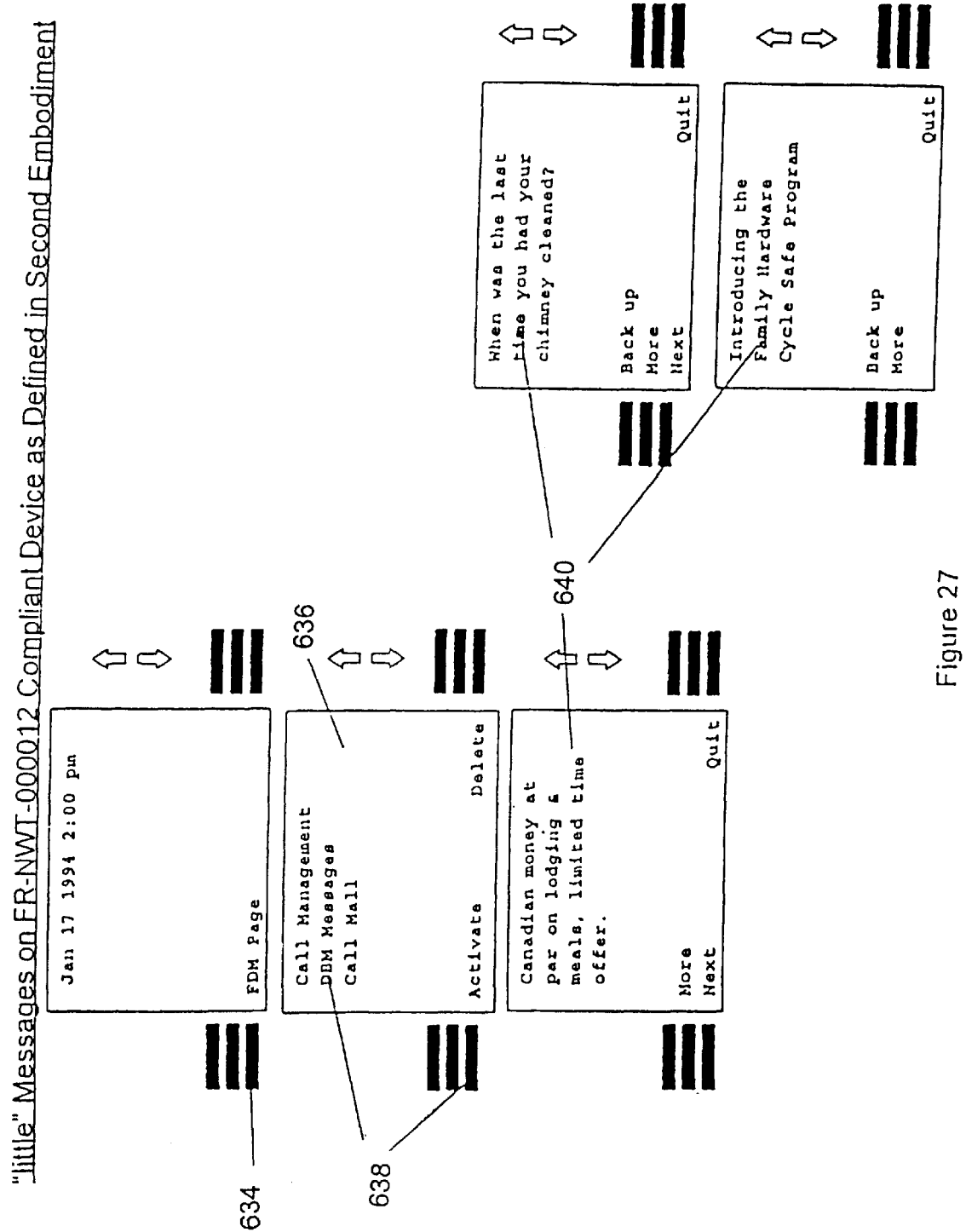
FIG. 27 is a diagrammatic representation of how DBM "little" messages are reviewed in the Feature Download Management facility of FR-NWT-000012 compliant screen based devices.

On a weekly basis listen to messages in the suggestion box and record any that need consideration 10. Manage accounts payable Review communications bill and prepare transmittal Produce report for Teledirect indicating billable DBM revenue Review Teledirect invoice and prepare transmittal 11. Other Telco script delivery fee charges 12. Operations The Operations group is responsible for:

response and recovery from system and network alarms and events daily backup of message, applications and event data implementation of security policies submission of regular batch processes maintenance of physical environment addition of necessary system resources to maintain service levels Consumer screens Consumers will gain access to the system services via screen based devices that comply with Bellcore's FR-NWT-000012 ADSI Specifications. The Display Based Marketing "little" message delivered through the public switched telephone network to consumer's unattended screen based devices in a non-intrusive manner are sent as Feature Down load Management Scripts. The Display Based Marketing "little" messages will appear on the idle display of the Northern Telecom Vista 350 screen based telephone as detailed in FIG. 26. In other screen based devices compliant with Bellcore's FR-NWT-000012 ADSI Specifications, as detailed in FIG. 27, the consumer will have to press a key 634 on the device to access the Feature Download Management Page 636. The consumer will activate a script item named DBM Messages 638 or screenTalk Messages to start the service script that allows the consumer to review the "little" messages 640.

Figure 28:
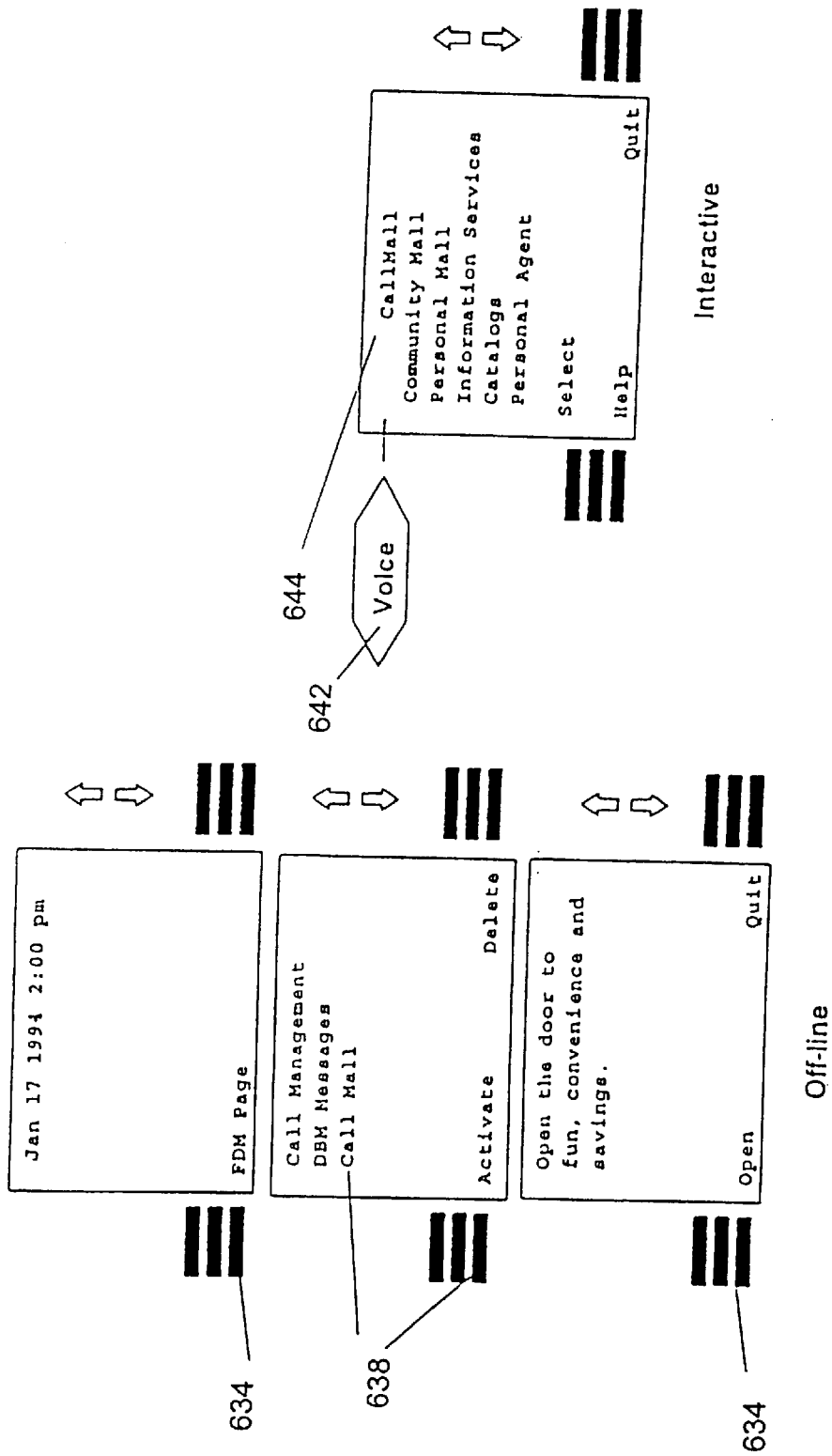
FIG. 28 is a diagrammatic representation of how the CallMall is accessed from the Feature Download Management facility of FR-NWT-000012 compliant screen based devices.

FIG. 28 details how the consumer will access the CallMall by both the Northern Telecom Vista 350 and other screen based devices compliant with Bellcore's FR-NWT-000012 ADSI Specifications by pressing a key 634 on the device to access the Feature Download Management Page 636. The consumer will activate a script item named CallMall 638. Once activated the script will prompt the consumer to select an "Open" 634 soft key that causes the screen based device to place a call through the PSTN to the system Frontend Application Server. When the server answers the consumer will be presented with the CallMall main menu 644 and an audio greeting 642.

FIGS. 29-01 to 29-33 details all screen flows the consumer would see when interacting with the system Frontend Server. The application can be either reviewing DBM "lot"

messages, checking DBM "little" messages because the consumer is served by a SPCS that does not support a suppressed ring facility, initialization of the consumer onto the system, or entering the CallMall. A test application is also provided for system administration personnel to test DBM messages.

The Frontend Application Server determines which application to start based upon the telephone number the screen based device has called by the consumer selecting a soft key, the calling telephone number of the screen based device and the CPE_ID of the screen based device, as defined by Bellcore's FR-NWT-000012 ADSI Specifications. The calling and called telephone number are passed to the Frontend Application Server by the serving SPCS over the Small Message Desk Interface.

Table 1

Data Tables by Major Data Area
Consumer Tables (Backend)
ADSI DEVICE TYPE

The ADSI protocol defines the minimum physical characteristics of a display device. This data structure defines the actual physical characteristics of each type of ADSI display device. This includes actual physical screen character width, physical number of display lines, and the number of soft keys available on the device.

ADSI SCRIPT

This data structure contains the compiled ADSI script used to supply screenTalk consumers with a visual component to residential telephony services, FDM default CallMall Services, and FDM default DBM services. Normally, each Telco will have 2 standard telephony scripts, one for each language. Development of the script will be external to the screenTalk system. STS will have no knowledge of the internal logic or specific telephony features supported by the script. This is not the case for the default FDM scripts where the information is known and maintained within STS.

CONSUMER

A consumer is a residential or small business subscriber to the services offered by screenTalk. The consumer data structure defines information needed to provide these services. It includes:

A telco_id and account number used to reference the Telco account information;
  Postal code information used to target DBM ads by location;
  Home shipping names and addresses for use by CallMall order applications;
  Language preference and custom personal agent voice;
  A language exclusivity flag, set to no if the consumer will accept ads in the alternate language if unavailable in the language of choice;
  A dial 9 indicator, used to modify FDM soft key return strings for consumers that prefix local calls with digit 9 (e.g., business consumers);
  An adsi_downloadable_code that indicates whether this consumer can be downloaded in a server-initiated, on hook fashion. Examples of non-downloadable devices include sets served by digital loop carriers or PBXs. Initially set to "test", this field will be updated to "yes" after the first successful download to the consumer's device, or to "no" if subsequent downloads up to a maximum fail download (as captured by the fail_ download counter for the consumer);
  Version numbers for the standard FDM scripts that STS supports (i.e., the CallMall and Telephony standard scripts); and
  Information pertinent to the media type that the consumer owns (currently ADSI).

CONSUMER INTEREST

Consumers may signify their interest in one or more interest areas. Any ads specific to those interest areas will be delivered to those consumers. This data structure indicates the interest areas selected by each consumer.

CONSUMER RESPONSE

This data structure is used to store response counters on a per consumer per interest area basis. This data is intended for use in ad targeting.

DEFAULT FDM GROUP SCRIPT

This data structure is used to associate the appropriate default FDM scripts (Default DBM and CallMall) for a fictitious telno group with the corresponding ADSI script translation (See FICTITIOUS TELNO GROUP). This structure also maintains the date that the ADSI script was downloaded to the corresponding consumer population.

DEFAULT FDM SCRIPT

This data structure is used to store information relevant to the default FDM scripts needed to support the screenTalk service. Information stored includes text and soft keys, as well as data needed to maintain FDM download security. Current scripts supported are:

Default DBM Script—New consumers receive this script after successful initialization. It allows access to the consumer's current messages in an SDC mode. For non-downloadable consumers, this script will always be used to access DBM messages.
  Default CallMall Script—This script allows access to the CallMall component service of screenTalk.

DEFAULT FDM SCRIPT TYPE

This data structure currently only contains the 2 types of FDM default scripts: one for the default CallMall script, and one for the default DBM script.

EAS

This data structure is used to store instances of valid EAS (Local Calling) areas inside a given Home NPA (Area code).

EAS AREA

Each EAS area allows free calling to a number of NXXs. An entry in this data structure represents an NPA/NXX that can be reached with a local call by callers with the given eas_id.

FICTITIOUS TELNO

Consumers will normally access the screenTalk system by pressing preprogrammed soft keys. Since consumers will be in different calling areas, it is necessary to program these soft keys with numbers that can be dialed by the consumer without incurring charges. This data structure is used to store instances of fictitious telephone numbers for each Fictitious Telno Group.

FICTITIOUS TELNO GROUP

Consumers calling the screenTalk system will normally access the system via preprogrammed soft keys that dial fictitious telephone numbers that forward to the appropriate Frontend server. At least one set of fictitious numbers is required for each Frontend server. A server may require more than 1 set of numbers when it's consumers are in 2 calling areas without a local NXX in common. This set of numbers is referred to as a Fictitious Telno Group. Instances are stored in this data structure.

FICTITIOUS TELNO TYPE

This data structure is used to store the valid fictitious number types used by the screenTalk system. Current known types are:

DBM relative line numbers—One of 24 fictitious numbers that correspond to the relative position of the ad that the consumer is currently viewing.

CallMall Fictitious Number—Used to access the CallMall Main Menu.

DBM Test Fictitious Number—Used to test ads prior to production.

Consumer Initialization Number—Used by new consumers to initialize their profile for the first time. Used by non-downloadable consumers to access their DBM ads using ADSI SDC (The default DBM FDM script downloaded to new consumers contains this number).

INTEREST AREA

This data structure represents the valid interest areas in the screenTalk system. Each interest area describes a category of DBM or TalkMail advertisement. (e.g., food, hardware, etc.) See Appendix A for examples of Interest Areas.

NXX EAS ASSIGNMENT

This data structure is used to store the eas_id associated with each NPA/NXX combination. This structure will be indexed to determine, for a given consumer, which community data structures can be accessed (e.g. Community Mall Store, More Flyers)

PERSONAL AGENT VOICE

The screenTalk system will provide audio prompts that supplement and enhance generic display menus. A consumer will select the personal agent voice used for these prompts from a list of famous personalities (e.g., Marilyn Monroe, Elvis Presley). This data structure represents the available personalities available in each language.

PERSONAL MALL STORE

Consumers may create a personal list of CallMall stores (up to 8) for ease of viewing purposes. This data structure defines this. An entry will be provided in this data structure for each consumer instance of a CallMall store that has been selected by the consumer from the list of stores available in the Community Mall Store. Note: New consumers will not have personal entries in this data structure. They may add entries using Profile Management.

TELCO

This data structure is used to store information particular to telcos participating in the screenTalk service.

TELCO TELEPHONY SCRIPT

This data structure is used to store FDM security information necessary to maintain the standard telephony script for a specific telco.

Consumer (Frontend)

consumer_name_address

This data structure stores the consumer name and address delivered to screenTalk retailers with sent catalog or CallMall store orders.

consumer_profile

Each consumer on the screenTalk system will have an associated record in the consumer_profile table, storing profile information such as language preference, personal mall store entries and interest area selections.

consumer_name_address

This table stores consumer shipping information provided to the retailer by the on-system CallMall Store order process.

fictitious_number

This table stores all fictitious numbers used by the server. The Frontend server uses the called number to decide which service to initiate for the consumer, as well as the relative ad line position being viewed by the consumer (In the case of DBM).

init_consumer

This table contains a list of consumers who have called the initialization number to get their phone reinitialized. For consumers with entries in this table, at targeted download time, a full script including the soft key table will be downloaded to their set.

interest_code

This table stores the valid interest area codes and their display labels in the appropriate language. See INTEREST AREA.

targeted_download

Each screenTalk consumer will have an entry in the targeted_download table, used to define which ads should be downloaded to the consumer, as well as which ads are currently resident in the consumer's set.

Retailer Tables (Backend)

AR ACCOUNT

All screenTalk Retailers must have an Account on the Accounts Receivable system. This data structure represents that structure.

CALLMALL CATEGORY

Each CallMall retailer will be associated with a CallMall category, which identifies the classification(s) the retailer falls into (e.g., financial services). This data structure stores the valid CallMall categories, and the label in both official languages for each.

CALLMALL STORE

This data structure stores the information pertinent to a retailer's CallMall store. Information required includes: the telephone number that is used to reach off-system retailer applications, a fax telephone number used to forward orders for on-system shopping retailer applications, and a cm_store_name used to provide the display item entry for the CallMall store on the consumer's display. A language_code is used to indicate French or English service. When service in both languages is available, the related_cm_store_no field reflects this.

CATALOG

This data structure is intended to store instances of retailer catalogs for use in the catalog fulfilment application, an application designed to allow consumers easy access to catalogs offered by screenTalk retailers. The information stored in this structure includes:

The catalog_name that the consumer sees on the screenTalk set;

The 800 inquiry number that can be used to call the retailer directly, if provided;

The 800 number that can be reached to access the retailer to order the catalog, if the retailer elects to use this method for catalog ordering rather than the screenTalk Fax service;

The Fax number used to send retailers consumer catalog requests for those retailers using our Fax service;

A text and voice segment that presents the consumer with supplemental information about each catalog; and A language code and related_catalog_no field, used for presentation of catalogs in the appropriate consumer language.

CATALOG CM CATEGORY

This data structure is used to allow presentation of catalogs to consumers in their language of choice, by chosen category. A language_code and language_exclusive_flag allow presentation to exclusively French or English consumers, as well as those that have signified their desire to access services in both languages. (See COMMUNITY MALL STORE for more details on language presentation).

CM VOLUME DISCOUNT

This data structure is used to store the discount available to a CallMall retailer based on the total dollar business volume for all applications for the retailer. This includes any CallMall stores, Catalogs, Mall activities or Information services owned by the retailer.

COMMUNITY INFO SERVICE

Consumers accessing the information services provided in CallMall will be presented any information services that can be accessed by the consumer with a local call (i.e., in their EAS area), in their preferred language (or in the alternate language if desired and the service is not available in the preferred language). This data structure is used to store the available information services by EAS area and language.

COMMUNITY MALL STORE

Consumers accessing the CallMall will have access to all CallMall stores in their EAS area, sorted by CallMall categories. This data structure contains an entry for each CallMall store available in the EAS area in the available CallMall categories. Since CallMall stores may be available to consumers in several EAS areas, and CallMall stores may appear in multiple categories, one store may appear in this data structure many times. A language_code denotes English or French, and a language_exclusive_flag is used to denote whether this list of stores should be seen by consumers accepting both English and French stores. The list of stores the consumer sees when accessing the "More Stores" menu item is dependent upon:

Consumer EAS area—To avoid toll bypass, a consumer can only access a store that he/she can reach without incurring long distance charges. (i.e., stores with local or 800 numbers, or stores with on-system applications).

Consumer Language—Consumers will be presented with stores in their preferred language.

Language Exclusivity—Consumers may elect to see stores in the alternate language as well. (Consumer language_exclusive_flag set to "No"). When a store is only available in the alternate language (as determined by the related_cm_store_no flag on the store) it will be presented to those consumers wishing to see stores in both languages.

INFO SERVICE

Certain applications in the CallMall will be classified as information services, for example, a weather line, road report, lottery numbers, etc. These will be accessed by the consumer under the "Information Services" CallMall menu item. This data structure is used to store the data relevant to services of this type. Information stored here includes:

The service name used in presentation to the consumer's display;

The telephone number used to access external information service applications;

Text and voice segments used to provide the consumer with more information about the service;

A flag that denotes if this information is free to the consumer (Note: the screenTalk system does not bill or charge consumers in any way. This flag is used solely for presentation purposes on the consumer's screen: Pay services will be flagged as such);

A language code and related_info_service_no used to determine appropriate language presentation to the consumer; and An application_id used to reference the correct application.

MALL ACTIVITIES

Certain applications in the CallMall will be classified as Mall Activities. These will be accessed by the consumer under the "Mall Activities" CallMall menu item. This data structure is used to store the data relevant to services of this type.

Information stored here includes:

The service name used in presentation to the consumer's display;

An 800 telephone number used to access external Mall activity applications;

A language code and related_info_service_no used to determine appropriate language presentation to the consumer; and An application_id used to reference the correct application.

MISCELLANEOUS FINANCIAL TRANSACTION(CIS/BILLING)

The rating process in the screenTalk system summarizes billable events into the layout required for Miscellaneous Financial Transactions. These records are passed to the CIS/Billing system to be processed and billed.

Note: This is no longer true, as CIS will not be used for billing. This data structure kept here as a placeholder only.

ORDER ATTRIBUTE

This data structure stores the information pertinent to all valid attributes available to CallMall stores using an on-system order application. Examples of order attributes include Product Code, Color, or Size. Information stored here includes the attribute label to be presented on the consumer's display (in both official languages), as well as a voice segment id in both languages. An alphanumeric flag is used to indicate if consumer input entry should be numeric or alphanumeric.

PAYMENT TYPE

This data structure is used to store the valid credit card types that a retailer may choose to utilize. A label in both English and French is provided for consumer presentation.

RETAILER

This data structure stores the information pertinent to a screenTalk retailer, both for retailers advertising using the system or having CallMall applications (CallMall stores, information services, etc.). Information captured for each retailer includes the retailer name and address, status, and a retailer contact name and number. A discount percentage value may be applied to all billed events for stores owned by the retailer at rating time.

RETAILER CM CATEGORY

This data structure is used to store the CallMall category or categories that a retailer is classified under. All CallMall stores and catalogs for the retailer will be presented to the consumer under these categories. For technical reasons this entity will be limited to a maximum of 3 categories per retailer.

RETAILER ORDER ATTRIBUTE

This data structure is used to store attribute information needed for retailers using an on-system order application. Each attribute for the particular retailer application is stored here, with a sequence number that is used to determine consumer presentation order.

RETAILER PAYMENT TYPE

This data structure is used to store the types of credit cards that each retailer will accept, for use in order applications such as the on-system order and catalog fulfilment applications. An entry is stored here for each retailer/payment type combination. A sequence number allows the retailer to select the order of presentation to the consumer.

SETUP CHARGE

New retailer applications may be charged a setup charge at subscription time. This data structure is used to store, for each retailer, a setup_charge_amount if applicable, defaulting to the amount associated with the setup type (see SETUP TYPE data structure). The date and time that the charge occurred is stored, as well as the setup_type (Ad setup, CallMall store setup, etc.). A set_up_item field is provided that stores relevant to the setup_type—for ad setup, this field will contain the ad_id, while for a CallMall store setup the field will contain the CallMall store number.

SETUP TYPE

This data structure is used to store the valid system setup types, with a description and default setup charge.

Retailer Tables (Frontend)

catalog

This table stores information pertinent to catalogs participating in the CallMall catalog Fulfilment application. Information stored here includes catalog language data, application initiation parameters and the categories under which the catalog falls.

cm_category_name

This table stores the display labels in both languages for the valid CallMall categories. cm_store_appl Each CallMall store handled by the Frontend server will have an entry in this table. This table is accessed to determine which application to initiate when the store is selected, as well as any parameters needed by the invoked application.

communityNNNN

Each EAS area handled by the Frontend server has a separate communityNNNN table (Where NNNN=eas_id; see EAS). This table stores the store numbers, display labels, language and category information for the associated CallMall stores. A CallMall store may be available in more than one EAS area. Hence, a CallMall store may appear in more than one communityNNNN table.

credit_card_list

This table stores an entry for each valid credit card in the system, and the display label for the card in each language.

info_serviceNNNN

Each EAS area handled by the Frontend server has a separate info_serviceNNNN table (Where NNNN=eas_id; see EAS). This table stores the info service numbers, display labels, language and application startup information for the associated info services. An Info Service may be available in more than one EAS area. Hence, an Info Service may appear in more than one info_serviceNNNN table.

retailer_credit_card

This table stores the valid credit card types in use for each specific retailer (See RETAILER PAYMENT TYPE, PAYMENT TYPE and credit_card_list). The system supports up to 8 credit cards per retailer.

retailer_order_attribute

This table contains all order attributes for each retailer (See ORDER ATTRIBUTE and RETAILER ORDER ATTRIBUTE for details).

Ad Tables (Backend)

AD

One of the key components of the screenTalk system is the delivery of targeted marketing messages (ads) from retailers to consumers. The ad data structure includes information that allows the ad to be targeted to the appropriate set of consumers—ad telephone number (which determines the EAS areas to be targeted), language and targeting postal code—as well as fields that relate to the ad media type (ADSI or TalkMail) A flag indicates the ad status (test, under development or in production). Rollup counters keep download and response information for both targeted and untargeted consumer interactions.

AD SCHEDULE

ScreenTalk ads are delivered 3 times a day. An ad may be delivered multiple times. This data structure represents an ad delivery instance, by delivery date and download number (1 to 3) within that date. Note: This data structure may be explicitly populated by screenTalk administrative personnel, or populated by the system using the current download counter when default scheduling is acceptable.

AD CATEGORY

This data structure is used to store the valid ad categories assignable to an ad. Ad categories are used in analysis of DBM consumer response events to glean more information about the consumers responding to the ad. See AD CLASSIFICATION for details on the use of ad categories. See Table 2 for examples of Ad Categories.

AD CATEGORY TYPE

Ad category types subdivide ad categories into logical groupings related to an interest area, primarily as a navigational aid to a screenTalk administrator assigning ad categories to an ad at ad assembly time. Example: An ad's objectives are to sell men's footwear. The interest area for the ad in this case will be "clothing". The ad categories assigned to the ad through the ad classification data structure will be "male" and "footwear". The ad category type that allows the administrator to quickly find the "male" category is "sex"; to find "footwear" is "clothing type". Note that in this example, neither the "sex" or "footwear" category types describe the ad, but act purely to classify the ad category inside the interest area. See Table 2 for examples of Ad Category Types.

AD CLASSIFICATION

This data structure relates ads to specific ad categories. Ad categories are used in analysis of DBM consumer response events to glean more information about the consumers responding to the ad. For technical reasons an ad was limited to being able to be associated with up to a maximum of 5 ad categories. Example: An ad's objectives are to sell men's footwear. The interest area for the ad in this case will be "clothing". The ad categories assigned to the ad through the ad classification data structure will be "male" and "footwear". Consumers responding to this ad may be inferred to be interested in men's footwear, even though they have only explicitly selected the broad interest area "clothing". Note: targeting to the consumer is based only on the interest area. The ad classification is not used.

ADSI SDC LITTLE/LOT

Ads with display components are translated into ADSI protocol. The translated components (both little and lot) are stored in this data structure. This is done to minimize the overhead necessary in ADSI translation by translating once only.

AD TYPE

This data structure stores the valid ad types in the system. Currently, valid ad types are regular, priority and system ads. System ads are sent to all consumers, bypassing interest area and EAS screening. System ads are only used for public service messages. Priority ads are placed on the top lines in the consumer's physical device.

CAMPAIGN

Each ad will be associated with a campaign. The campaign data structure provides campaign objective information, and identifies campaign capping and discount information (See CAMPAIGN PRICING for details on capping) . Ads for the same retailer with the same ad objectives will be linked together through the campaign data structure (An example might be ads with different call numbers for different EAS areas). The campaign also contains an attribute identifying the interest area for the ads in the campaign (Ads will only be targeted to consumers that have selected the ad's interest area).

An ad_type attribute identifies priority, system or regular ad types.

An explicit schedule attribute identifies those ads not using default the default ad scheduling algorithm (See AD SCHEDULE and CURRENT DOWNLOAD for more details).

CAMPAIGN PRICING

Charges to retailers for ad campaigns will be based on a "capping" formula. This formula will use the quantity of downloads forecast, and an expected response percentage to calculate the cap. "Responses" include responses due to consumers accessing "lot" message components (pressing "MORE" soft key) as well as those using a soft key to call the retailer. This calculation is made as follows:

CAP=download percent * download rate* forecast downloads+more rate * more percent * forecast downloads+call rate * call percent * forecast downloads Rates for response and download will be derived from the Billing Rate data structure (See Event for details).

Retailers will be charged based on either actual downloads and responses or the cap amount, whichever is less.

CAMPAIGN VOLUME DISCOUNT

Retailers whose ad campaign charges fall within certain dollar ranges may qualify for volume discounts. The discount percentage to be used at rating time is contained in this data structure.

CONSUMER LIST

At forecast time, the specified ad interest area and other targeting criteria will be used to create a list of consumers to target, placed in this data structure. This list may be large; this data structure allows the list to be segmented (e.g., based on response history), thus allowing more effective targeting.

CURRENT DOWNLOAD

This data structure merely stores a counter which indicates, when scheduling an ad with default scheduling, which download number the ad should be scheduled in on day 1. Note: Default scheduling will use the following algorithm: Ad will be scheduled using the current_download_number on schedule day 1. For ad schedule day 2, this value will be incremented (or set to 1 if previous value was 3).

LITTLE AD TEXT

ScreenTalk DBM ads, when employing ADSI, will follow the "little/lot" model. The "little" component of the ad will be delivered to the consumer's display device. This data structure itemizes the information required for the "little" component, including the text to be sent to the display device, and required standard soft keys.

LOT AD TEXT

DBM ads employing ADSI may include a "lot" component, which provides supplemental information to the "little" component. The lot ad text data structure, on a per ad, per line basis, provides the display text information to be sent to the consumer's display device when the consumer is involved in an interactive session. Note: "lot" components will be limited to 33 lines per ad.

MORE FLYERS

ScreenTalk consumers may choose to view any current production ads in the consumer's EAS area by interest area, even if these ads are not targeted to the consumer. This capability is accessed via a menu item labelled "More Flyers".

An instance in the More Flyers data structure is identified by the NPA, EAS, language, interest area and production ad_id. Note: A given production ad may show up in multiple More Flyers instances, one for each EAS area that the ad is local with.

PROGRAM DISCOUNT

Retailers agreeing to participation in DBM ad campaigns for an extended period will be offered discount rates called program discounts. This data structure stores the valid program discount codes, used to provide default discount rates to the retailer program discount data structure.

RETAILER PROVIDED LIST

A retailer may optionally provide a list of telephone numbers to be sent a specific ad. This list is validated against the screenTalk consumer base, and valid entries are stored in the retailer list entry data structure. An entry in this structure is identified by an ad_id and consumer telephone number.

RETAILER PROGRAM DISCOUNT

This data structure stores, on a per retailer basis, the program discount that should be applied to retailer charges at rating time, and the start and end dates between which this discount applies. Note: although program discount rates are related to time period, the system will not base rates on start and end dates in this data structure.

SALES AGENCY

Sale of ads and campaigns to retailers will be conducted by sales agencies. The sales agency data structure stores information pertinent to the agency (name, address, contact information, etc).

SALES PERSONNEL

Associated with sales agencies and acting as agents for retailers during specific ad campaigns are sales personnel. This data structure stores information pertinent to a sales person in a sales agency, including a sales_id and name.

TARGETED AD RESERVATION

Ad reservation involves the following steps:
Selection of a consumer list by community (EAS Area);
Further selection based on consumers whose profile matches the ad postal code criteria; and
Further selection based on consumers whose interest area matches the ad's interest area.

The list of consumers resulting from the above operations comprises the reservation list for the ad. The targeted ad reservation data structure stores an entry for each instance of a reserved ad in a consumer's download date and download number. Note: ads entered here are not guaranteed delivery, as ads may be scheduled here before entering production status.

TARGETED DOWNLOAD

This data structure stores, for each consumer download instance, the ads and their relative position in the consumer's ADSI device. A flag indicates whether this download has been successfully sent to the consumer's device.

Ad Tables (Frontend)

ad_indexNNNN

An ad_indexNNNN table exists for each EAS area supported by the Frontend server. (NNNN=eas_id, see EAS). Defines the ads available to consumers in the EAS, the interest area that the ad falls into and the ad language.

little_ad_text

For each ad_id, this table contains the associated "little" ad text sdc_lot_call_number This data structure is used to associate the ad_id with the number to be dialed when a consumer viewing the "lot" component of the ad presses the associated "Call" soft key.

Event Table (Backend)

APPLICATION TYPE

This data structure stores the valid application types, used to start up CallMall store or information service applications. Examples of valid application types include speed call, fax order, or custom applications. In order to correctly invoke the custom application, an identifier unique to that application is stored here.

BILLING CODE

This data structure stores instances of valid event codes, a description of each code, and the billing code for the event code, used to determine retailer charges.

BILLING RATE

This data structure stores instances of billing rates for event code/billing code combinations. More than one entry for the same event code/billing combination may occur here, differentiated by the effective date.

CALLMALL USAGE

This data structure stores instances of general CallMall Usage events. The two types of events captured in this structure indicate consumers entering the mall in general, as well as when they specifically enter the personal agent.

CONSUMER DBM AUTHORIZATION

This data structure stores consumer DBM authorization event instances. A consumer DBM authorization event is triggered when a consumer authorizes release of his/her telephone number to the retailer providing a retailer list by pressing a soft key provided for this purpose while in a "lot" session.

CM CATALOG USAGE

This data structure stores event instances relating to the Catalog Fulfilment application. Event types captured here include inquiry calls to retailers, successful catalog orders or successful calls to retailers for those retailers requiring live agent assistance to order catalogs.

CM INFO USAGE

This data structure stores events relating to the Information Services component of CallMall. Like CM STORE USAGE, events captured in this structure include successful calls to information service applications, as well as successful invocation of custom applications.

CM STORE USAGE

This data structure stores instances of CallMall store usage by consumers. CallMall store usage events include successful call on behalf of a consumer to a CallMall store, successful invocation of a custom application, or the successful transmittal of order information to a retailer for a home shopping session.

CONSUMER ORDER

This data structure stores instances of order events. Information captured in this data structure includes the retailer telephone number, the consumer, and details about the consumer necessary for shipping. This data structure stores this information for billing and archival purposes. Note: Incomplete orders where the consumer provides the shipping information via a voice recording will also be captured. Administration staff will use the voice to create the appropriate textual entry.

CONSUMER VOICE

This data structure is created by the consumer when they want to use a shipping name and address for an order that is not on the order screen. In this situation the consumer records their desired name and address information for the particular order. Administration staff will receive this order as incomplete, and they will add the text to the order based upon the voice recording.

DBM USAGE

This data structure stores instances of DBM usage by consumers. The information captured in these events is used to update the values of the appropriate actual usage fields on the appropriate Ads. It is necessary to identify these events as; targeted or untargeted (accessed from "More Flyers"). DBM usage events are triggered when a consumer:

Responds to the "little" component of an ad by pressing a "More" soft key to request a "lot" component; and
Presses a "Call" soft key, either from the "little" or "lot" components of an ad.

EVENT GROUP

This data structure groups event types together into event types of similar format. Valid event groups are: CM Store Usage, Consumer DBM Authorization, DBM Usage, FDM Download, CM Info Usage, CallMall Usage and Mall Activity usage.

EVENT TYPE

This data structure stores instances of valid event codes and an accompanying description, with a flag to indicate whether this event_code is billable.

FDM DOWNLOAD

This data structure is used to store instances of DBM downloads for consumers, as well as download of default FDM scripts. Note: One DBM download event infers successful delivery of several DBM ads to a consumer. The information captured in these events is used to update the values of the Actual Download fields on the appropriate ADs.

MALL ACTIVITY USAGE

This data structure stores event instances relating to consumer use of the Mall Activity services within the CallMall. These events capture specific consumer invocations of specific mall activities.

MONTHLY ACTIVITY USAGE

This data structure contains a counter per event type generated by instances of Mall Activity Usage (See MALL ACTIVITY USAGE). It is maintained to facilitate queries of event data.

MONTHLY CATALOG USAGE

This data structure contains a counter per event type generated by instances of CallMall Catalog Usage (See CM CATALOG USAGE). It is maintained to facilitate queries of event data.

MONTHLY CM USAGE

This data structure contains a counter per event type generated by instances of general CallMall Usage (See CALLMALL USAGE). It is maintained to facilitate queries of event data.

MONTHLY INFO USAGE

This data structure contains a counter per event type generated by instances of CallMall Info Usage (See CM INFO USAGE). It is maintained to facilitate queries of event data.

MONTHLY STORE USAGE

This data structure contains a counter per event type generated by instances of CallMall Store Usage (See CM STORE USAGE). It is maintained to facilitate queries of event data.

ORDER DETAIL LINE

This data structure stores information pertinent to the product attributes of a given consumer order; product code, quantity, price and color are some examples. This structure stores both the product label in the appropriate language and the value input by the consumer.

Backend—Frontend Messaging

The following defines communications messages that flow between Backend and Frontend:

BE_REQ_NEW_CONSUMER_INIT

This message is sent to the appropriate Frontend when a new consumer is provisioned on the screenTalk system.
    Message_Type=1
    Message_Number=1
BE_REQ_CONSUMER_INFO_UPDATE Sent to the appropriate Frontend Server to update the shipping name and address of the consumer when a change is necessary.
    Message_type=1
    Message_Number=2
FE_UPDATE_CONSUMER_CPEID
Sent to the Backend when a consumer initializes his/her set on the Frontend server; used by the Backend to obtain the cpe_id for the consumer.
    Message Type=2
    Message_Number=1
FE_UPDATE_CONSUMER_INTEREST_AREA
Sent to the Backend when a consumer changes his/her selected interest areas.
    Message type=2
    Message_Number=2
FE_UPDATE_CONSUMER_MALL_SELECTION
Sent to the Backend when a consumer changes his/her personal mall selection.
    Message Type=2
    Message_Number=3
FE_ORDER_DETAIL_LINE
This message is sent to the Backend after successful capture of a CallMall Order from a consumer (Fax Order application type). It contains the relevant details of the order.
    Message Type=2
    Message_Number=4
FE_CATALOG_DETAIL
This message is sent to the Backend when a successful consumer's catalog fulfilment order is captured. Provides details on the order.
    Message Type=2
    Message_Number=5
FE EVENT UPDATE MESSAGE
Events captured in the Frontend server will be delivered to the Backend with a FE_EVENT_UPDATE_MSG message type.
    Message Type=3
    Message_Number=Event Type

TABLE 2

| Areas of Interest | | |
| --- | --- | --- |
| Interest Area | Category Type | Sub-Category |
| Food & Groceries | Food & Groceries | Dairy |
| Food & Groceries | Food & Groceries | Dry Goods |
| Food & Groceries | Food & Groceries | Fruit/Vegetables |
| Food & Groceries | Food & Groceries | Health Food |
| Food & Groceries | Food & Groceries | Meat/Fish/Poultry |
| Food & Groceries | Food & Groceries | Package Goods |
| Food & Groceries | Food & Groceries | Specialties |
| Dining/Restaurants | Price/Atmosphere | Fast Food |
| Dining/Restaurants | Price/Atmosphere | Casual Dining |
| Dining/Restaurants | Price/Atmosphere | Fine Dining |
| Dining/Restaurants | Type of Cuisine | Canadian |
| Dining/Restaurants | Type of Cuisine | Chinese |
| Dining/Restaurants | Type of Cuisine | French |
| Dining/Restaurants | Type of Cuisine | Greek |
| Dining/Restaurants | Type of Cuisine | Italian |
| Dining/Restaurants | Type of Cuisine | Japanese |
| Dining/Restaurants | Type of Cuisine | Seafood |
| Clothing & Accessories | Sex | Female |
| Clothing & Accessories | Sex | Male |
| Clothing & Accessories | Age | Newborn(0–6 months) |
| Clothing & Accessories | Age | Babette(0–1 Year) |
| Clothing & Accessories | Age | Infants(0–2 Years) |
| Clothing & Accessories | Age | Toddlers(2–3 Yrs) |
| Clothing & Accessories | Age | Pre-School(4–5 Yrs) |
| Clothing & Accessories | Age | School Age(6–12 Yrs) |
| Clothing & Accessories | Age | Teenagers(16–18 Yrs) |

TABLE 2-continued

| Areas of Interest | | |
| --- | --- | --- |
| Interest Area | Category Type | Sub-Category |
| Clothing & Accessories | Age | Adult(>18 Years) |
| Clothing & Accessories | Type of Clothing | Clothing |

Table 3
Function Definition by Subsystem
Subsystem 1—Manage Consumer/Retailer Information
    Function 1.1—Manage Consumer/Retailer Information
    Processes under this grouping provide functionality for system administration staff to maintain consumer and retailer related information. The information maintained involves: consumers, retailers, CallMall stores, catalogues, mall activities, and information services.
    Function 1.2—Manage Order and Setup Charge Information
    Processes under this grouping provide functionality for system administration staff to maintain order and setup charge information: order attributes, retailer order attributes, incomplete order information, fax completed orders, setup charge types, as well as creating setup charges.
    Function 1.3—Manage EAS and Script Information
    Processes in this grouping provide functionality for system administration staff to maintain EAS (Extended Area of Service) information,. fictitious telephone number types, default FDM scripts, and telco telephony scripts.
    Function 1.4—Manage System Tables
    Processes in this grouping provide functionality for the system administrator to maintain the system tables required for system. These tables include: interest areas, CallMall category types, payment types, ad types, event types, fictitious telno types, etc.
    Function 1.5—Manage Back-End System Security, Help, and Error Handling
    Processes in this grouping provide functionality for the system administrator to establish security requirements for the back-end system. Functionality here also allows for common error handling and on-line help for processes in the back-end system.
    Back-end processes are those processes that system administration utilize, whereas front-end processes are those processes that the consumer utilizes through their ADSI device.
Subsystem 2—Manage Consumer Interactions
    Function 2.1—Manage Session Interaction Information
    Processes in this grouping provides the following functionality for the consumer using their set in the off-hook state: establishes and terminates sessions with the server, requests set initialization, and handles the various make call requests.
    Function 2.2—Manage DBM SDC Interactions
    Processes in this grouping all pertain to providing the consumer with the functionality to interact with little/lot DBM messages, as well as an additional feature of allowing for the testing of new little/lot messages off site.
    Function 2.3—Manage CallMall Shopping Interactions
Processes in this grouping all pertain to providing the consumer with CallMall shopping functionality.
    Function 2.4—Manage CallMall Personal Agent Interactions
    Processes in this grouping all pertain to providing the consumer with CallMall personal agent maintenance functionality. Although initiated from the CallMall these processes deal with all aspects of the consumer's personal agent maintenance, including those related to DBM.

Subsystem 3—Manage Ad Sales and Development

Function 3.1—Manage Ad Sales & Ordering Administration

Processes in this grouping deal with providing sales staff with the functionality necessary to administer DBM message ordering and sales, including: sales force, order forms, pricing, commission, as well as providing campaign and ad development and scheduling information.

Function 3.2—Manage Ad Creation

Processes in this grouping deal with providing administration staff with the ability to acquire and capture ad voice and text information supplied by the ad creative house.

Function 3.3—Manage Ad Population

Processes in this grouping provide DBM sales administration with the functionality to forecast message penetration, as well as the capability to reserve specific slots on an ad basis.

Subsystem 4—Manage Information For Distribution

Function 4.1—Manage DBM Distribution

This grouping contains the functionality necessary to distribute DBM related information to remote locations. The information covered is consumer message reservations, next day's downloads, and "more flyers".

Function 4.2—Manage CallMall Distribution

This grouping contains the functionality necessary to distribute CallMall related information to remote locations. The information covered is community mall stores, catalogue stores, mall activities, and community info service.

Function 4.3—Distribute Information to Remote

This grouping contains the identification of remote locations and the transfer mechanism to distribute the data.

Function 4.4—Acquire Distributed Information

This grouping contains the functionality necessary to acquire raw event information from remote locations for central processing.

Subsystem 5—Manage FDM Delivery

Function 5.1—Manage Scheduled DBM Script Delivery

Processes in this grouping provide the functionality for the system to translate and download new DBM FDM Little Ads to the consumer's set. It also handles the translation of new SDC Little/Lot Ads.

Function 5.2—Manage Scheduled Default FDM Script Delivery

Processes in this grouping translate and download new default FDM scripts to the consumer's set.

Function 5.3—Manage On Demand FDM Delivery

Processes in this grouping download set initialization functionality upon user request. The Feature Download Management information provides the set with its basic functionality.

Subsystem 6—Manage Event Information

Function 6.1—Manage System Archive and Cleanup

Processes in this grouping provide the functionality to archive and purge inactive data from the system. Each process is to provide a detailed control summary report of information archived and purged.

Function 6.2—Manage Event Processing

Processes in this grouping provide the functionality that takes raw event information acquired by Subsystem 4 from Subsystem 2 into the appropriate structured event. These processes also update the appropriate monthly event roll-up counters.

Function 6.3—Manage Event Rating

Processes in this grouping provide the functionality that rates and creates financial transactions from billable events and setup charges. It provides the functionality for producing retailer billing reports, and the ability to inquire on them. It also provides the functionality to transfer the information to CIS/BILLING.

Function 6.4—Manage Retailer and Sales Reports

Processes in this grouping provide the weekly and monthly retailer and sales force reporting requirements.

Function 6.5—Manage System Reports

Processes in this grouping provide reports which are necessary to manage and operate the system.

The embodiments of the invention in which an exclusive property or privilege is claimed are defined as follows:

1. A marketing system for use in a public switched telephone system having stored program control switches connected to screen based devices in customer premises, each said screen based device having means for visually displaying messages and means for sending at the option of a customer a response to a displayed message over the public switched telephone system, the marketing system comprising:

means for storing predetermined information respecting each customer;

means for assembling and managing messages including:
means for creating and storing messages to be delivered to at least some of said screen based devices; and
means for delivering the messages through the public switched telephone system to said at least some of said screen based devices;

means for identifying the at least some of said screen based devices to which messages are delivered and storing this message delivery information;

means for initiating the display of said messages on said means for visually displaying messages;

means for identifying any responses from the screen based devices to the message delivered thereto and storing this message response information; and means for generating response measurement statistics based upon the message delivery information and the message response information.

2. A system as defined in claim 1 in which the messages are delivered to the screen based devices while they are on-hook without ringing the screen based devices.

3. A system as defined in claim 1 in which screen based devices which are unable to receive messages while on-hook are provided with a default script which initiates a request, transmission and reception of messages.

4. A system as defined in claim 1, in which said messages are delivered automatically or upon customer request.

5. A system as defined in claim 1, in which the means for delivering the messages operates at predetermined times.

6. A system as defined in claim 1, in which the screen based devices store and display the delivered messages until overwritten by new messages.

7. A system as defined in claim 1, in which said means for initiating the display of the stored messages is automatic.

8. A system as defined in claim 1, in which said means for initiating the display of the stored messages is in response to customer request.

9. A system as defined in claim 1, in which the means for identifying any responses from the screen based devices comprises means for identifying a calling telephone number associated with a particular one of the screen based devices and a called number.

10. A system as defined in claim 9, in which the means for identifying any responses from the screen based devices further comprises means for identifying an identification number associated with a respective one of the screen based devices, which in combination with the identified calling telephone number and called number identifies the message to which the customer responded.

11. A system as defined in claim 1 in which the screen based devices are compliant with an ADSI standard.

12. A system as defined in claim 11 in which the screen based devices are analog telephones with display screens.

13. A system as defined in claim 1, in which the means for sending a response to a displayed message comprises means for selecting between at least two different possible responses, one of which establishes a call from the screen based device through the public switched telephone system to a source of further information regarding the message, the other of which communicates a request for a longer message to be delivered to the screen based device for display thereon providing further information regarding the initial message.

14. A system as defined in claim 13 in which the source of further information is a sponsor of the message.

15. A system as defined in claim 13 in which the source of further information is an interactive voice system and/or an interactive screen based text system and/or an interactive video system.

16. A system according to claim 1 further comprising means for the customer to initialize said predetermined customer information, said predetermined information comprising language choice, areas of interest, shipping address, and demographics.

17. A system according to claim 16 in which all of said predetermined customer information is maintainable by said customer.

18. A system according to claim 16 in which said means for identifying the at least some of said screen based devices to which messages are delivered selects only messages relating to retailers located within the free calling area of each customer and with subject matter falling within each customer's areas of interest information, and screens out all other messages.

19. A system according to claim 18 in which means are provided to deliver messages which were screened out by said areas of interest but still relate to retailers or service providers within the free calling area of the customer, upon customer request.

20. A system as defined in claim 1, in which the means for assembling and managing messages includes means for selecting from the total number of screen based devices a set of specific screen based devices to which a particular message is to be delivered.

21. A system as defined in claim 20 in which the set of screen based devices to which a particular message is to be delivered is based upon said predetermined information respecting each customer.

22. A system as defined in claim 20 in which the set of screen based devices to which a particular message is to be delivered is based upon a previously stored list.

23. A system as defined in claim 20 in which screen based devices which are unable to receive messages while on-hook are provided with a default script which prompts the customer to initiate a request, transmission and reception of the messages.

24. A system as defined in claim 20 in which the set of screen based devices to which a particular message is to be delivered are all located in a toll-free calling area in relation to a retailer referred to in the message.

25. A marketing system for use in a public switched telephone system having stored program controlled switches connected to screen based devices in customer premises, each said screen based device having means for storing and displaying delivered messages until overwritten with new messages and means for sending a response at the option of a customer to a delivered message; said system comprising:

means for storing predetermined information respecting each customer;

means for assembling and managing messages including, means for creating and storing messages to be delivered to one or more of said screen based devices;

means for selecting one or more of said screen based devices to which each said message is to be delivered based on said predetermined information;

means for delivering the messages in a non-obtrusive manner to the selected screen based devices at a predetermined time;

means for identifying the screen based devices that each message is delivered to and storing this information; and means for identifying responses to each message from the screen based devices and storing this information; and means for accessing the stored information, and generating response statistics based thereupon.

26. A marketing system in which messages are created and stored on a backend server comprising:

means for periodically transmitting said messages to a set of remote frontend servers;

means for generating and periodically transmitting a target list of customer screen based devices from the backend server to each frontend server for each message such that each customer screen based device on a target list for a given frontend server is within the local calling area of that server;

means for each frontend server to send out each message to its associated target list of customer screen based devices over the public switched telephone network.

27. The system of claim 26 in which said means for periodically transmitting said messages to a set of remote frontend servers only sends messages relating to stores or service providers located within the free calling area of each frontend server.

28. An interactive home shopping system for use in a public switched telephone system having stored program controlled switches connected to screen based devices in customer premises, each screen based device having a screen for displaying information and means for transmitting instructions from said screen based device through the public switched telephone system, said system comprising:

means for storing predetermined information respecting each customer, the predetermined information including shipping information;

means at each said screen based device for a customer to select connection of said screen based device to the shopping system;

means for the shopping system, in response to the customer selecting a connection, to present a set of stores or service providers to the customer upon said screen;

means for the customer via said screen based device to select and interactively browse through the stores or service providers presented;

means for the customer to order via said screen based device a product or service;

means for identifying a calling telephone number of the screen based device; and means for retrieving on the basis of the calling telephone number the shipping information of the customer associated with the screen based device to complete the order.

29. A system as defined in claim 28 further comprising:

means for a customer via said screen based device to select or update from a list of stores or service providers a personal mall consisting of stores and service providers chosen by said customer; and means for storing the personal mall as one of a set of service options presented to said customer.

30. A system as defined in claim 28 further comprising:

means for a customer to enter or update via the screen based device the predetermined customer information which is stored.

31. A system according to claim 28 in which only stores or service providers located within the free calling area of a customer are made available to that customer.

32. A system as defined in claim 28 further comprising means for identifying an identification number of each screen based device and wherein the means for retrieving the shipping information uses the identification number as well as the calling telephone number to retrieve the shipping information.

33. A system as defined in claim 32 wherein the system has a computer and at least one of the stores or service providers has a computer and further comprising means for transferring from the system computer to the computer of the at least one of the stores or service providers when said at least one of the stores or service providers has been selected by a customer.

34. The system according to claim 33 further comprising means for faxing completed orders from said system to said stores or service providers.

35. A system as defined in claim 28 wherein an option is presented to a customer using a store or service provider on said system to request connection to a remote help agent.

36. A system as defined in claim 35 further comprising means for identifying the customers obtaining information on a particular store or service provider, and the customers who request connection to a remote help agent.

37. A system as defined in claim 36 in which the means for identifying comprises means for identifying calling and called telephone numbers.

* * * * *